United States Patent
Teramachi (12)

(10) Patent No.: US 6,203,200 B1
(45) Date of Patent: Mar. 20, 2001

(54) LINEAR MOTION GUIDE APPARATUS EMPLOYING A ROLLER TRAIN

(76) Inventor: Hiroshi Teramachi, 3-12-30-301, Kamiosaki, Shinagawa-ku, Tokyo (JP)

( * ) Notice: Subject to any disclaimer, the term of this patent is extended or adjusted under 35 U.S.C. 154(b) by 0 days.

(21) Appl. No.: 09/415,089

(22) Filed: Oct. 8, 1999

(30) Foreign Application Priority Data

Jul. 16, 1999 (JP) .................................................. 11-233047

(51) Int. Cl.[7] .............................. F16C 29/06; F16C 43/06
(52) U.S. Cl. ........................... 384/51; 384/44; 29/898.03
(58) Field of Search .................................. 384/44, 43, 45, 384/51; 29/898.03

(56) References Cited

U.S. PATENT DOCUMENTS

| | | | |
|---|---|---|---|
| 3,219,398 | * 11/1965 | Anderson | 384/44 |
| 4,102,552 | * 7/1978 | Ernst et al. | 384/44 |
| 4,240,673 | * 12/1980 | Ernst et al. | 384/44 |
| 4,961,651 | * 10/1990 | Rabe | 384/51 |
| 6,070,479 | * 6/2000 | Shirai | 384/51 X |

FOREIGN PATENT DOCUMENTS 10-110728    4/1998   (JP) .

* cited by examiner

Primary Examiner—Thomas R. Hannon
(74) Attorney, Agent, or Firm—Brinks Hofer Gilson & Lione

(57) ABSTRACT

A roller train for enabling a slider to be freely guided along a track rail and to a linear motion guide apparatus employing this roller train that is used in machine tools, industrial robots, precision instruments, and the like provides a roller train capable of substantially preventing skew in the rollers that can prevent the rollers from circulating smoothly. A linear motion guide apparatus that employs this roller train enables the slider to move smoothly. The roller train 13a includes a plurality of rollers 14a and a retaining member 15. The retaining member 15, constructed of a slick synthetic resin material, is provided with roller retaining holes 19 to retain the plurality of rollers 14a in a series. In particular, side plates 20 for covering both end faces of the 14a are provided on the portions of the retaining member 15 that oppose both end faces of the 14a contained in the roller retaining holes 19. The side plates 20 prevent skew in the rollers 14a, enabling the same to roll smoothly. The 14a are prevented from falling out of the retaining member 15 by the engaging of depressions 16 and protrusions 21 formed in the end faces of the cylindrical rollers 14a and the inner surfaces of the side plates 20, respectively.

27 Claims, 54 Drawing Sheets

(A)

(B)

LINEAR MOTION GUIDE APPARATUS EMPLOYING A ROLLER TRAIN

BACKGROUNDS OF THE INVENTION

The present invention relates to a roller train for enabling a slider to be freely guided along a track rail and to a linear motion guide apparatus employing this roller train that is used in machine tools, industrial robots, precision instruments, and the like.

Technology for enabling a sliding member to move reciprocatingly in a linear direction is indispensable for such fields as machine tools and industrial robotics. For example, a wafer grinder employed in semiconductor fabrication equipment is configured to move freely along a track rail disposed horizontally, performing coarse grinding at prescribed positions along the track rail and finishing grinding at other prescribed positions. For this reason, linear motion guide apparatuses have been widely used to enable the grinding device to move freely in a linear motion.

A variety of constructions for the linear motion guide apparatus described above are well known in the art. In general, however, this apparatus includes a long track rail; a slider capable of moving reciprocatingly along the track rail and comprising a main body and side covers fixed one to either side of the main body; and a plurality of rollers integrated in a path formed in both the slider and the track rail for supporting the slider on the track rail.

The main body of the slider is formed to fit on the track rail, loosely straddling the same. Rolling surfaces are formed on opposing surfaces of the main body and the track rail, respectively. These surfaces form a rolling channel along which rolling members can roll freely. The main body also includes through-holes formed through the length of the main body, return channels formed in the through-holes, and the inner portion of change direction channels connected one to each end of the return channels. A longitudinal section of the side covers on the slider has the same shape as a longitudinal section of the main body. The outer portion of the change direction channels is formed in the inner side surface of these side covers. Hence, the rolling channels, return channels, and change direction channels described above form endless paths having the shape of oval tracks. These paths are loaded with rollers, which are able to circulate freely in the channels.

Balls such as copper balls can be used in place of the rollers, however, the balls contact the track surface at points, whereas, the rollers contact the surface along lines enabling the rollers to support a greater load. Accordingly, the rollers are in high demand as they are generally used in devices that require supporting a relatively heavy load.

Next the operations of the linear motion guide apparatus having the construction described above and being well known in the art will be described. As the slider is moved in a sliding motion over the track rail, the rollers support the slider on the track rail and gradually circulate through the path. After each roller moves from the start of the rolling channel to the end of the rolling channel, the roller is transferred to the return channel via one of the change direction channels. The roller then proceeds through the return channel and is again transferred to the start of the rolling channel via the other change direction channel. The rollers positioned in the rolling channel support the slider, while the other rollers move through the change direction channels and the return channel along with the movement of the slider. For the purposes of description in the current application, the rolling channel in which rollers are supporting the slider will be referred to as the load-bearing region, while the other channels in which the rollers are simply moving and not supporting the slider will be referred to as the load-free region. Since the plurality of rollers continue to circulate throughout the path and support the slider on the track rail as described above, the slider can move smoothly and freely along the track rail.

However, in order for the linear motion guide apparatus described above to operate smoothly, smooth circulation of the rollers is most essential. Some factors that can prevent smooth circulation of the rollers include increased frictional resistance at points of contact between the rollers and the path or other components, as well as skew in the rotational axis of the rollers. In the present application, skew in the rotational axis of a roller is defined as the actual rotational axis of a roller in the path being at an angle to the designed rotational axis.

As shown in the example of FIG. 53, if the cylindrical roller 14*a* is skewed (the dotted line in the drawing shows the skewed position of the roller axis while the solid line shows the true axis), then when the cylindrical roller 14*a* is progressing from the end of the change direction channel 10 in the load-free region β to the start of the rolling channel 5 of the load-bearing region α, one half of the cylindrical roller 14*a* impacts the load-bearing region a before the other half of the cylindrical roller 14*a*, temporarily halting the circulation of the cylindrical roller 14*a*. Hence the skew in the cylindrical roller 14*a* hinders its smooth movement.

Furthermore, skew in the cylindrical roller 14*a* can generate an extreme concentrated load on one half of the cylindrical roller 14*a*, resulting in an edge load that can cause damage to the cylindrical roller 14*a* and the rolling channel 5, reducing their durability. Moreover, damage to the cylindrical roller 14*a* or rolling channel 5 can give rise to increased vibrations or rolling resistance on the cylindrical roller 14*a* as the same circulates through the path 12, further preventing the smooth motion of the cylindrical roller 14*a*.

Increased frictional resistance due to contact with other rollers or rough contact with part of the path can also hinder smooth circulation of the rollers. In general, such frictional resistance occurs mainly in the change direction channels.

Therefore, it is necessary to prevent skew in the rollers and increases in frictional resistance in order for the slider to move smoothly on the track rail. However, it is difficult to achieve smooth circulation of the rollers with the conventional construction described above, because no particular steps have been taken to prevent contact between the rollers and because the order of the rollers has a tendency to break down in the change direction channels, bringing rollers into contact with each other.

In the conventional construction described above, the side walls forming the return channel are employed as guiding surfaces to guide the rollers down the channel. However, in order for these side walls to serve as guiding surfaces, gaps of a fixed amount must be provided between each end surface of the roller and the corresponding side wall. However, these gaps give the rollers play in the channels, which may be a factor in generating skew in the rollers 14*a*. The problems described above are also applicable when employing spherical rollers or rollers with chamfered ends in place of the cylindrical rollers 14*a*.

In an effort to resolve the problems described above, Japanese Laid-Open Patent Publication No. HEI-10-110728 proposes an advanced technique aimed at preventing skew such as that shown in FIG. 54. This technique employs a retaining member 25 to link the rollers 14a in a train. As shown in the diagram, the retaining member 25 is formed in a ladder-like configuration and includes a plurality of roller retaining holes 26. Each roller retaining hole 26 retains one cylindrical roller 14a. A spacer 18 is disposed between each neighboring pair of rollers 14a for maintaining the positions of the rollers 14a. A protrusion 27 is formed on each outer side surface of the retaining member 25 and protrudes in the lengthwise direction indicated by the arrow X in FIG. 54(A) and in the direction from front to back in FIG. 54(B). Depressions (not shown) are formed in both side walls of the return channel and the change direction channels for engaging the protrusions 27.

Although the advanced technique described above succeeds in improving the effects for preventing skew in comparison to the conventional structure, the following new problems arise. When the rollers 14a pass through the semicircular change direction channels, the gap around the spacer 18 increases, while the rollers 14a are drawn toward the inner side of the change direction channel. As a result, the spaces between neighboring rollers 14a deviate, causing the line of rollers 14a in the change direction channel to deviate from that in the return channel. As a result the rollers 14a in the change direction channel have a tendency to press forcefully against a portion of the retaining member 25 (a portion of the roller retaining hole 26), thereby restricting circulation.

Moreover, the depression functioning as a guide surface must be formed with a high degree of parallelism and precise spacing throughout the entire return channel and change direction channels in order to achieve smooth movement of the rollers 14a using the advanced technique described above.

Furthermore, since the protrusions 27 are guided through the depressions in the change direction channels in a state of elastic deformation (a bowed state) corresponding to the curvature of the change direction channel, the protrusions 27 contact the depressions with considerable force. Therefore, frictional resistance is increased on the portions in sliding contact, thereby hindering the smooth circulation of the rollers 14a and preventing the smooth operation of the linear motion guide apparatus.

SUMMARY OF THE INVENTION

In view of the foregoing, it is an object of the present invention to provide a roller train capable of smoothly guiding the rollers through their paths and preventing as much as possible skew in the rollers that can hinder their smooth circulation through the paths. It is another object of the present invention to provide a linear motion guide apparatus capable of employing this roller train to enable the smooth movement of a slider.

These objects will be attained by a roller train and a linear motion guide apparatus employing this roller train according to the present invention. According to one aspect of the present invention, the roller train comprises a plurality of rollers: and a retaining member constructed of a flexible material and serving to maintain the plurality of rollers in a straight row and at appropriate distances with respect to neighboring rollers. The roller train supports a slider that serves as a guide-bearing device to be freely movable along a track rail.

The retaining member described above comprises a plurality of spacers, wherein one spacer is positioned between each pair of neighboring rollers; and a plurality of end face supports for supporting the left and right end faces of each roller, wherein each end face support links like lengthwise ends of neighboring spacers. Each end face support comprises an outer side surface that restricts the position of the rollers when the roller train is integrated in the path, by sliding in contact with the side wall surfaces of the path. Roller retaining holes are formed by pairs of neighboring spacers and pairs of opposing side plates that join these pairs of neighboring spacers. Both the inner and outer side surfaces of the end face supports are flat. The inner side surface of the end face supports should be disposed in free sliding contact with at least the outer peripheral portion on the end surface of the rollers.

With the construction described above, the roller train supports the slider on the track rail with the following effects. Particularly, when the roller train is circulating in the path, the rollers are guided by the retaining member to roll or slide through the path. At this time the flat shaped end surfaces of the rollers slide in contact with the flat inner surfaces of the side plates. Since the space between pairs of end face supports that slide against both end faces of the rollers is fixed at a predetermined value that does not change, the rollers are constantly maintained in a fixed orientation and the central rotational axis of the rollers does not waver up, down, left or right in relation to the direction in which the roller progresses. Hence the end face supports used in the present invention correct any skew in the rollers. In particular, by sliding in contact with at least the outer side portion of the roller end faces, the end face supports can reliably maintain the rollers in their correct orientation and substantially prevent skew of the rollers.

Moreover, as the end face supports of the present invention move through the change direction channels and return channel of the circulating path, the outer side surfaces of the end face supports slide in contact with the side wall portions of the change direction channels and return channel. However, since both the outer side surfaces of the end face supports and the side walls of the channels are flat surfaces, these components are easier to produce than those in the above described advanced technique. Whereas the depressions formed in both side walls of the return channel and the change direction channels, and the protrusions formed on both sides of the retaining member must be formed at precise dimensions and with a high degree of parallelism in the advanced technique described above, the side walls of the return channel and the change direction channels and the outer side surface of the side plates in the present invention are simply formed as flat surfaces and therefore are extremely easy to produce.

Further, the roller train of the present invention increases the area of contact between the outer side surfaces of the end face supports and the side walls of the channels. Hence, any deviation of the retaining member in the direction it progresses is corrected by the side walls, thereby effectively preventing skew in the rollers.

As described above, rollers have a tendency to be drawn toward the inner side of the path when passing through the change direction channels. In the present invention, however, the outer side portions of the roller end faces are in constant contact with the inner side surfaces of the end face supports. This contact maintains the rollers in a correct orientation with the rotational axis of each roller orthogonal to the direction of progression, thereby preventing the rollers from skewing.

As they move by rolling or sliding in the channels, the rollers are maintained at a correct orientation by the retaining member as described above. Further, the retaining member is moved by the rollers and guided according to the sliding contact between the end faces of the rollers and the inner side surfaces of the end face supports. In other words, the rollers and the retaining member work to mutually correct the other's orientation and mutually enable the other to move in a smooth manner; As a result the rollers can correct deviation in the retaining member, while the retaining member corrects deviations in the rollers, both deviations of which have conventionally caused skew in the rollers. As a result of this interaction, the roller train can operate smoothly.

Lubricant, such as grease, can be introduced between parts of the rollers and parts of the retaining members that contact one another. By using a lubricant in this way and by producing the retaining member with a slick and flexible material, it is possible to prevent an increase in frictional resistance between the rollers and the retaining member, to enable the entire roller train to move smoothly. In the roller train according to the present invention, lubricant is maintained in areas called grease points between the spacers of the retaining member and the rollers adjacent to each other across each spacer. In this way, not only is friction between the rollers prevented, but also the capacity of the roller train in retaining lubricant can be improved, thereby greatly improving the durability of the roller train.

According to another aspect of the present invention, the surface of the spacers opposing the side surfaces of the rollers can be a concave surface having a curvature approximately equal to the curvature of the roller side surfaces. With this construction, the pair of spacers that form each roller retaining hole can reliably maintain the rollers and prevent the rollers from falling out of the retaining member during maintenance, inspection, and the like.

According to another aspect of the present invention, depressions are formed on the inner side surfaces of the end face supporters for loosely fitting over the ends of the rollers, while the outer side surfaces of the end face supporters move freely in sliding contact with the side walls of the path, which has a rectangular cross-section. This construction effectively corrects any skew in the rollers. Since the end face supporters are loosely fitted over the ends of the rollers, which include the roller end faces, the end face supporters can reliably maintain the rollers in their correct orientation, substantially preventing deviations in the rotational axes of the rollers.

According to another aspect of the present invention, engaging depressions or engaging protrusions can be formed at the center of both ends of the rollers, while engaging protrusions or engaging depressions capable of engaging with these engaging depressions or engaging protrusions are formed at the center of the inner side surface on the end face supporters at positions conforming to the engaging depressions or engaging protrusions described above. The engaging protrusions formed on the end faces of the rollers or on the end face supporters can be formed in a variety of shapes. For example, these engaging protrusions can be formed in the shape of short cylinders or short cones. Obviously the engaging depressions are shaped to conform to the engaging protrusions.

Here skew in the rollers can be more effectively prevented, since the engagement of the engaging depressions and protrusions described above firmly maintains the order of the rollers and corrects any deviation in the rollers rotational axis. When passing through the change direction channels, which have a semi-circular shape, the rollers are maintained in the same positions as when they pass through other portions of the path. Hence, skew in the rollers can be more effectively prevented since the position in which the rollers are maintained in relation to the retaining member is maintained by the engagement of the depressions and protrusions described above. Moreover, this construction suppresses an increase in pressure at points of contact between the rollers and the retaining member, enabling the roller train to circulate more smoothly. The engagement of the depressions and protrusions also functions to prevent the rollers from falling out of the retaining member, thereby facilitating such operations as maintenance and inspection of the roller train.

It is also possible to provide constricting portions in the spacers from the lengthwise ends of the spacers towards the central portion. With this construction the retaining member can bend in the short direction of the roller train only the amount of depth cut out for the constricting portion. Accordingly, this increases the range of freedom in positioning the return channel. Therefore, the shape of the slider can be freely selected according to its intended use. Further, even when the path is formed such that the constricting portion forces the roller train to bend slightly in the short direction in order to circulate through the path, the roller train can easily be bent by the constricting portion enabling the same to move smoothly through the change direction channels. Therefore, this construction increases the range of freedom in designing the path.

According to another aspect of the present invention, the retaining member can be constructed of a synthetic resin material, such as a fluoride type resin. The roller train is manufactured with this synthetic resin by first inserting the rollers into the formwork of the retaining member and then injecting the resin material into the cavities of the retaining member. There is very little sliding resistance between the rollers and the retaining member, since minute gaps are formed between the rollers and the retaining member due either to a shrinkage of the resin upon hardening or by immersing the entire roller train into an oil reservoir or the like. Hence, this form of injected molding (insert molding) used in the present invention improves and simplifies productivity of the roller train by eliminating the need for a process to integrate the rollers in the retaining member.

In another aspect of the present invention, the rollers employed in the invention are cylindrical in shape or spherical in shape. It is also possible to chamfer the ends of the cylindrical rollers and spherical rollers to produce chamfered cylindrical rollers and chamfered spherical rollers.

According to another aspect of the present invention, the end face supports are formed in a disc shape having an area approximately 80–95% of the area on the roller end faces. Accordingly, it is possible to substantially reduce wobbling on the roller's rotational axis, since the end face supports slide in contact with nearly the entire end faces of the rollers.

According to another aspect of the present invention, one portion of the end face supports can be formed to contact and slide freely along at least one portion of the path. With this construction, roller skew is more effectively prevented.

According to another aspect of the present invention, it is desirable for the roller train to be constructed with ends having a linking portion that can detachably link opposing ends. With this construction, the roller train can be formed in an endless ring after being installed in the path. More specifically, the linking portion includes an engaging protrusion formed on one end of the roller train and an engaging depression formed on the other end. Further, when the engaging protrusion is engaged in the engaging depression, both side surfaces of the linking portion should be on the same plane as both side surfaces of other portions of the roller train. The linking portion can also be linked by overlapping the ends of the roller train and welding the edges together with a plastic welder. In the roller train, it is most desirable to link the ends of the roller train along the end faces of a roller and to configure the linking portion to serve as end face supports for that roller. More specifically, one linking end of the roller train is configured of a superposition piece shaped as an engaging depression on the outer side surface of the roller end face support, while the other linking end is configured by an engaging protrusion that engages with the engaging depression above. Hence, the end face support is constructed by engaging the engaging depression with the engaging protrusion. It is preferable to also weld the engaging depression and engaging protrusion together.

It is also possible for the roller train to be constructed with ends and having a linking portion that can link the ends wherein the linking portion can be configured by splitting the end face support comprising the engaging protrusion at a position near the engaging protrusion to form a pair of half portions provided on both ends of the roller train. The ends of the roller train are linked by engaging the engaging protrusion configured by contacting the pair of half-portions with the engaging depression formed in the roller end face between the two half-portions.

By configuring the roller train in an endless ring, each roller can move smoothly through the path by the pulling and pushing forces of the neighboring rollers, for example when the rollers are transferring from the change direction channel to the rolling channel. By enabling the rollers to move smoothly through the channels it is possible to achieve a smooth movement of the slider and to improve the stopping precision of the same.

According to another aspect of the present invention, the linking portion of the roller train is welded by removing one side cover of the slider and positioning both overlapping ends of the roller train in the exposed change direction channel portion. The overlapped end portions of the roller train are welded together using welding techniques and the like well known in the art.

According to another aspect of the present invention, a hold portion is formed on one part of the end face support and stabilizing portions are formed at least in the channel of the load-bearing region to stabilize the hold portion. With this construction, the roller train can be stabilized as it is guided through the path, effectively preventing vibration and noise.

According to another aspect of the present invention, the linear motion guide apparatus comprises a long track rail, a slider capable of sliding freely along the track rail, and the roller train integrated in a path formed in the slider for supporting the slider on the track rail. The slider includes a main body disposed horizontally and a pair of skirt portions fixed to opposing sides of the main body at the top portion of the covers. The path comprises rolling channels in the load-bearing region having rolling surfaces formed in the track rail and rolling surfaces formed in the slider and opposing the rolling surfaces formed in the track rail; return channels disposed parallel to the rolling channels; and change direction channels connecting ends of the rolling channels to ends of the return channels. The roller train comprises a plurality of rollers, and a retaining member constructed of a flexible material for maintaining the plurality of rollers in a straight and ordered series. The retaining member comprises a plurality of spacers placed between neighboring rollers, and a plurality of end face supports connecting like lengthwise ends of neighboring spacers for supporting the left and right end faces of the rollers. The end face supports comprise an outer side surface that slides in contact with the side walls of the path when the roller train is integrated in the path and utilize the side walls as a guiding surface to maintain the rollers in their correct orientation. It is also possible to use any of the various constructions for the roller train described above.

With this construction, roller skew can effectively be prevented by employing one of the above described roller train constructions, enabling the roller train to move smoothly through the path. As a result, the linear motion guide apparatus can also operate smoothly. Moreover, by effectively preventing skew of the rollers, it is possible to improve the durability of not only the rollers, but also the various components and the entire linear motion guide apparatus.

Placement of a plurality of roller trains must be considered in the linear motion guide device described above in order to evenly distribute the load to better enable smooth movement of the slider. According to another aspect of the present invention, two rows of roller trains are placed between the upper surface of the track rail and the lower surface of the horizontal portion on the main body of the slider, and one row of roller train is disposed on either widthwise side of the track rail between the outer side surface of the track rail and the inner side surface of the corresponding skirt portion formed on the slider.

In most cases, the linear motion guide apparatus is used to convey a device attached to the top surface of the slider. In this case, a downward vertical load is added to the slider. The construction of the linear motion guide apparatus described above is effective for this use. In this case, the contact angle of rollers integrated in the roller trains that are interposed between the top surface of the track rail and the lower surface of the horizontal portion of the slider should be about 90 degrees from the horizontal, while the contact angle for rollers integrated in the roller trains that are interposed between the widthwise sides of the track rail and the skirt portions of the slider should be about 30 degrees downward from the horizontal. With this configuration a downward vertical load applied to the slider can be sufficiently supported.

According to another aspect of the present invention, two rows of roller trains are disposed between each widthwise side surface of the track rail and the opposing inner side surface of the skirt portion formed on the slider, such that one row is positioned over the other on each side, With this configuration, the contact angle for the rollers integrated in the roller trains positioned on the top should be about 45 degrees up from the horizontal toward the skirt portion formed in the slider, while the contact angle for rollers integrated in the roller train positioned on the bottom should be about 45 degrees downward from the horizontal. As a variation of this construction, the contact angle for rollers integrated in the top roller trains can be about 45 degrees downward from the horizontal, while the contact angle for rollers integrated in the lower roller trains are about 45 degrees upward from the horizontal. This configuration can achieve a smoother movement of the slider, since the loads added both vertically downward and horizontally can be supported equally.

According to another aspect of the present invention, it is desirable to configure the roller train to have ends prior to integrating the roller train into the path and to link the opposing ends of the roller train after integration using the linking portion. More specifically, the roller train that is integrated in a path formed in the slider for supporting the slider on a track rail comprises a plurality of rollers, and a retaining member constructed of a flexible material for retaining the plurality of rollers in an orderly series. The retaining member comprises a plurality of spacers disposed between neighboring rollers, and a plurality of end face supports connecting like ends of neighboring spacers, in the lengthwise direction of the rollers, for supporting the left and right end faces of each roller. The end face supports comprise an outer side surface that slides in contact with the side walls of the path when the roller train is integrated in the path and uses the side walls of the path as a guiding surface to maintain the rollers in their correct orientation.

One end of the roller train is provided with an engaging protrusion, while the other end is provided with an engaging depression capable of engaging with the engaging protrusion. When the roller train is engaged in the path, one side cover of the slider can be removed to expose a change direction channel. By inserting the roller train through the change direction channel into the path and positioning both ends of the roller train in the exposed change direction channel and engaging the ends, the engaging depression on one end of the roller train is engaged with the engaging protrusion on the other end to form the linking portion, such that both side surfaces of the linking portion are on the same plane as both side surfaces of other portions of the roller train. The engaged depression and protrusion are welded to form an endless ring-shaped roller train. Subsequently, the side cover is reattached to cover the change direction channel.

DESCRIPTION OF THE PREFERRED EMBODIMENTS

Figure 1:
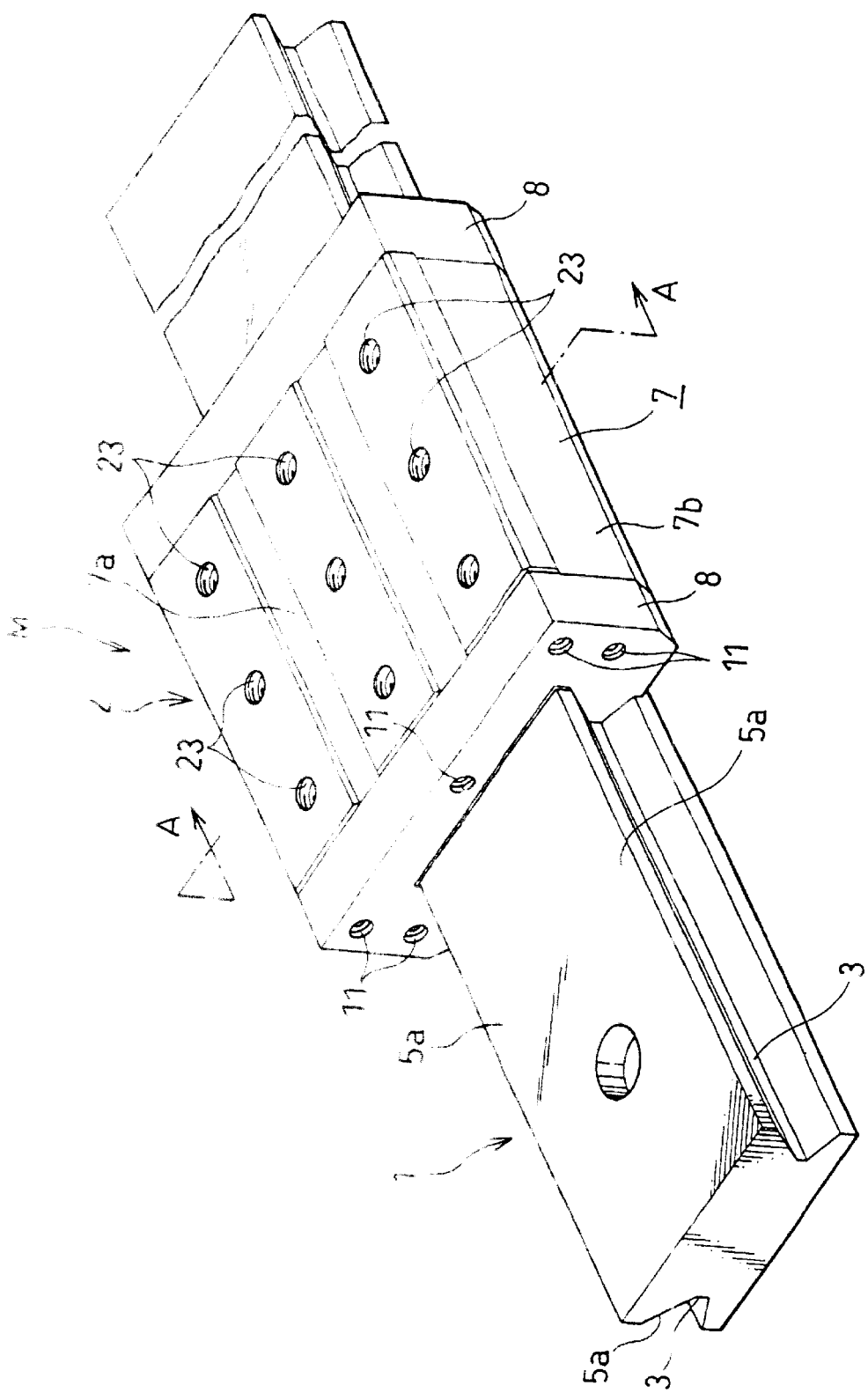
FIG. 1 is a perspective view showing a portion of the general structure of a linear motion guide apparatus employing a roller train according to the first embodiment of the present invention.

Preferred embodiments of the present invention will be described with reference to the drawings. FIGS. 1–13 show a roller train and a linear motion guide apparatus M employing this roller train according to a first embodiment of the present invention. The linear motion guide apparatus M includes a long track rail 1; a slider 2, freely movable along the track rail 1 and comprising a main body 7 having a horizontal portion 7a and a pair of skirt portions 7b extending downward on both widthwise ends of the horizontal portion 7a (on the left and right sides in FIGS. 2 and 4 and in the front and back of FIG. 3), and a pair of side covers 8 fixed to both lengthwise ends of the main body 7 (front and back in FIGS. 2 and 4, and left and right in FIG. 3) and a roller train 13a integrated in an endless path 12 that is formed in both the slider 2 and the track rail 1 for supporting the slider 2 on the track rail 1.

Figure 2:
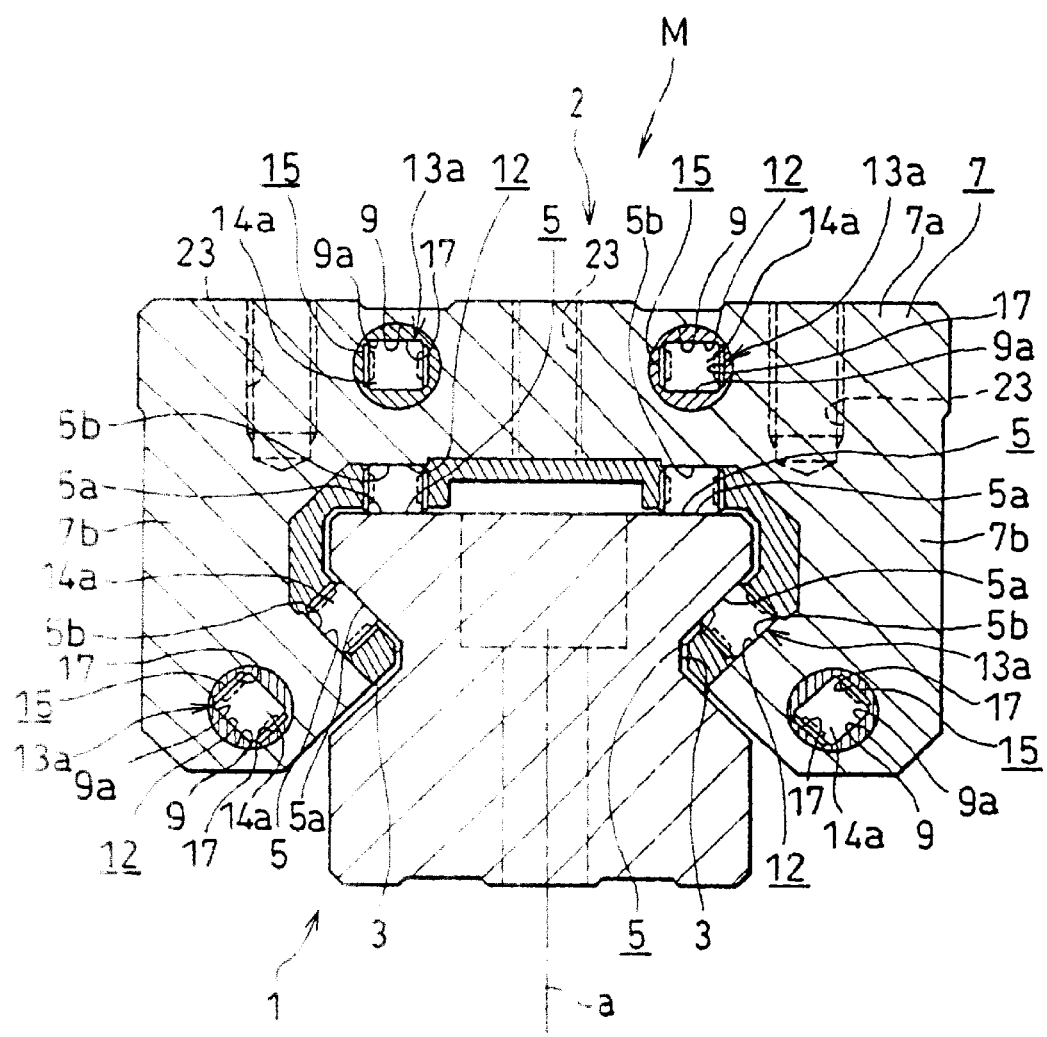
FIG. 2 is a cross-sectional view of the linear motion guide apparatus along the plane and in the direction indicated by the arrows A in FIG. 1.

As shown in FIGS. 1 and 2, triangular shaped depressions 3 are formed in the upper side surfaces (left and right sides of FIG. 2) of the track rail 1. The upper side surfaces of the depressions 3 and both sides on the top surface of the track rail 1 (left and right sides in FIG. 2) form rolling surfaces 5a.

Accordingly, four roller trains 13a are mounted in the track rail 1 according to the example in the diagram. The longitudinal section of the linear motion guide apparatus M is symmetrical across the central axis a shown in FIG. 2.

As shown in FIGS. 1–10, the slider 2 includes the metallic main body 7 and the side covers 8 mounted on the lengthwise ends of the main body 7 (shown in FIGS. 1–6). The main body 7 comprises the horizontal portion 7a, formed of a rigid block and opposing the top surface of the track rail 1, and a pair of skirt portions 7b, extending downward from the widthwise ends of the horizontal portion 7a along the widthwise sides of the track rail 1 (left and right sides in FIG. 2).

A pair of rolling surfaces 5b are formed on the bottom surface of the horizontal portion 7a, corresponding to the pair of rolling surfaces 5a formed in the top surface of the track rail 1. A rolling surface 5b is also provided in each of the inner side surfaces of the skirt portion 7b, corresponding to the rolling surfaces 5a formed in the depressions 3. The main body 7 is also provided with a pair of U-shaped change direction channel inner portions 10a connected on each end of the rolling surfaces 5b and return channels 9a, having a rectangular cross-section and formed in through-holes 9, having a circular cross-section that are provided throughout the length of the main body 7. The return channels 9a connect to the U-shaped change direction channel inner portion 10a.

The return channels 9a and U-shaped change direction channel inner portions 10a are formed by inserting a core having a prescribed shape into the through-holes 9 and injecting a melted synthetic resin into the same. A return channel 9a, having flat side walls can be formed by inserting a core having a rectangular cross-section into the through-hole 9 before introducing the synthetic resin.

Figure 3:
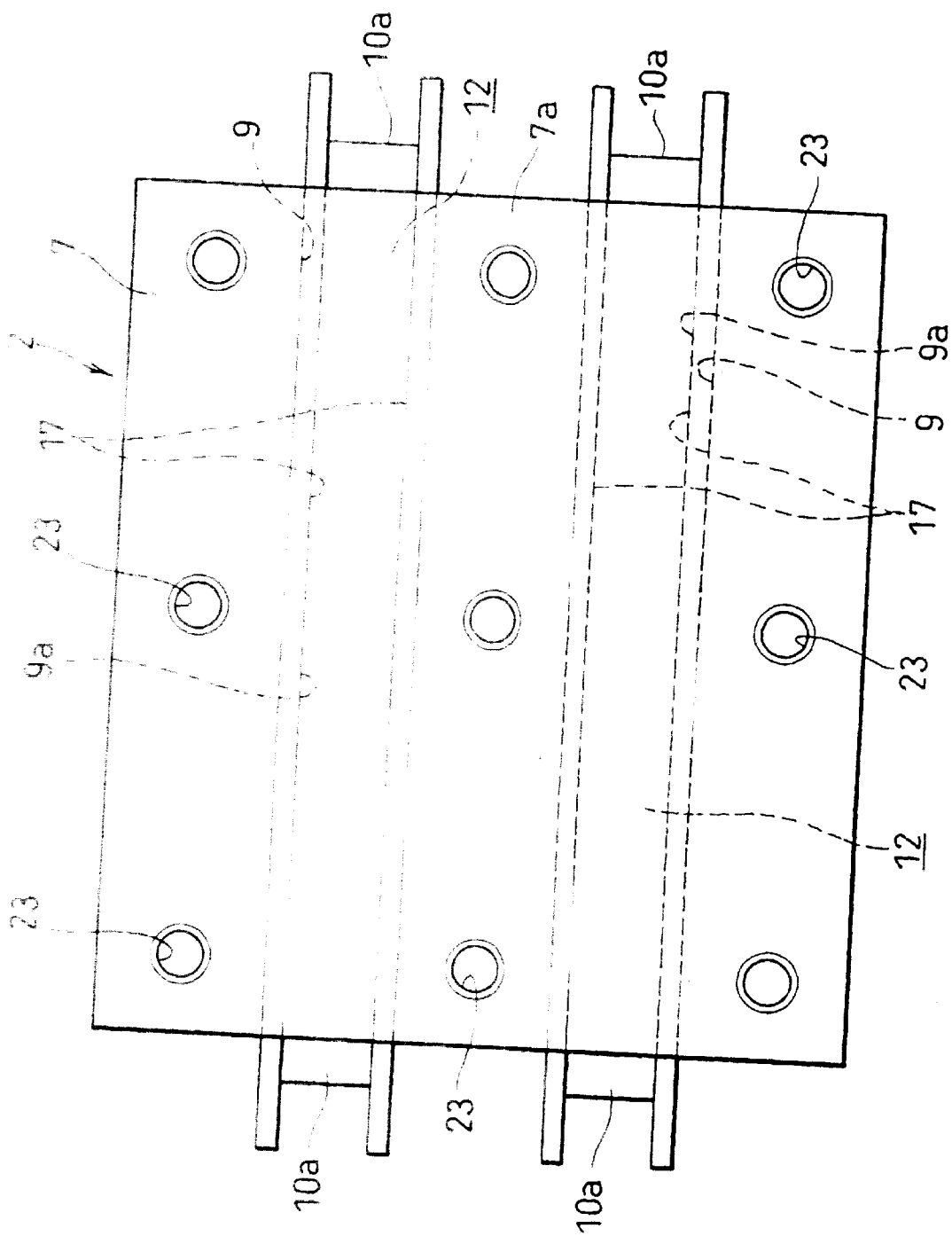
FIG. 3 is a plan view showing the main body of the slider shown in FIG. 1.
Figure 4:
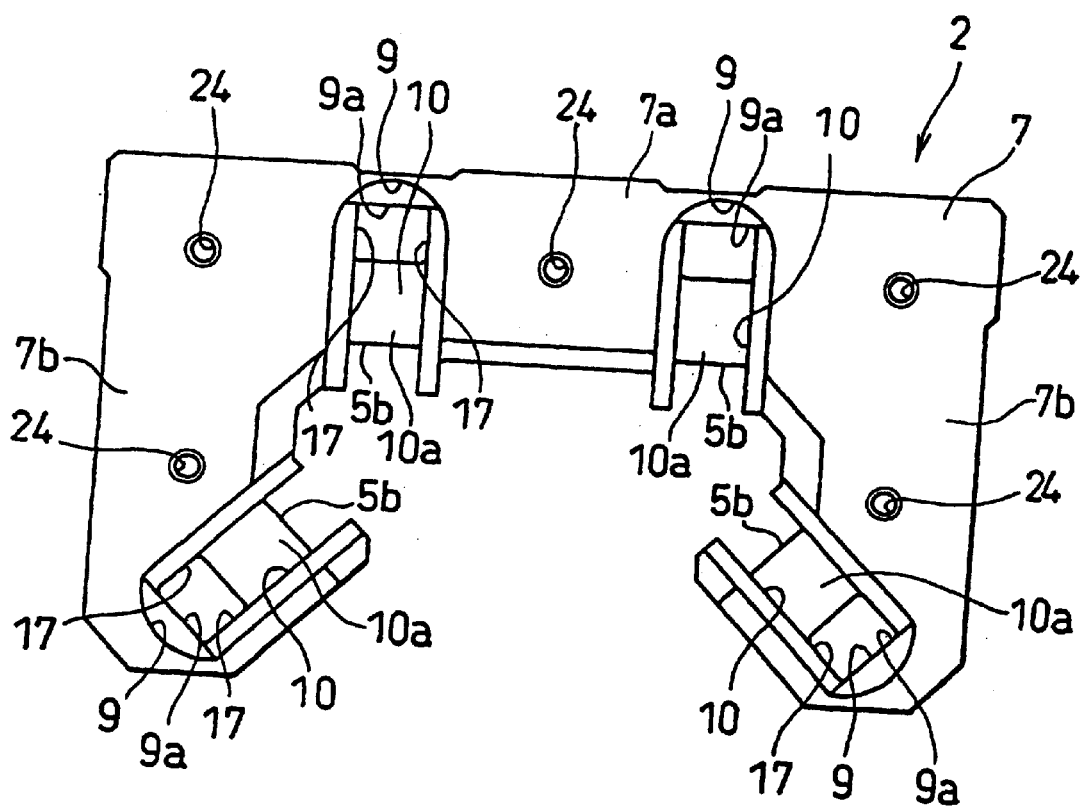
FIG. 4 is a side view showing the main body of FIG. 3.
Figure 5:
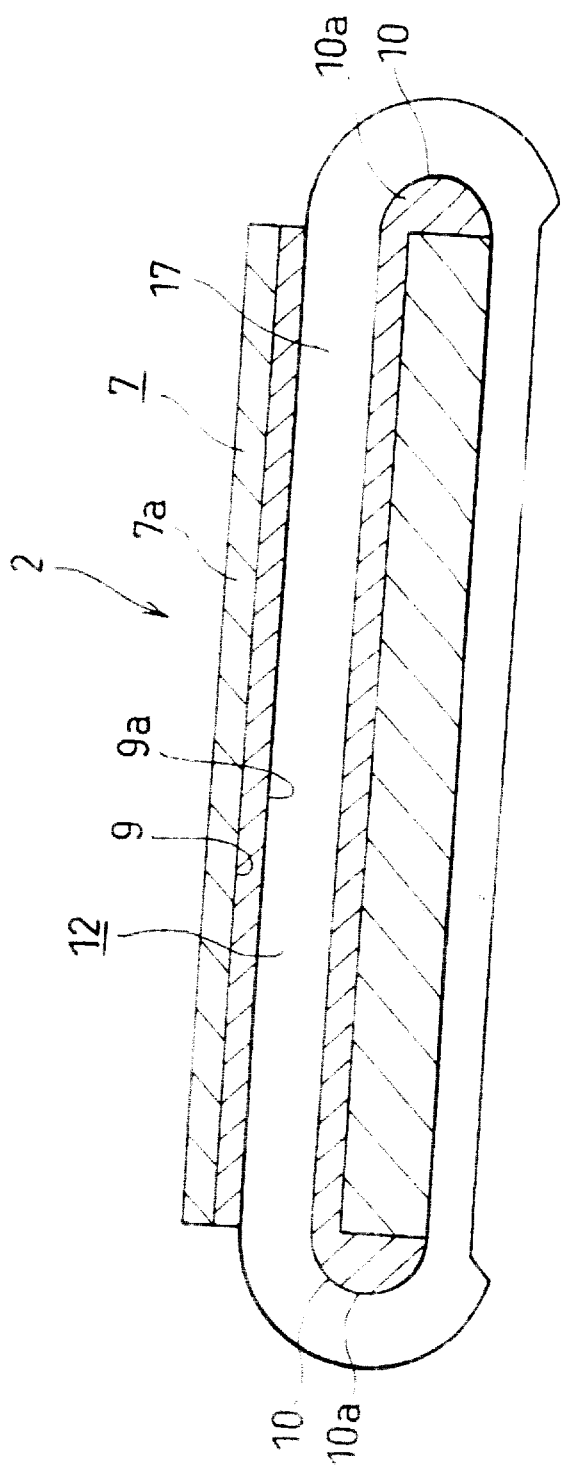
FIG. 5 is a longitudinal section view showing the path portion in the main body of FIG. 3.
Figure 6:
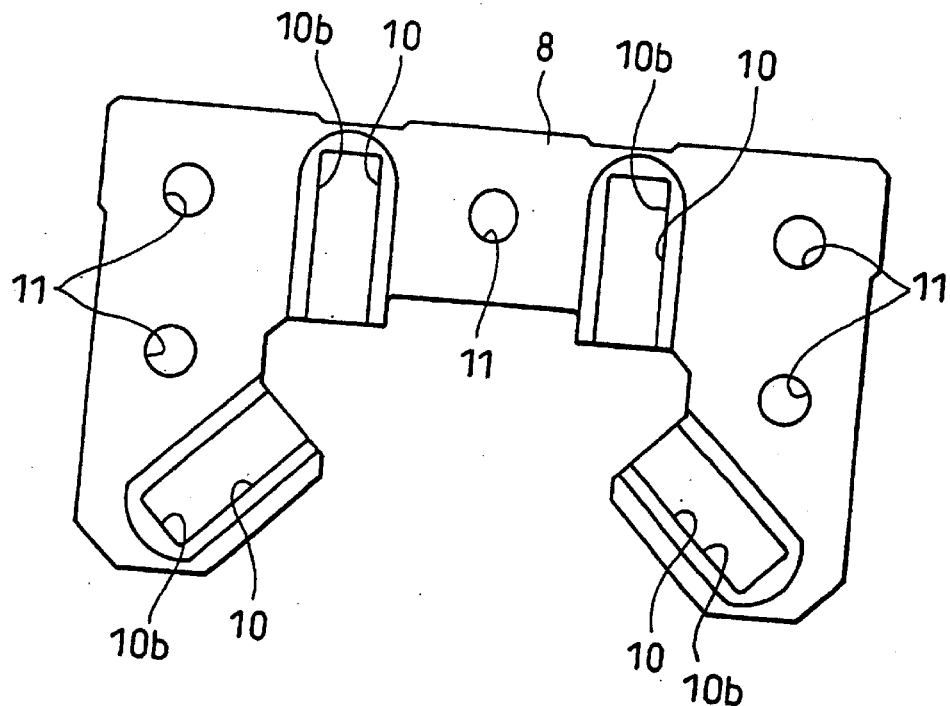
FIG. 6 is a front view showing the side covers on the slider of FIG. 1.
Figure 7:
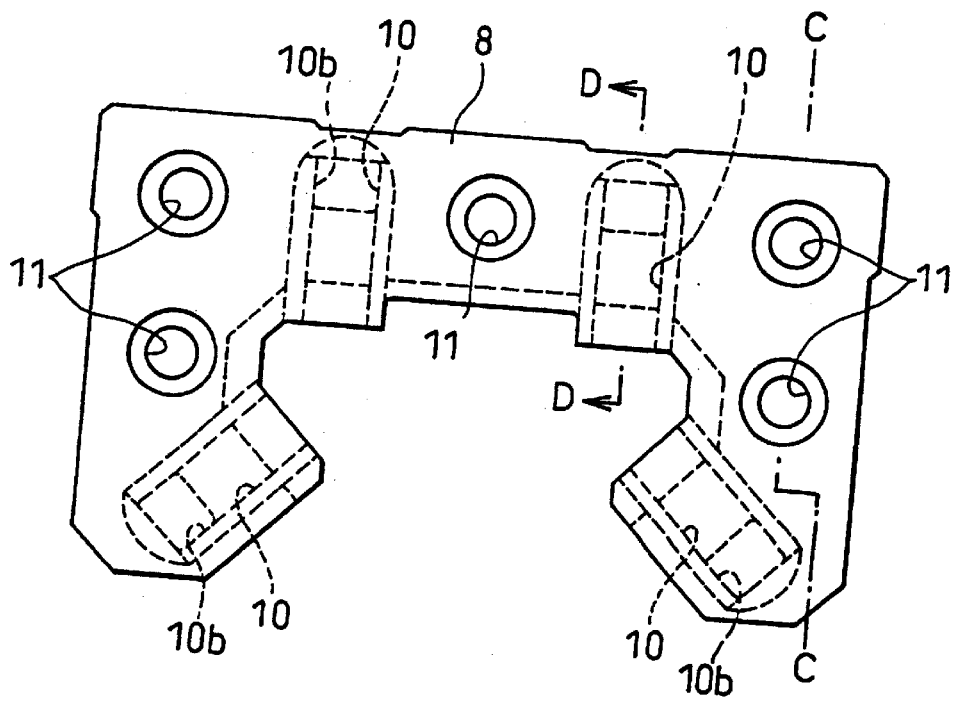
FIG. 7 is a back view showing the side covers of FIG. 6.
Figure 8:
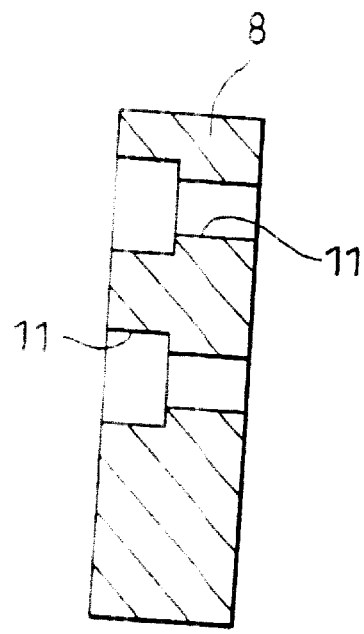
FIG. 8 is a cross-sectional view along the plane and in the direction indicated by arrows C in FIG. 7.
Figure 9:
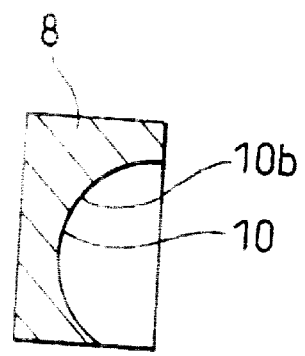
FIG. 9 is a cross-sectional view along the plane and in the direction indicated by the arrows D in FIG. 7.

Screw holes 23, shown in FIGS. 1–3 are formed in the top surface of the slider 2 for fixing a member such as a grinding device or a table to the top of the slider 2. Screw holes 24 are provided for attaching the side covers 8 to the main body 7.

As shown in FIGS. 6–9, the pair of side covers 8 are formed in the same shape as the ends of the main body 7. U-shaped change direction channel outer portions 10b are formed on the inner surfaces of the side covers 8 to complete the circulating path 12. Penetrating holes 11 are positioned opposite the screw holes 24, formed in the lengthwise ends of the main body 7 for fixing the side covers 8 to the main body 7. Accordingly, the side covers 8 are attached to the lengthwise end surfaces of the main body 7 and fixed to the main body 7 using bolts (not shown), inserted via the penetrating holes 11 and screwed into the screw holes 24. As described above, the main body 7 and the side cover 8 together form the slider 2.

Figure 10:
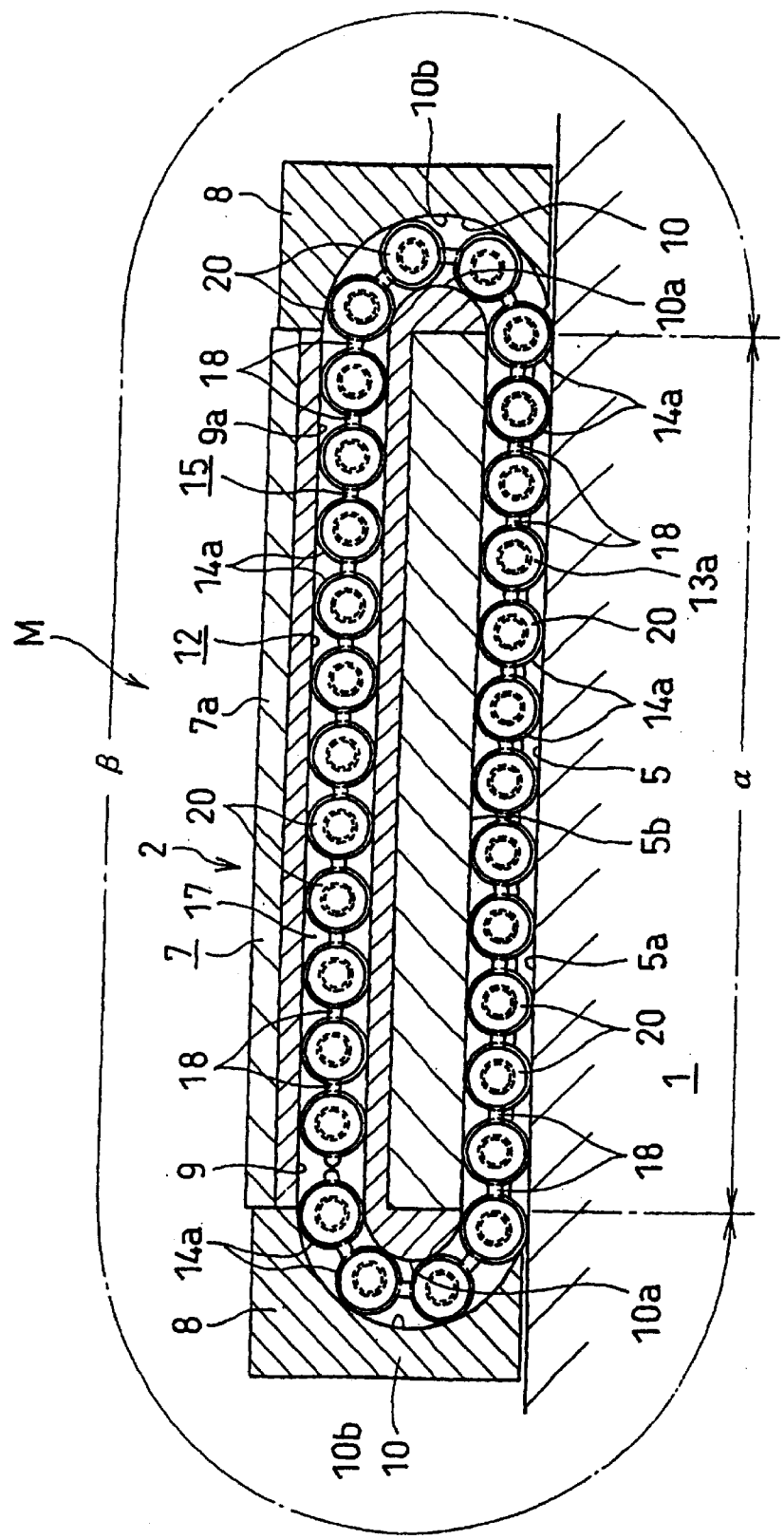
FIG. 10 is a cross-sectional view showing the structure of the path in FIG. 1.

As shown in FIGS. 1 and 2, when the slider 2 is mounted over the track rail 1, rolling channels 5 are formed by the rolling surfaces 5a and rolling surfaces 5b provided in the main body 7 and track rail 1. Together with the return channels 9a and U-shaped change direction channels 10 formed by the U-shaped change direction channel inner portions 10a and U-shaped change direction channel outer portions 10b, the rolling channels 5 complete the paths 12. As shown in FIG. 10, the rolling channel 5 forms the load-bearing region a of the path 12, while the return channel 9a and U-shaped change direction channels 10 form the load-free region β. As can be seen from FIG. 2, a total of four paths 12 are formed in the slider 2.

The roller trains 13a described below are integrated in the paths 12. In the present embodiment, as shown in FIGS. 10–13, two rows of the roller trains 13a are provided between the top surface of the track rail 1 and the lower surface of the horizontal portion 7a in the main body 7, while one row of the roller trains 13a is provided between each widthwise side surface of the track rail 1 and each inner side surface of the corresponding skirt portion 7b formed on the main body 7.

Figure 11:
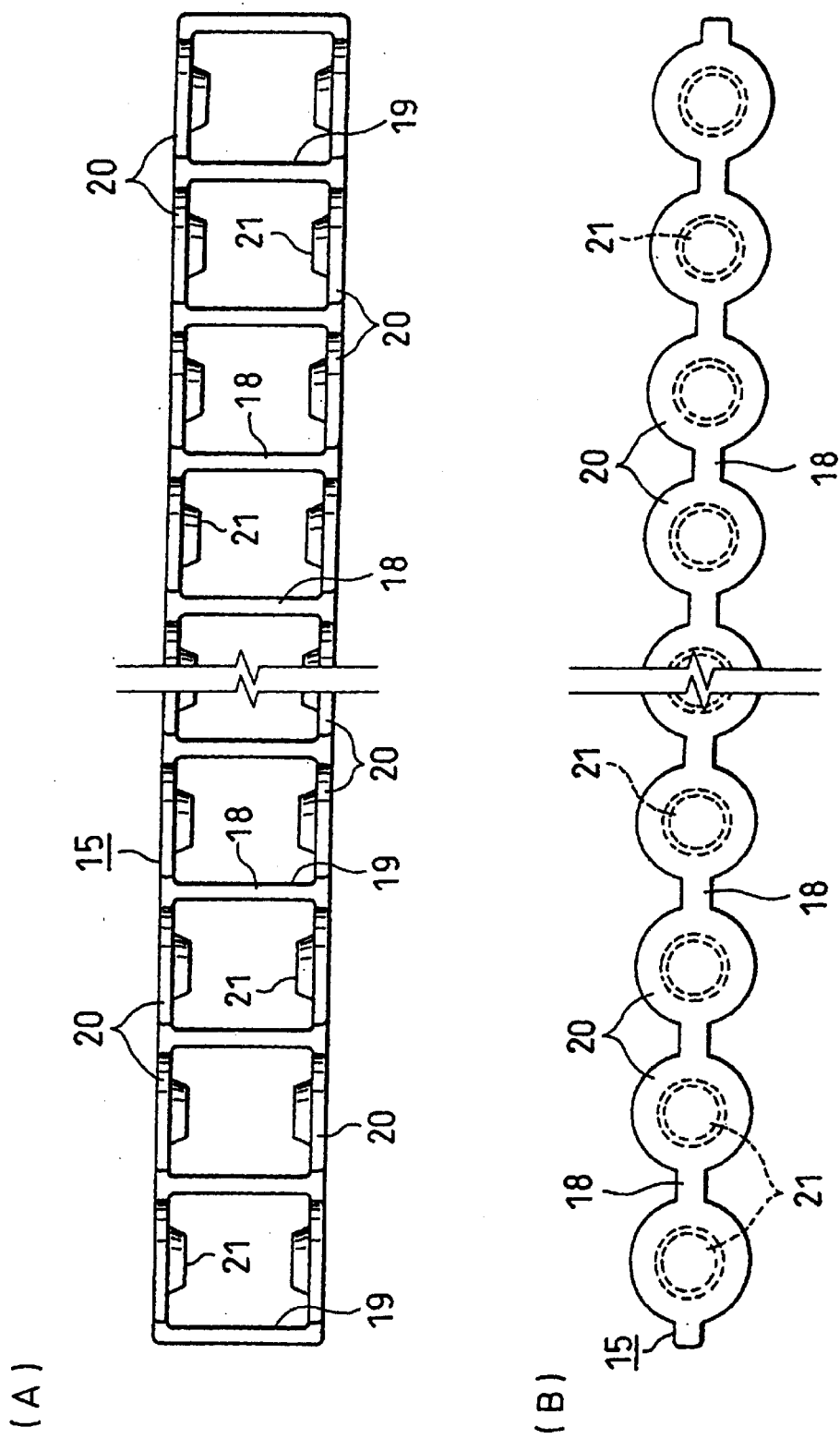
FIG. 11 shows the retaining member for the roller train in FIG. 10, wherein (A) is a plan view and (B) is a side view of the retaining member.
Figure 12:
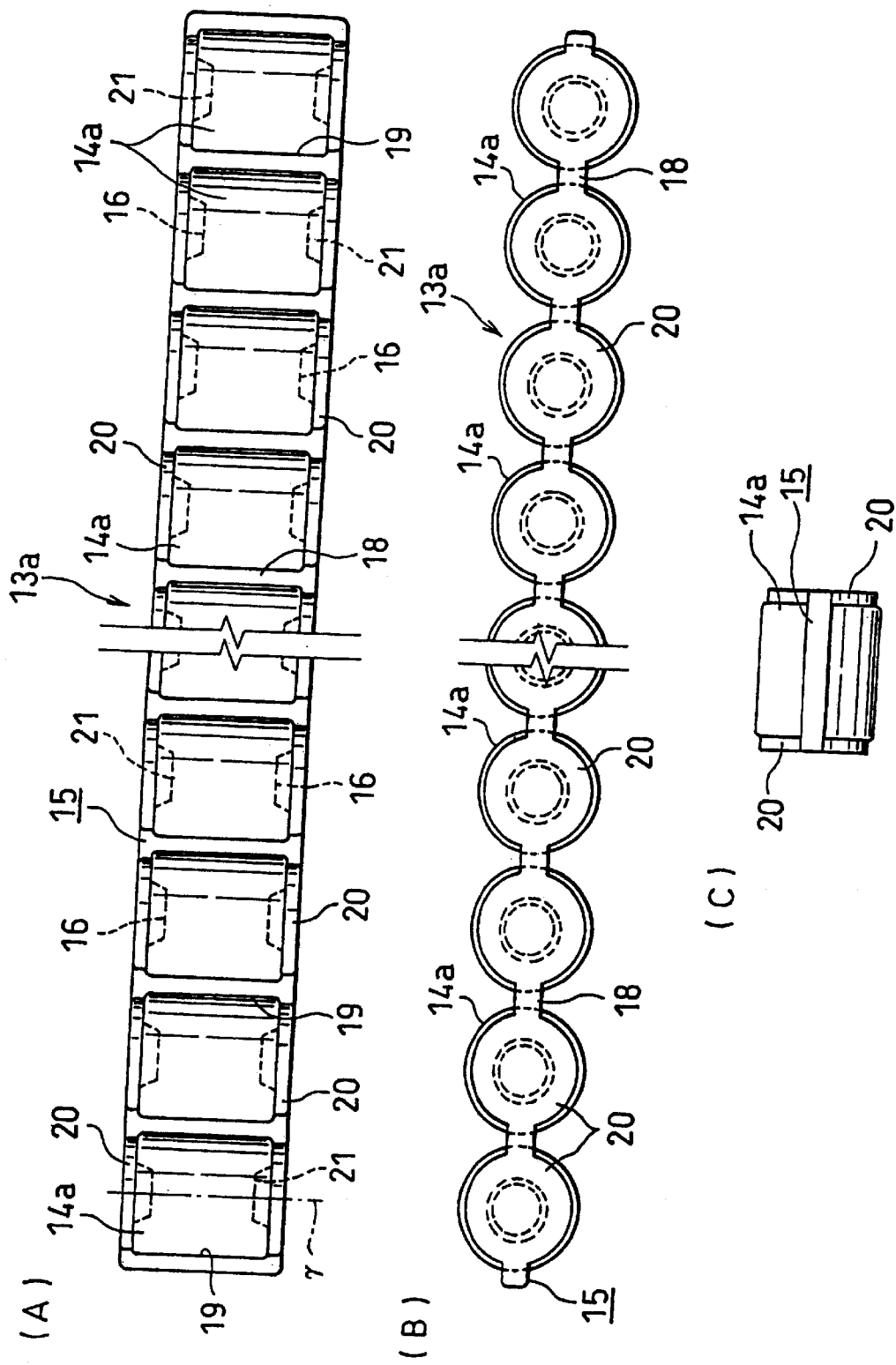
FIG. 12 shows the roller train in which the retaining member of FIG. 11 maintains rollers, wherein (A) is a plan view, (B) is a side view, and (C) is a front view of the roller train.
Figure 13:
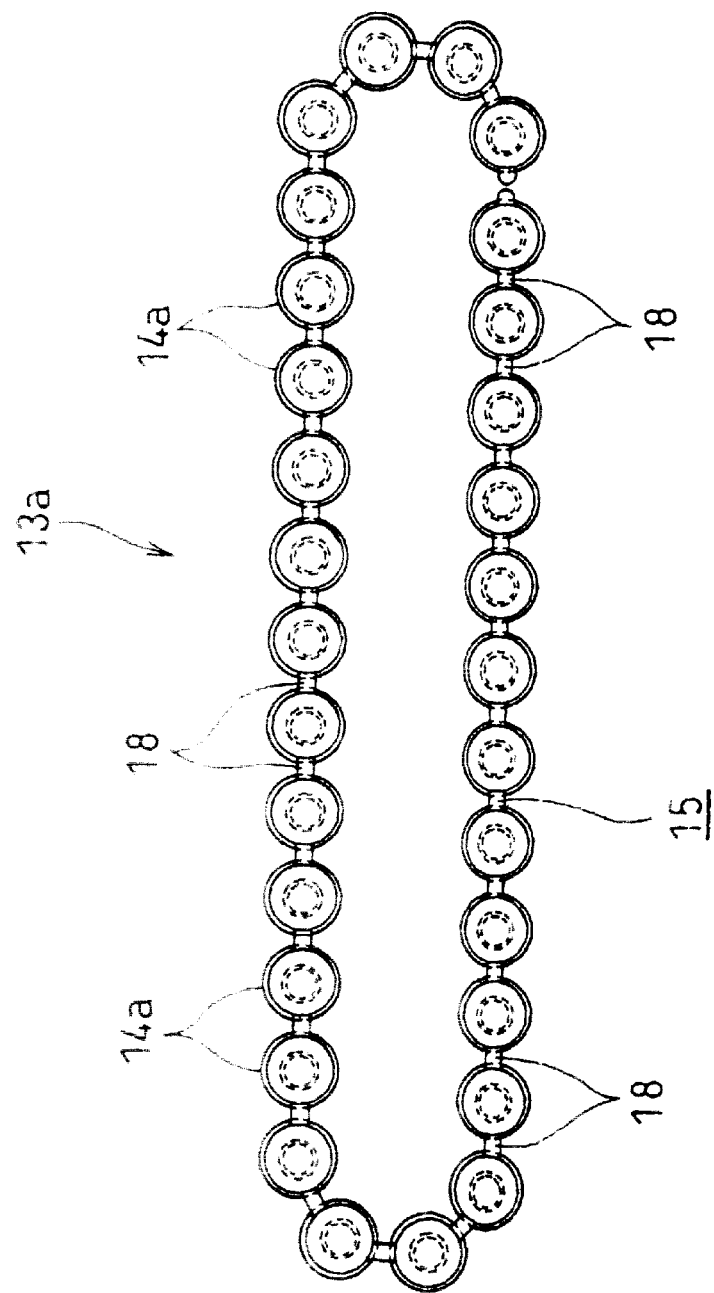
FIG. 13 is a side view showing the roller train of FIG. 12 in use.

As shown in FIGS. 11 and 12, the roller train 13a, according to the present embodiment, includes a plurality of cylindrical rollers 14a, and a retaining member 15 for retaining the rollers 14a. Both end faces of the rollers 14a are flat. Engaging depressions 16 are formed in the centers of these end faces.

The retaining member 15 is configured in a finite belt shape and comprises a plurality of spacers 18 arranged in a series with gaps formed between neighboring spacers 18; circular side plates 20 connecting like ends of the spacers 18 in the lengthwise direction (the up and down direction shown in FIGS. 11(A) and 12(A)) and serving as end face supports to support the left and right ends of the rollers 14a; and roller retaining holes 19 formed by neighboring pairs of spacers 18 and opposing pairs of side plates 20 connected to the spacers 18.

Engaging protrusions 21 are provided on the inside center portion of the side plates 20 at positions corresponding to the engaging depressions 16 and can detachably engage the engaging depressions 16. In this example, the engaging protrusions 21 are shaped like short shafts, however a variety of other shapes, such as a short cone shape are also possible. Obviously the engaging depressions 16 must be shaped to conform to the shape of the engaging protrusions 21.

The roller trains 13a are manufactured using a technique known as insert molding in which the rollers 14a are inserted into a formwork (not shown) and melted synthetic resin is injected into cavities formed in the formwork. This technique increases productivity by eliminating the process of integrating the rollers 14a in the retaining member 15, thereby simplifying production of the roller trains 13a.

In order for the rollers 14a to roll freely within the roller retaining holes 19 of the retaining member 15, a slight gap must be formed between the rollers 14a and the outer edge of the roller retaining holes 19. This gap is formed after completing the insert molding process by immersing the retaining member 15 (along with the integrally attached rollers 14a, of course) in oil or the like in order to expand the retaining member 15. Further, since the retaining member 15 has a belt shape with unconnected ends as described above, the roller train 13a can easily be mounted into the main body 7.

Side walls 17 formed in the path 12 function as guiding walls to guide the roller train 13a. The outer surface of the side plates 20 slide in contact with the side walls 17, when the roller train 13a is moved. Here the side plates 20 slide smoothly along the side walls 17, because both parts are constructed of synthetic resin, enabling the roller train 13a to move smoothly. Furthermore, both the side plates 20 and side walls 17 are flat surfaces that are easy to manufacture and, moreover, are capable of eliminating the problems in the advanced technique described above.

In the present embodiment, the rollers 14a employed in the roller trains 13a that are interposed between the top surface of the track rail 1 and the lower surface of the horizontal portion 7a have a contact angle of about 90 degrees to the horizontal.

The rollers 14a employed in the roller trains 13a that are interposed between the widthwise side surfaces of the track rail 1 and the inner side surfaces of the skirt portion 7b have a contact angle of about 30 degrees down from the horizontal. These contact angles enable the linear motion guide apparatus M of the present embodiment to sufficiently support the downward load applied on the slider 2. These contact angles can be adjusted to suit the amount of load being supported.

In the linear motion guide apparatus M, according to the embodiment described above, the roller train 13a employed in the linear motion guide apparatus M not only enable the rollers 14a to transfer smoothly from the load-free region β to the load-bearing region α, but also substantially prevent skew in the rollers 14a. That is, the retaining member 15 provided to maintain the rollers 14a at prescribed intervals in the roller train 13a prevents neighboring rollers 14a from contacting each other, thereby suppressing noise caused by contact between neighboring rollers 14a and preventing the rapid progression of wear in the same.

By maintaining each of the rollers 14a in a separate roller retaining hole 19, the central axes of the rollers 14a can be maintained parallel to one another, enabling the rollers 14a to roll smoothly from the load-free region β to the load-bearing region a while maintaining the prescribed interval between rollers 14a. Although the rollers 14a have a tendency to jam when entering the load-bearing region α from the load-free region β due to an increase in resistance, the rolling movement of the rollers 14a already positioned in the load-bearing region α pull the other rollers 14a into the load-bearing region α via the retaining member 15. Hence, the roller linkage 13a circulates smoothly in the path 12.

The fact that the rollers 14a roll in a direction orthogonal to their central axis is important for preventing the rollers 14a from skewing. In the example of the present embodiment, the pair of side plates 20 functions to prevent wavering in the axes of the rollers 14a. Since the flat side surfaces formed on the rollers 14a roll or slide in contact with the flat inner side surfaces of the side plates 20, the side plates 20 maintain the rotational axis γ of the rollers 14a orthogonal to the direction in which the rollers 14a progress.

The orientation of the rollers 14a is also maintained by the engagement between the engaging depressions 16 provided on the rollers 14a and the engaging protrusions 21 provided on the side plates 20, thereby substantially preventing skewing. Due to the existence of this pair of side plates 20 and the engagement of the engaging protrusions 21 with the engaging depressions 16, the rollers 14a can retain a correct orientation when moving. As a result, the rollers 14a can move through the path 12 in a direction orthogonal to the central axis of the rollers 14a. Hence, skewing of the rollers 14a is reliably prevented.

A particular feature of the present embodiment is that the side plates 20 are disc shaped and have a major diameter slightly smaller than that of the end surfaces on the rollers 14a. Accordingly, nearly the entire end surface of the rollers 14a slide in contact with the side plates 20, substantially reducing wavering in the rotational axis of the rollers 14a.

There are no particular restrictions in size and shape of the side plates 20 provided the side plates 20 contact at least the outer peripheral portion on the end surface of the rollers 14a. With consideration given to productivity, however, a disc shaped side plate 20 as shown in the drawing should have an area between about 80 and 95% of the end surface area of the rollers 14a.

When manufacturing the roller train 13a using the insert molding process, the concave surfaces of the spacers 18 opposing the side surfaces of the rollers 14a are formed to have approximately the same curvature as that of the side surfaces of the rollers 14a. In other words, the concave surfaces of the spacers 18 cover the side surfaces of the rollers 14a with a slight gap therebetween. Accordingly, the spacers 18 can also prevent the rollers 14a from wavering on their axes. Here, curvature is intended to mean the inverse of a radius at a given point on the curved line, forming a circle that most resembles the curved line. The side surface of the roller 14a has a convex curvature, while the side surface of the spacer 18 is concave. However the phrase "having approximately the same curvature" used in the present embodiment is intended to mean that the curvature of the convex surface is approximately equal to the curvature of the concave surface such that the concave surface envelops the convex surface.

In the roller train 13a of the present invention, skew can be reliably prevented by the side plates 20 and spacers 18, coupled with the skew-preventing function of the engagement between the engaging depressions 16 and engaging protrusions 21.

The rollers 14a are prevented from falling out of the retaining member 15 by the engagement of the engaging protrusions 21 formed on the inner surface of the side plates 20 and the engaging depressions 16 formed on the end surfaces of the rollers 14a, as well as by the curved surfaces of the spacers 18. Hence the rollers 14a are reliably prevented from falling out of the retaining member 15 when the slider 2 is pulled off of the track rail 1.

When the roller train 13a circulates through the path 12, the side plates 20 slide in contact with and are guided by the side walls 17 on both sides of the path 12. Since both the side plates 20 and the side walls 17 are constructed of a slick synthetic resin, the side plates 20 slide smoothly over the side walls 17, enabling the smooth movement of the entire roller train 13a and contributing to the prevention of skew in the rollers 14a. Moreover, when moving through the path 12, the outer surfaces of the side plates 20 slide in contact with the side wall portions of both the U-shaped change direction channels 10 and the return channel 9a of the path 12. In addition, the outer side surfaces of the side plates 20 and the side walls 17 are both flat surfaces and therefore easy to manufacture.

Further, the large area of contact between the side plates 20 and the side walls 17 suppresses any wavering of the retaining member 15 itself in the direction of progression, thereby preventing skew in the rollers.

The rollers 14a have a tendency to be drawn toward the inner side of the U-shaped change direction channels 10 when passing through the same, causing the internal sides of the spacers 18 to forcefully contact the side surfaces of the rollers 14a and generating gaps between the external sides of the spacers 18 and the side surfaces of the rollers 14a. Hence the spacers 18 alone cannot maintain the orientation of the rollers 14a. However, since the end surfaces of the rollers 14a contact the inner surfaces of the side plates 20 and the engaging depressions 16 are engaged with the engaging protrusions 21, the rollers 14a are maintained in a correct orientation such that the rotational axis γ of the rollers 14a is orthogonal to the direction of movement, thereby preventing skew in the rollers 14a.

As the rollers 14a roll or slide through the path 12, the retaining member 15 corrects the orientation of the 14a as described above. Further, the rollers 14a guide the retaining member 15, because the end surfaces of the rollers 14a slide in contact with the inner surfaces of the side plates 20. Hence the rollers 14a and the retaining member 15 encourage each other to move in a correct orientation. For this reason, wavering of the rollers 14a or the retaining member 15 that lead to skewing of the rollers 14a can be prevented, enabling the roller train 13a to circulate smoothly through the path 12.

A lubricant is introduced between parts of the rollers 14a and the retaining member 15 that come in contact with each other. The lubricant is maintained for circulation at grease points between the spacer 18 of the retaining member 15 and rollers 14a that neighbor each other over the spacers 18. This configuration not only reduces friction between the rollers 14a, but can also improve the ability of the device to retain lubricant and therefore increase the durability of the entire roller train 13a. By manufacturing the retaining member 15 with a flexible and slick material and by using lubricant, it is possible to prevent an increase in frictional resistance between the rollers 14a, thereby enabling the entire roller train 13a to move smoothly.

Figure 14:
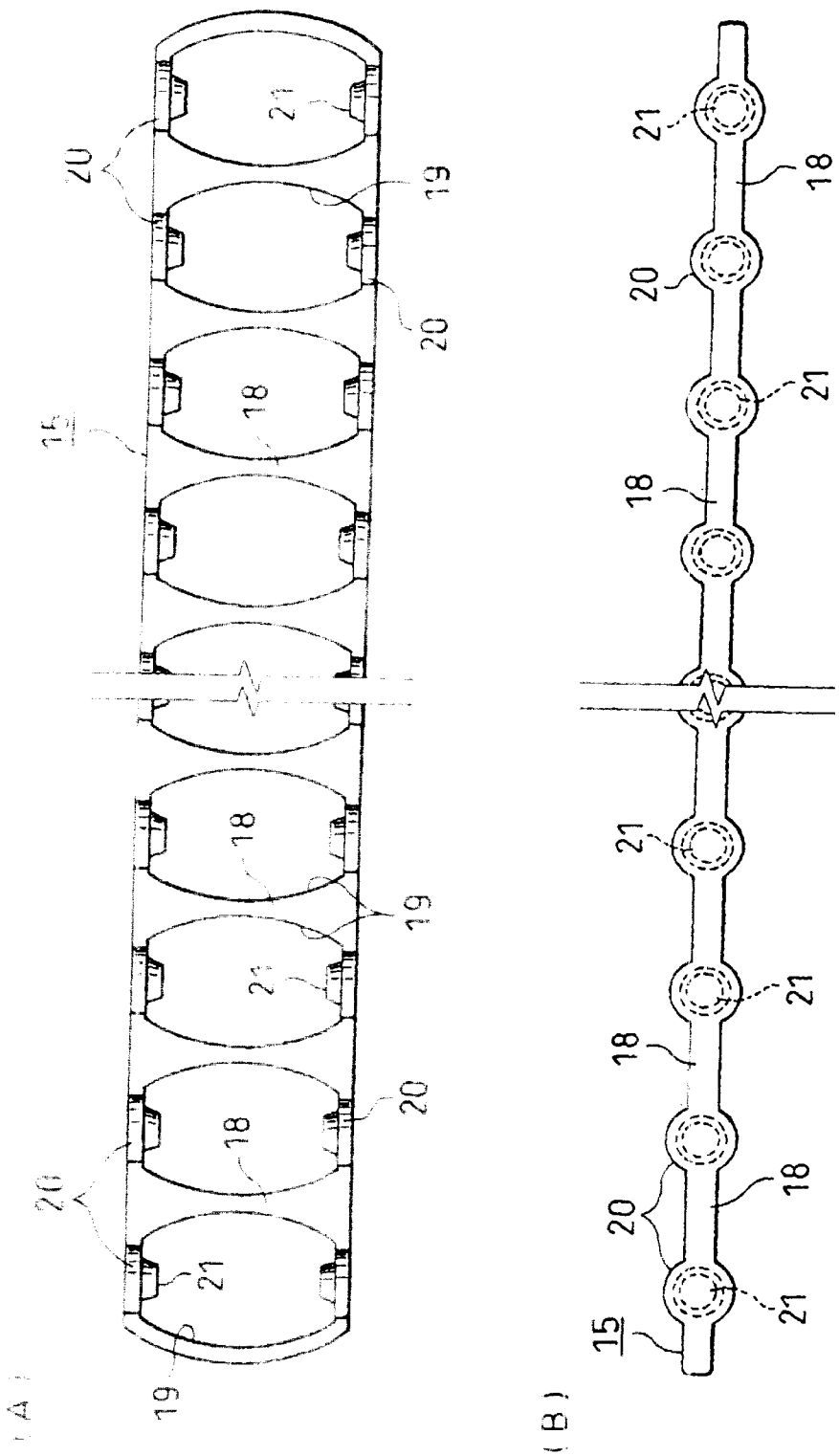
FIG. 14 shows a retaining member for a roller train according to variation 11 of the first embodiment, wherein (A) is a plan view and (B) is a side view of the retaining member.
Figure 15:
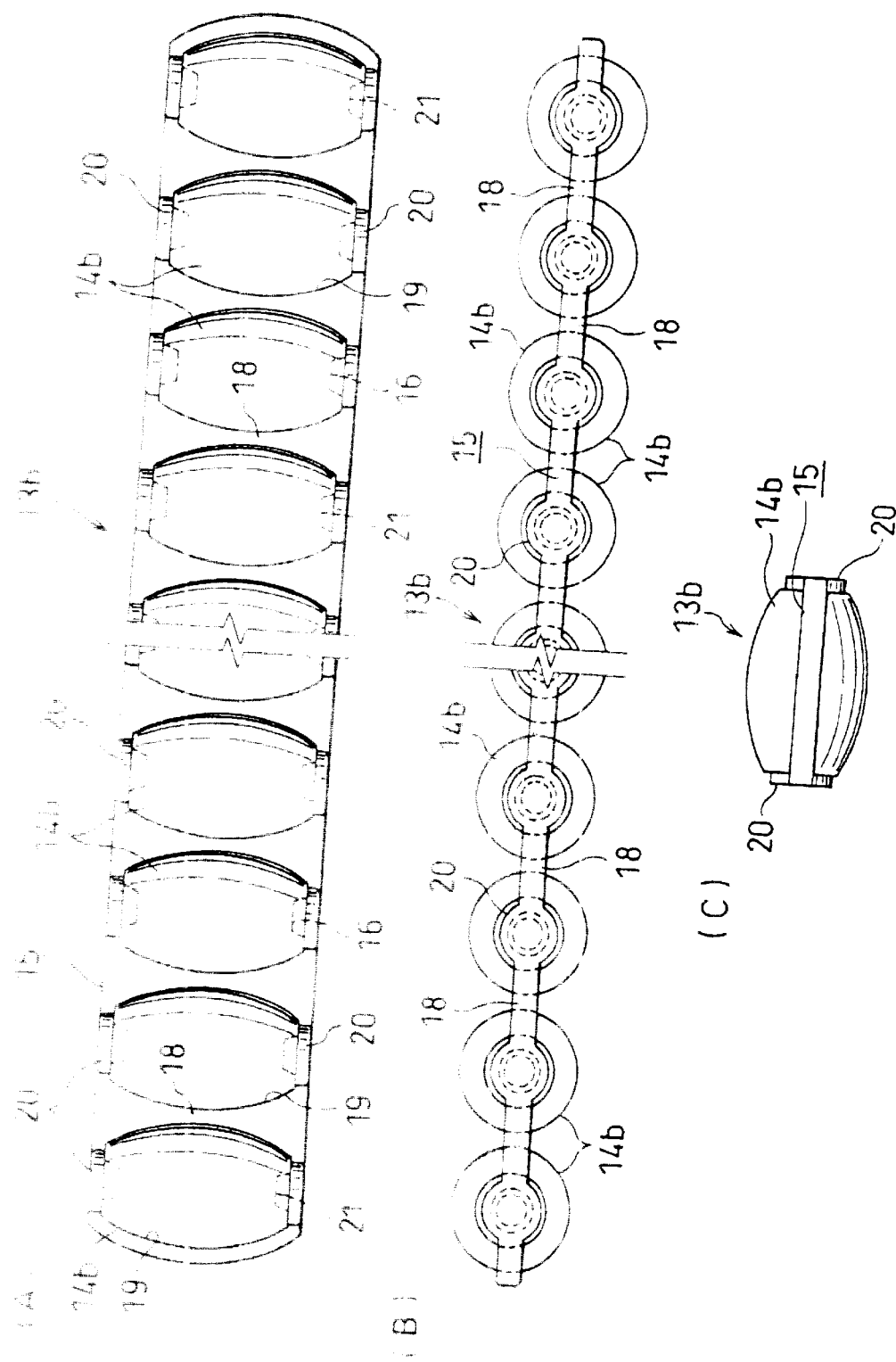
FIG. 15 shows the roller train in which rollers are maintained in the retaining member of FIG. 14, wherein (A) is a plan view, (B) is a side view, and (C) is a front view of the roller train.
Figure 16:
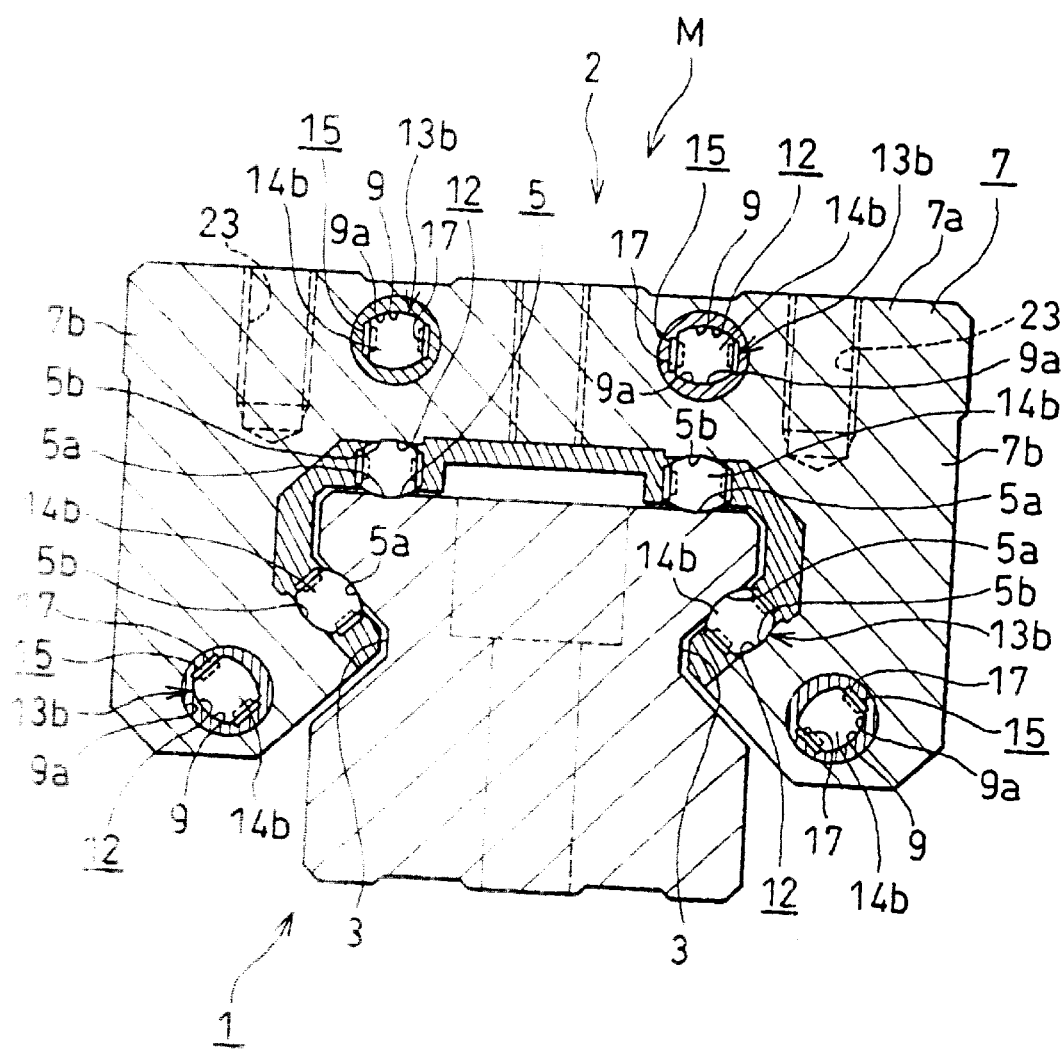
FIG. 16 is a cross-sectional view, corresponding to the section indicated by the arrows A in FIG. 1, of the linear motion guide apparatus using the roller train of FIG. 15.

Next variation 1-1 of the linear motion guide apparatus according to the first embodiment will be described with reference to FIGS. 14–16. In variation 1-1, a roller train 13b employs spherical rollers 14b in place of the cylindrical rollers 14a used in the first embodiment described above. As shown in the diagrams, each roller 14b is shaped like a barrel, the center portion of which is swollen into a circular arc. In addition to employing the rollers 14b in the present variation, the rolling channel 5, U-shaped change direction channels 10, and return channel 9a that make up the path 12 are formed with depressions that conform to the outer shape of the rollers 14b. This construction has the effect of enabling the roller 14b to adjust itself so that a line across the entire rolling surface of the rollers 14b contacts the path 12, even when the path 12 is formed imperfectly, the slider is not mounted completely parallel on the track rail, or a heavy load placed on the linear motion guide apparatus generates torsion or deformation. Accordingly, with this construction, the linear motion guide apparatus is capable of supporting weight and moving smoothly, extending the life of the rollers. Further, with the self-adjustment effect of the rollers 14b, the rolling surface need not be formed with a high degree of accuracy, thereby facilitating its production. The remaining construction of the linear motion guide apparatus, as well as its operations and effects, are the same as those described in the first embodiment. Therefore, these descriptions will be omitted here. Also, the same part numbers used in the first embodiment are used for like parts in this variation.

Figure 55:
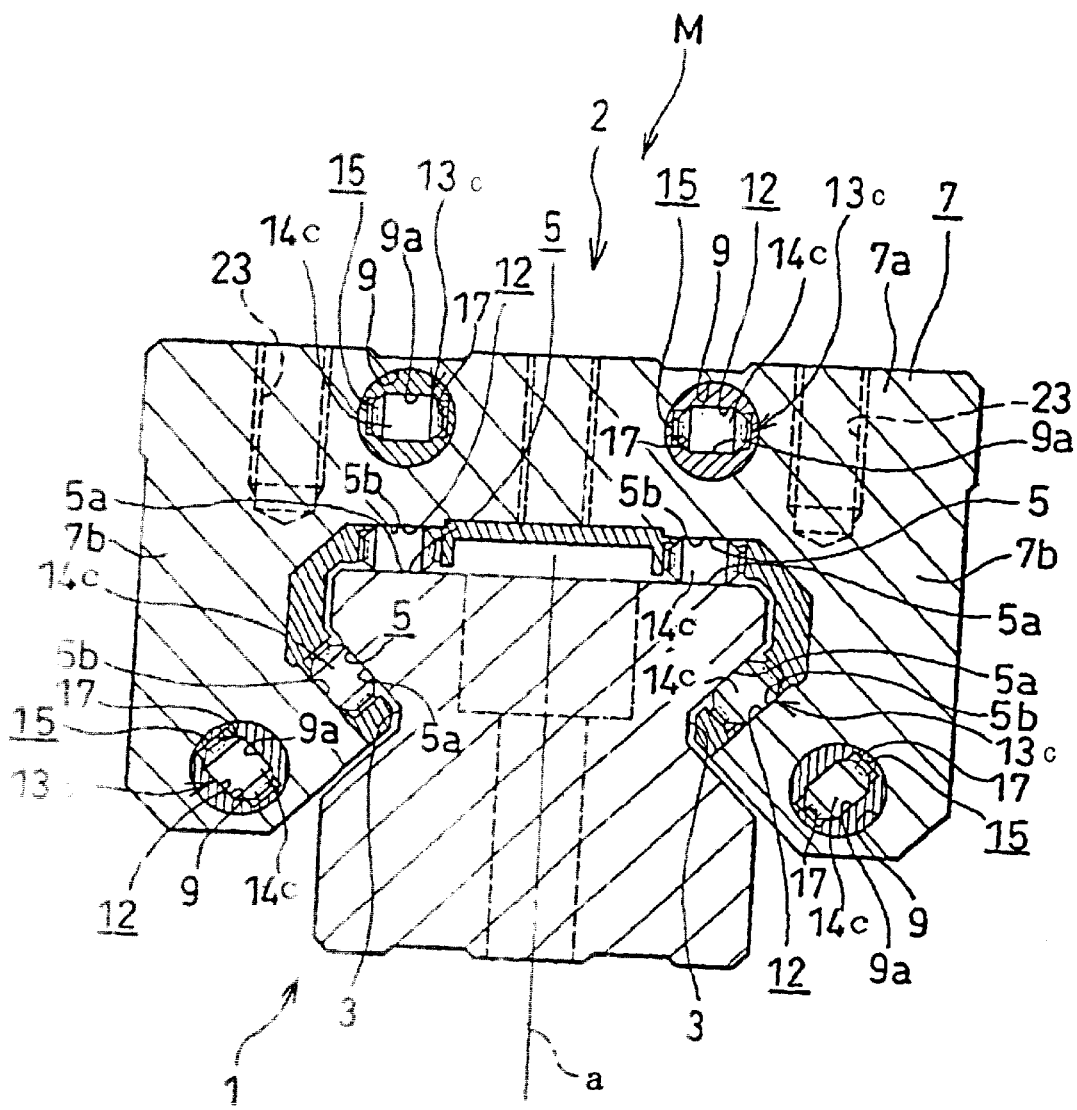
FIG. 55 is a cross-sectional view, corresponding to the section indicated by the arrows A in FIG. 1, showing the linear motion guide apparatus employing the roller train according to variation 1-2 of the first embodiment.

Next, variation 1-2 of the first embodiment will be described with reference to FIG. 55. In the present variation, a roller train 13c employs chamfered cylindrical rollers 14c having tapered ends such that the diameter of both ends grows smaller toward the tip.

Figure 18:
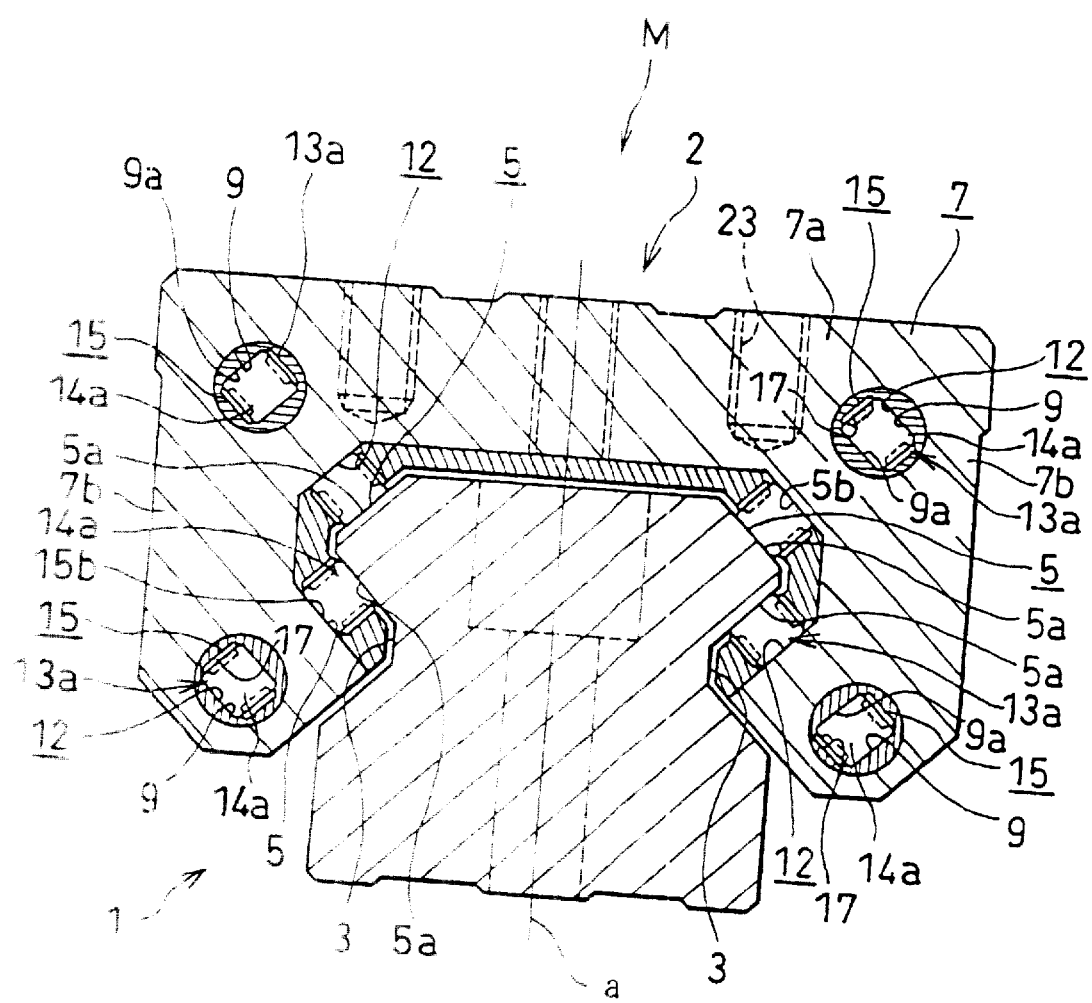
FIG. 18 is a cross-sectional view, corresponding to the section indicated by the arrows A in FIG. 1, showing the linear motion guide apparatus according to variation 1-3 of the first embodiment.

Next, variation 1-3 of the first embodiment will be described with reference to FIG. 18. In the present variation, two rows of the roller train 13a are mounted one above the other between both widthwise side surfaces of the track rail 1 and the inner side surfaces of the skirt portion 7b formed on the main body 7, for a total of four rows of roller train 13a. The contact angles for the rollers 14a integrated in each roller train 13a can be set as follows. The contact angle for the rollers 14a integrated in the roller train 13a positioned on top should be slanted upward about 45 degrees from the horizontal and toward the skirt portion 7b. The contact angle for the rollers 14a integrated in the bottom roller train 13a should be slanted downward about 45 degrees from the horizontal. With this construction, the linear motion guide apparatus can support loads applied in the downward or horizontal directions equally, evening out the slide resistance and enabling the apparatus to move even more smoothly.

Figure 19:
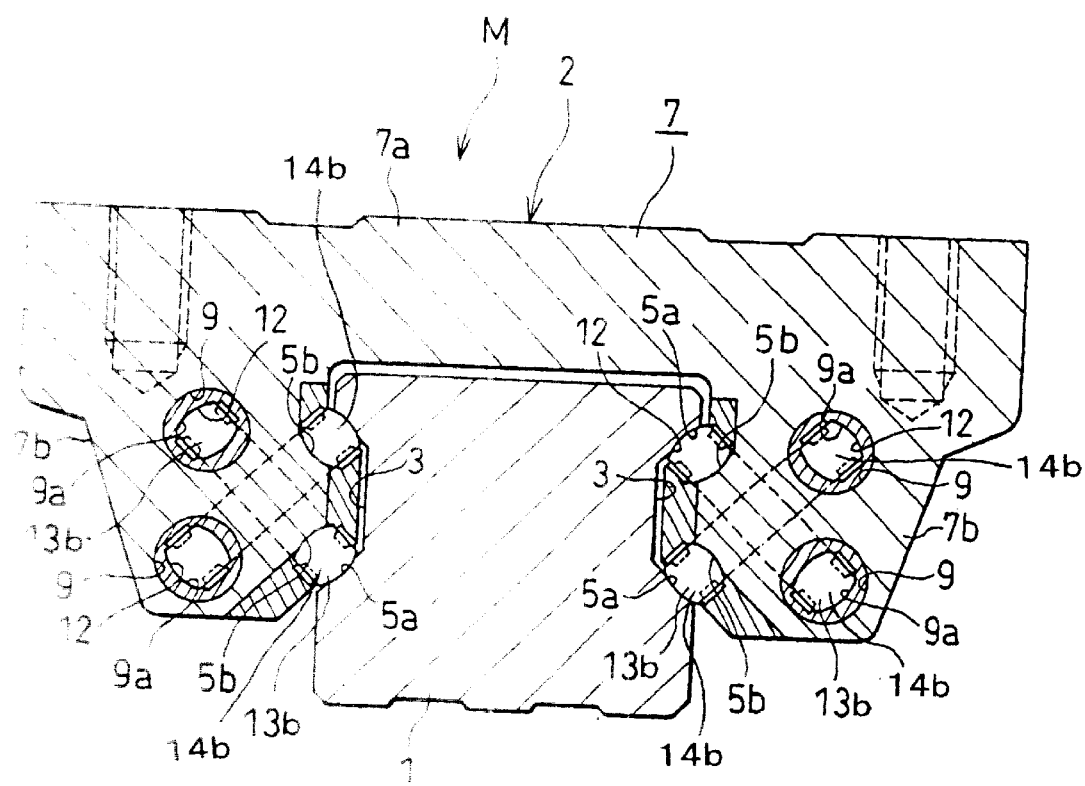
FIG. 19 is a cross-sectional view, corresponding to the section indicated by the arrows A in FIG. 1, showing the linear motion guide apparatus according to variation 1-4 of the first embodiment.

Next, variation 1-4 of the first embodiment will be described with reference to FIG. 19. In the present variation, two rows of the roller train 13b are mounted one above the other between both widthwise side surfaces of the track rail 1 and the inner side surfaces of the skirt portion 7b formed on the main body 7, for a total of four rows of the roller train 13b. The contact angles for the rollers 14b integrated in each roller train 13b can be set as follows. The contact angle for the rollers 14b integrated in the roller train 13b positioned on top should be slanted downward about 45 degrees from the horizontal and toward the skirt portion 7b. The contact angle for the rollers 14b integrated in the bottom roller train 13b should be slanted upward about 45 degrees from the horizontal. With this construction, as with the construction of the variation 1-3 of the first embodiment described above, the linear motion guide apparatus can support loads applied in the downward or horizontal directions equally, evening out the slide resistance and enabling the apparatus to move even more smoothly.

In variations to the first embodiment 1-3 and 1-4 described above, the contact angles for the rollers can be adjusted to suit the amount of weight being supported. Also, in the first embodiment and its variations 1-1 through 1-4, the number and mounted position of the roller train 13a, roller train 13b, or roller train 13c can obviously be adjusted to adapt to the size of the load and shape of the apparatus being supported.

Figure 20:
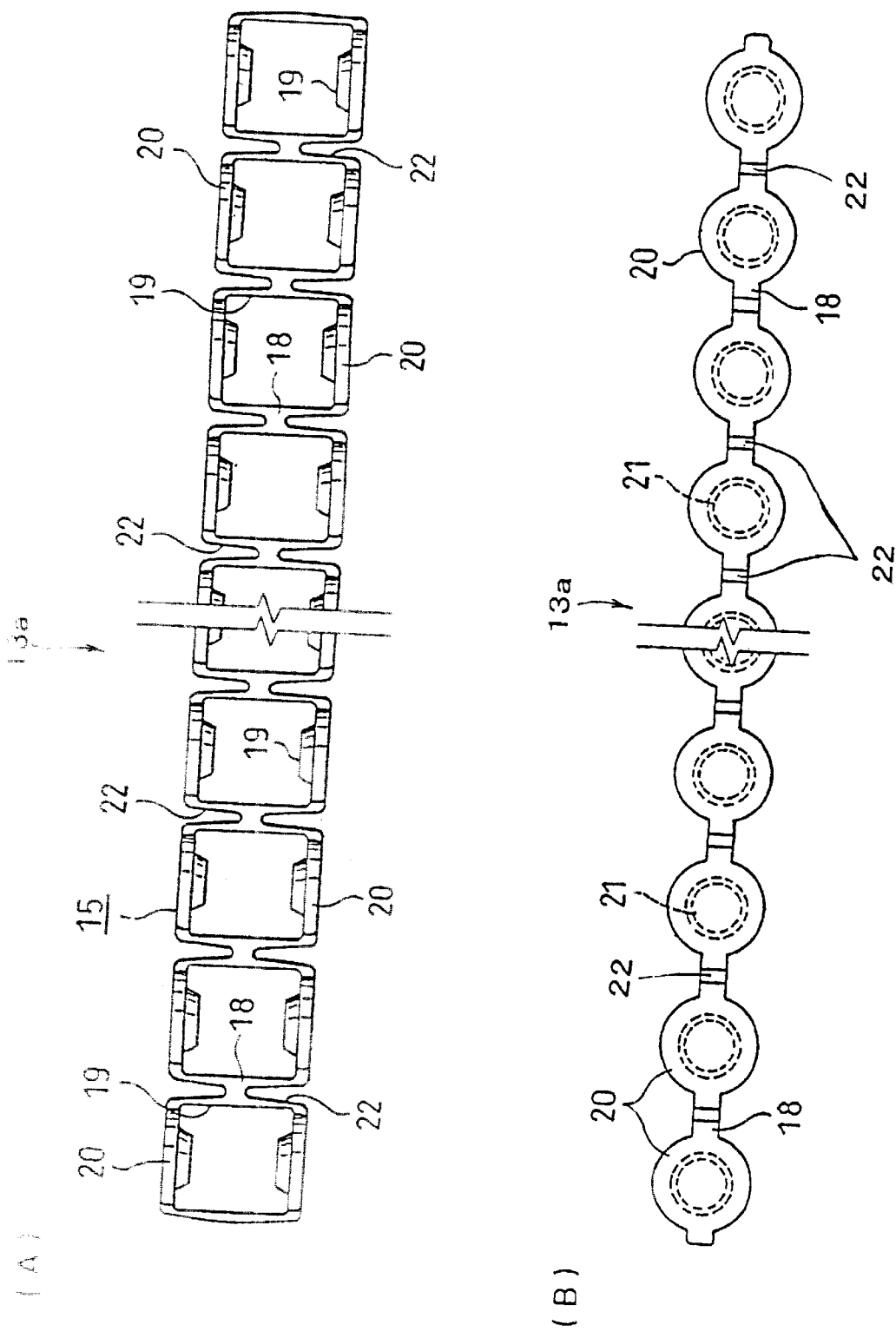
FIG. 20 shows a retaining member for a roller train according to variation 15 of the first embodiment, wherein (A) is a plan view and (B) is a side view of the retaining member.

Next, variation 1-5 of the first embodiment will be described with reference to FIGS. 20 and 21. In the roller train 13a, according to the present variation, constricting portions 22 are formed in both widthwise ends (up and down in FIGS. 20(A) and 21(A), and front and back in FIGS. 20(B) and 21(B)) of the spacers 18, from the end edges toward the center. With this construction, the retaining member 15 can bend orthogonally to the direction in which the roller linkage 13a is moving (up and down in FIGS. 20 and 21) an amount based on the depth of the cutout portion in the constricting portions 22.

For example, when the direction of the U-shaped change direction channel 10 differs from the direction of the contact angle of the rollers 14a, the U-shaped change direction channel 10, leading from the return channel 9a to the rolling channel 5 or from the rolling channel 5 to the return channel 9a, is slightly awry from the direction orthogonal to the direction in which the rollers 14a is progressing. Accordingly, the central axis (of the roller is forced to tilt according to the amount of bend. However, the constricting portions 22 provided in the present variation enable the roller train 13a to move smoothly, even through parts of the path 12 in which the roller train 13a must bend slightly orthogonal to the direction of progression. This construction increases the freedom in choosing the position of the return channels 9a, enabling the shape of the slider 2 to be freely set according to its intended use. The remaining construction of the linear motion guide apparatus, as well as its operations and effects, are the same as those described in the first embodiment. Therefore, these descriptions will be omitted here. Also, the same part numbers used in the first embodiment are used for like parts in this variation.

Figure 22:
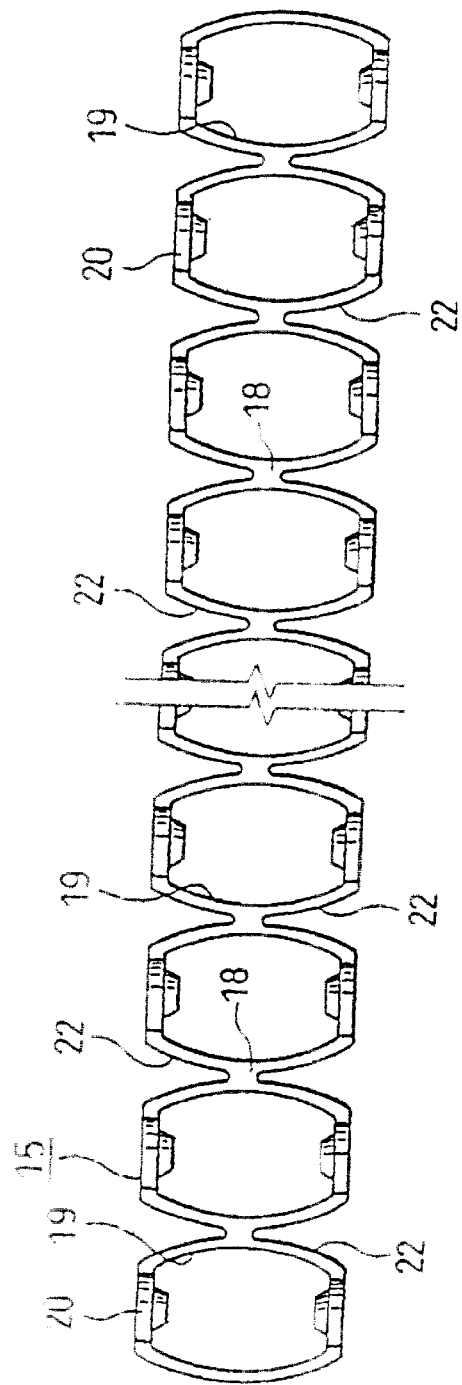
FIG. 22 shows a retaining member for a roller train according to variation 1-6 of the first embodiment, wherein (A) is a plan view and (B) is a side view of the retaining member.
Figure 22:
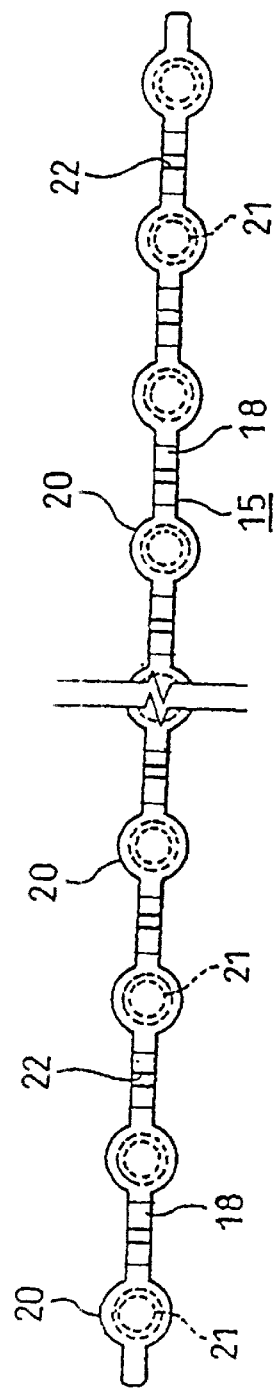
Figure 23:
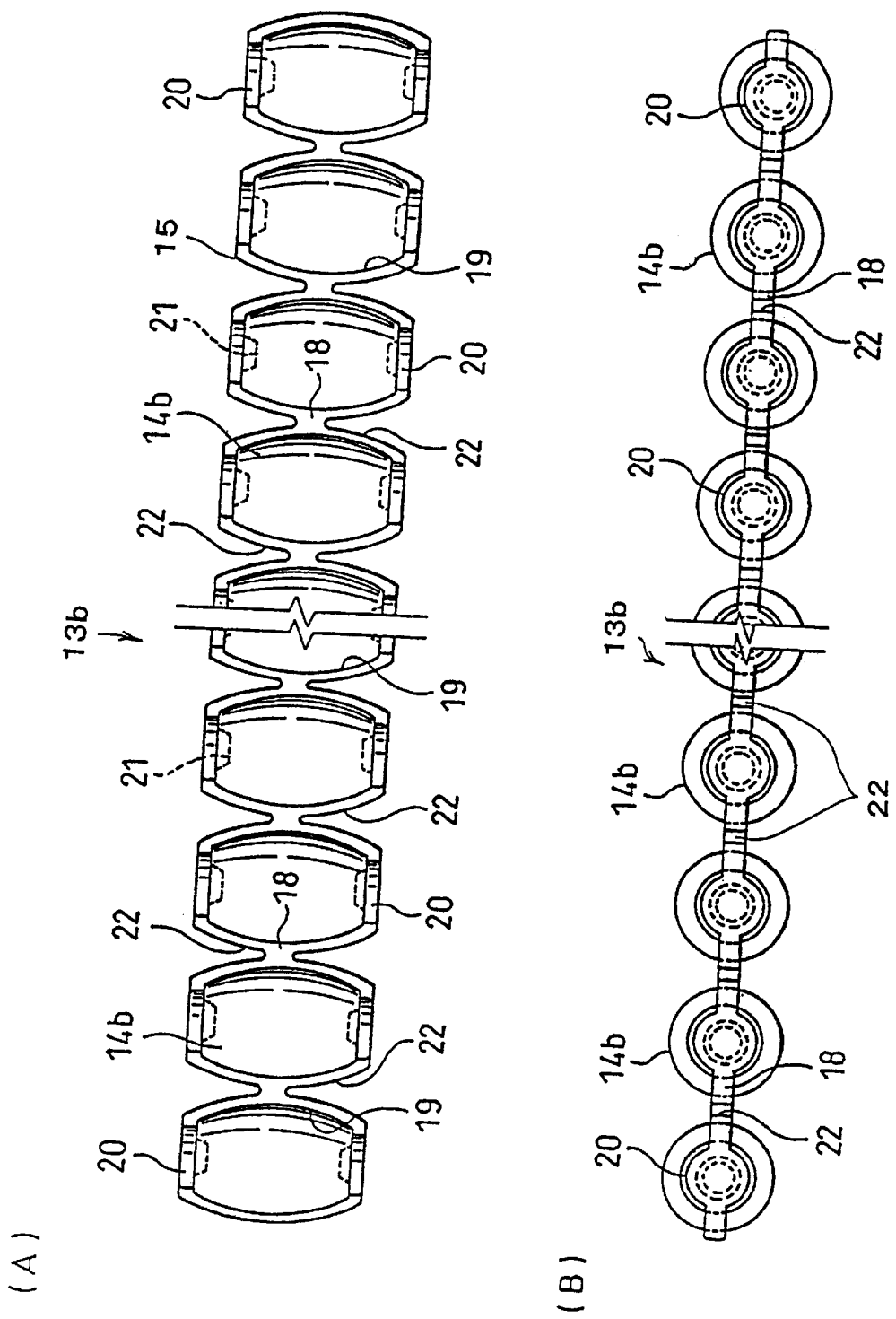
FIG. 23 shows the roller train in which rollers are maintained in the retaining member of FIG. 22 wherein (A) is a plan view, and (B) is a side view of the roller train.
Figure 24:
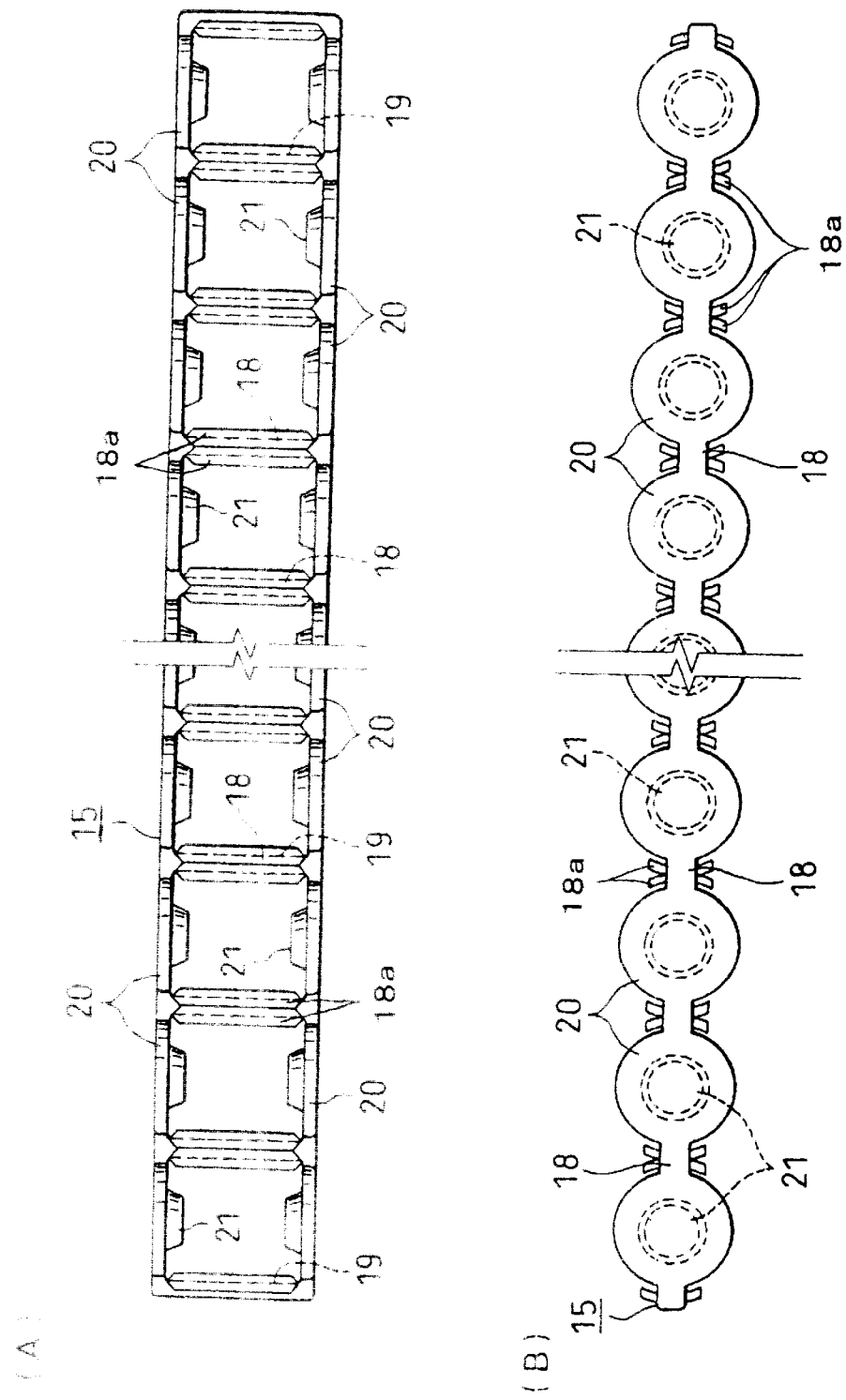
FIG. 24 shows a retaining member for a roller train according to another variation of the first embodiment, wherein (A) is a plan view and (B) is a side view of the retaining member.
Figure 25:
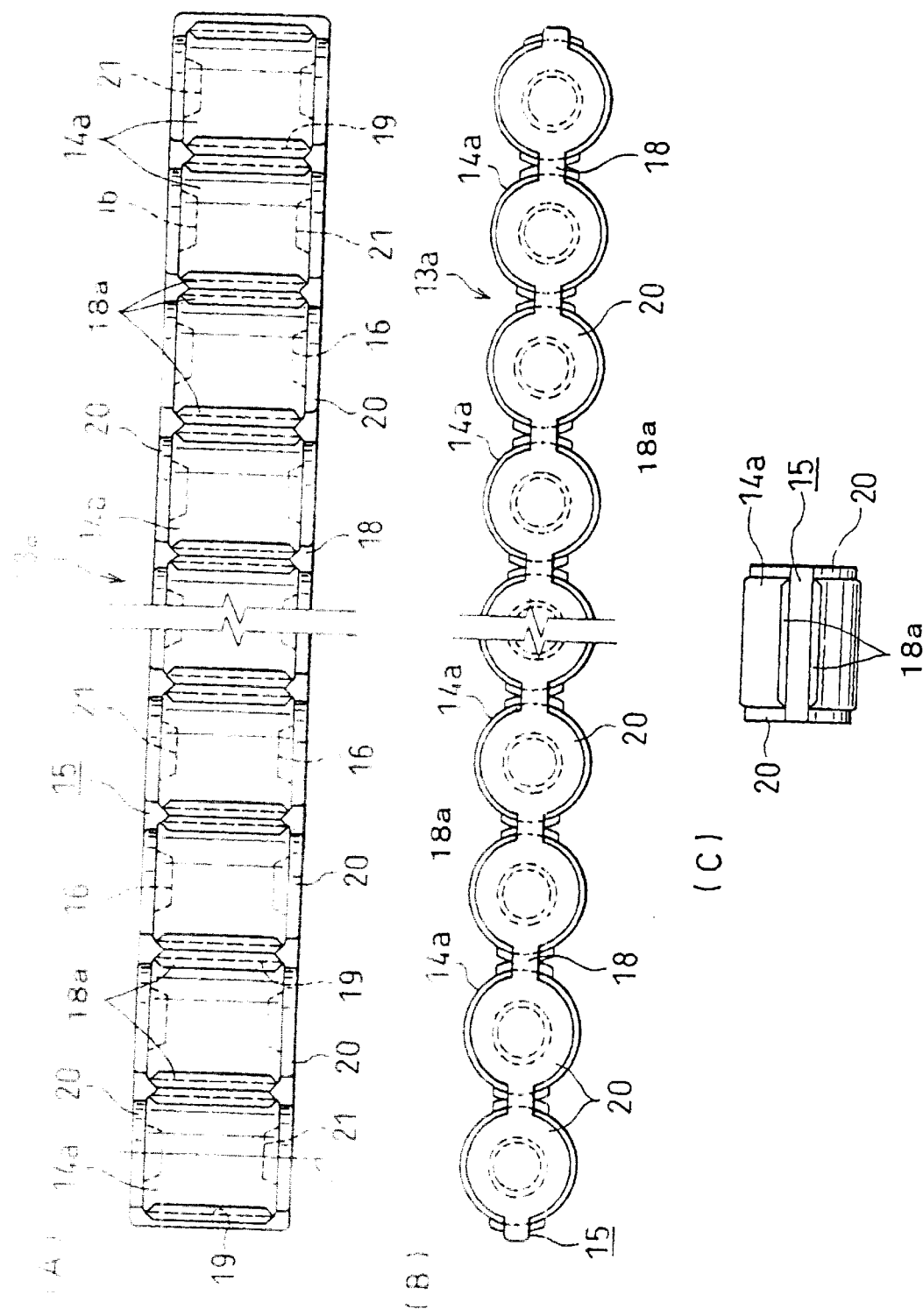
FIG. 25 shows the roller train in which rollers are maintained in the retaining member of FIG. 24, wherein (A) is a plan view, and (B) is a side view of the roller train.
Figure 26:
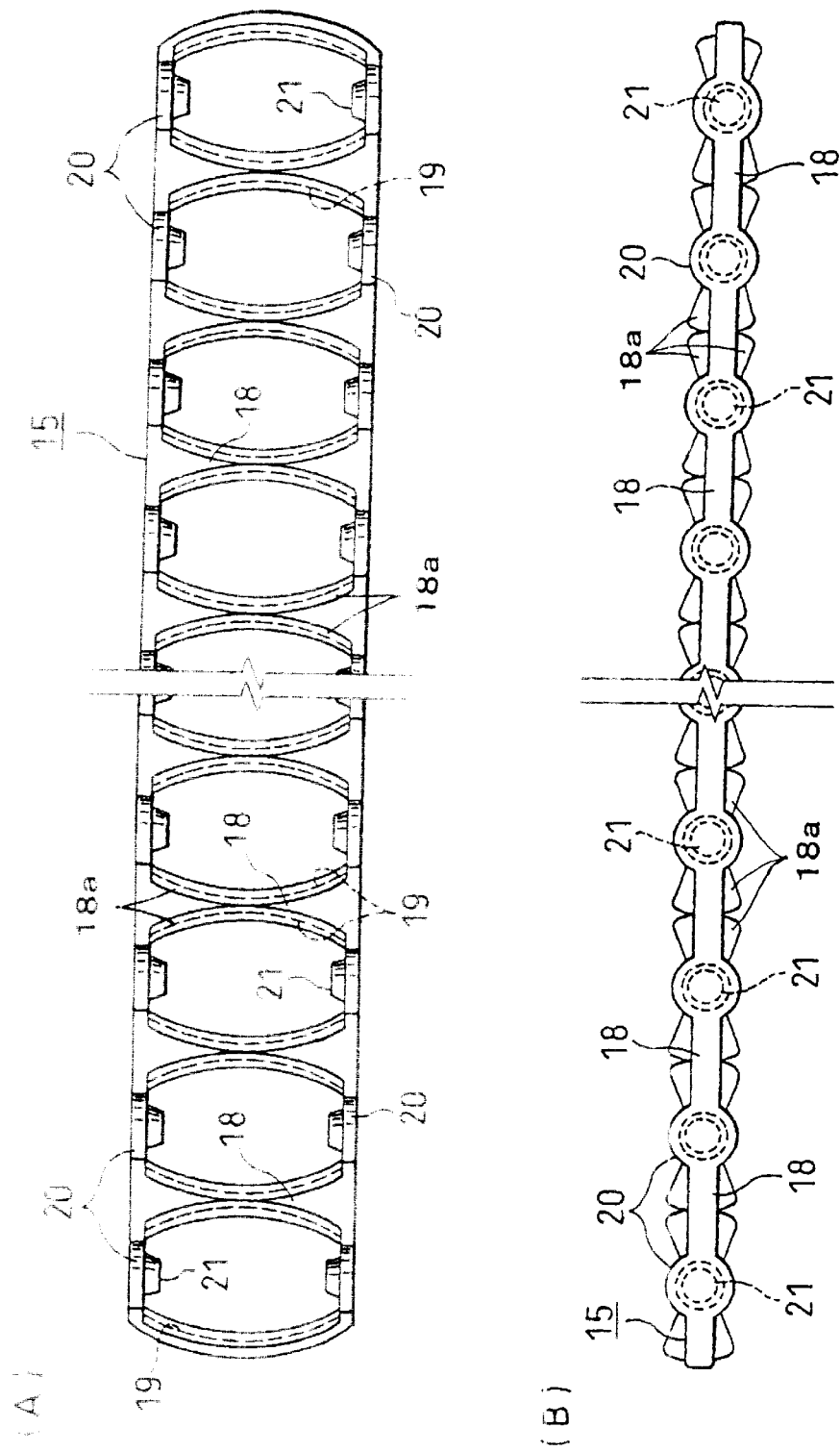
FIG. 26 shows a retaining member for a roller train according to another variation of the first embodiment, wherein (A) is a plan view and (B) is a side view of the retaining member.
Figure 27:
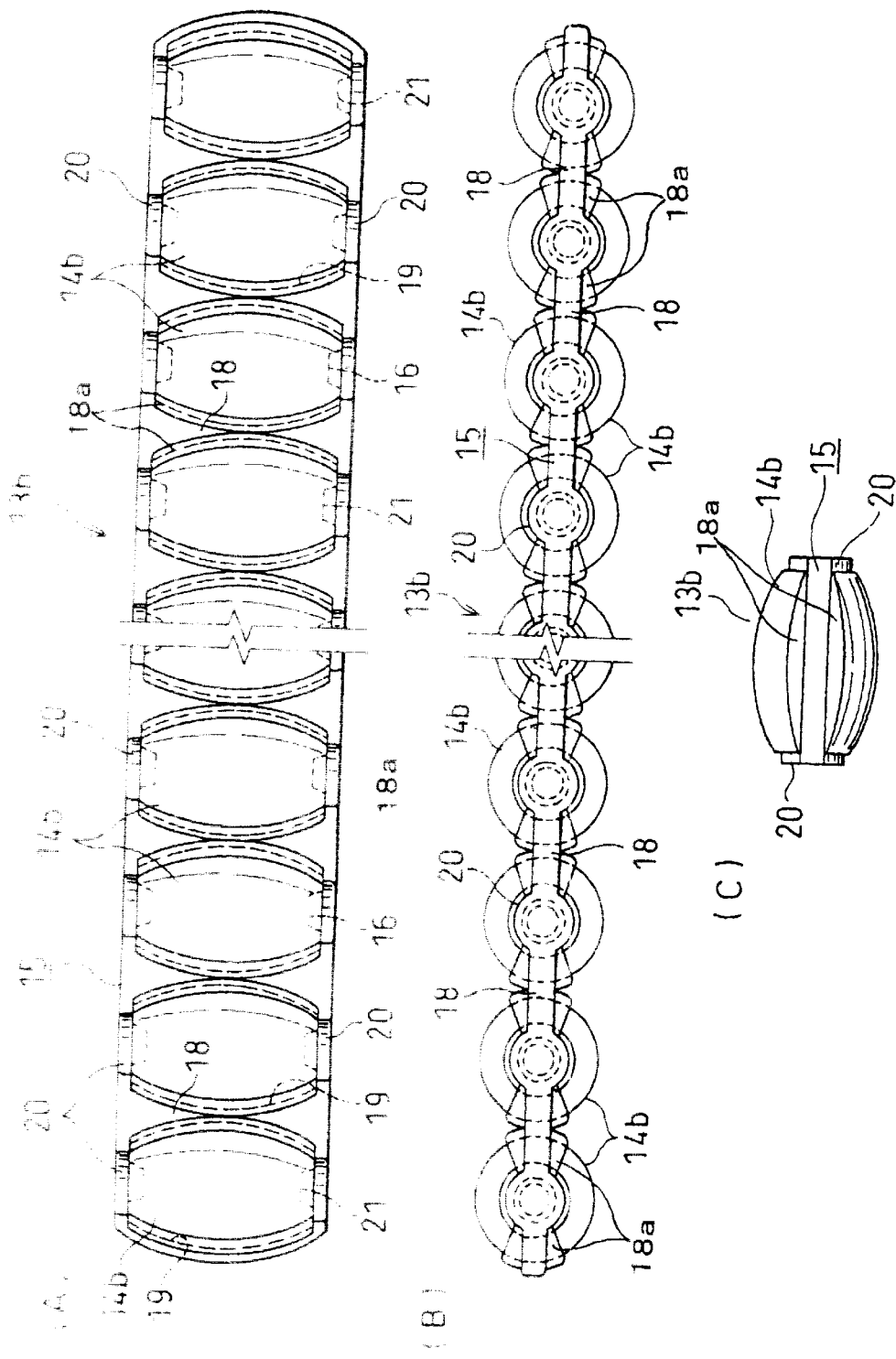
FIG. 27 shows the roller train in which rollers are maintained in the retaining member of FIG. 26, wherein (A) is a plan view and (B) is a side view of the roller train.

Next, the variation 1-6 of the first embodiment will be described with reference to FIGS. 22 and 23. The present variation employs the construction having the rollers 14b described in variation 1-1 above. However, the constricting portions 22 are formed on both ends of the spacers 18 from the end edges toward the center. With this construction, it is possible to achieve the same effects described in variation 1-5. The remaining construction of the linear motion guide apparatus, as well as its operations and effects are the same as those described in variation 1-1 of the first embodiment. Therefore, these descriptions will be omitted here. Also, the same part numbers used in variation 1-1 of the first embodiment are used for like parts in this variation.

Although the retaining member 15 described in the first embodiment and each of its variations is constructed of a slippery synthetic resin such as a fluoride type resin, the retaining member 15 of the present invention is not limited to this material. However, a synthetic resin material is used in the first embodiment and its variations because this material can be used to form the retaining member 15 in one molded unit, using the insert molding process. Moreover, a retaining member 15 constructed of synthetic resin slides more smoothly than that constructed of another material. In the first embodiment and its variations, the rollers 14a and rollers 14b are provided with engaging depressions 16, and the side plates 20 are provided with engaging protrusions 21. However, the same effects can be achieved by providing the rollers 14a and rollers 14b with engaging protrusions and the side plates 20 with engaging depressions.

In the first embodiment and its variations described above, it is possible to construct the retaining member 15 such that engaging protrusions 21 are not provided on the side plates 20. That is, the side plates 20 themselves function to correct the orientation of the rollers 14a and rollers 14b. However, by omitting the engaging protrusions 21, the retaining member 15 loses its functions for preventing rollers 14a and rollers 14b from falling out of the retaining member 15 and for maintaining the position of rollers in relation to the retaining member 15 when the rollers pass through the U-shaped change direction channel 10. Here, it is possible to prevent the rollers 14a or rollers 14b from falling out of the retaining member 15 by forming the surfaces of the spacers 18 opposing the rollers 14a or rollers 14b to have approximately the same curvature as the curvature on the side surfaces of the rollers 14a or rollers 14b. This construction is practical since the rollers 14a or rollers 14b can move smoothly, even though the function for maintaining the position of the rollers in relation to the retaining member 15 is lost. Therefore, a construction of the retaining member 15 wherein engaging protrusions 21 are not provided on the side plates 20 is still a practical construction that enables the rollers to circulate freely. This construction can be employed whether or not the rollers 14a or rollers 14b are provided with engaging depressions 16. The engaging depressions 16 can serve as a reservoir for lubricant when provided in the rollers 14a or rollers 14b.

In the first embodiment and its variations described above, the insert molding process is employed to produce the roller train 13a, roller train 13b or roller train 13c. However, the roller train 13a, roller train 13b, or roller train 13c can be manufactured by a process in which the rollers 14a, rollers 14b, or rollers 14c are integrated in the retaining member 15. In this case it is possible to form the surfaces of the spacers 18 that oppose the rollers 14a or rollers 14b as flat surfaces, except when no engaging protrusions or engaging depressions are formed on the side plates 20.

In the variations shown in FIGS. 24 and 25 and FIGS. 26 and 27, cover portions 18a for covering the entire length of the side faces of the rollers 14a or rollers 14b can be integrally provided on the spacers 18. These cover portions 18a can further improve the effects of skew prevention. It is desirable that the surface of the cover portion 18a opposing each side surface of the rollers 14a or rollers 14b is formed in an arc having approximately the same radius of curvature as that of the side surface it opposes.

Figure 28:
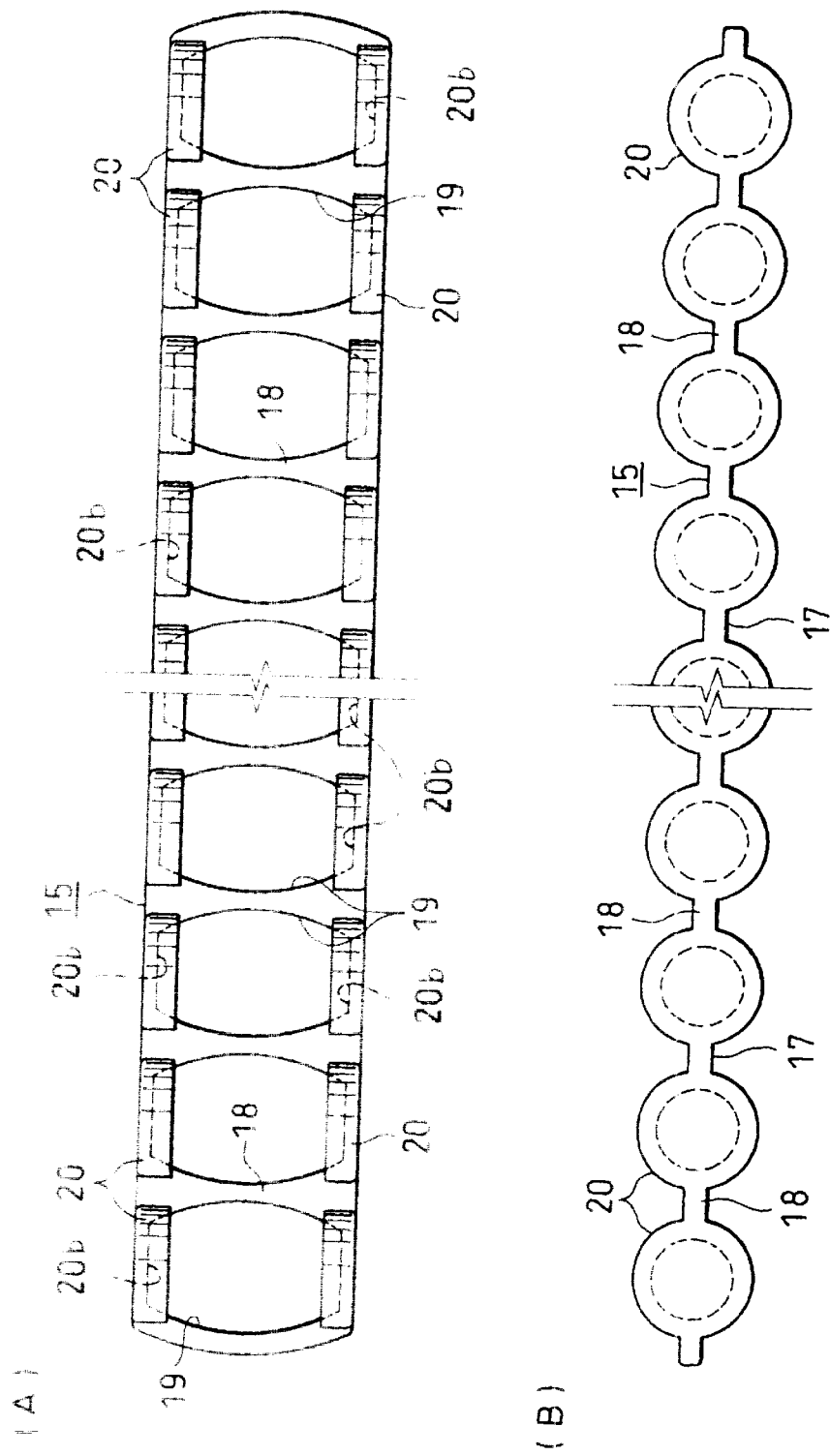
FIG. 28 shows a retaining member for a roller train according to the second embodiment, wherein (A) is a plan view and (B) is a side view of the retaining member.
Figure 29:
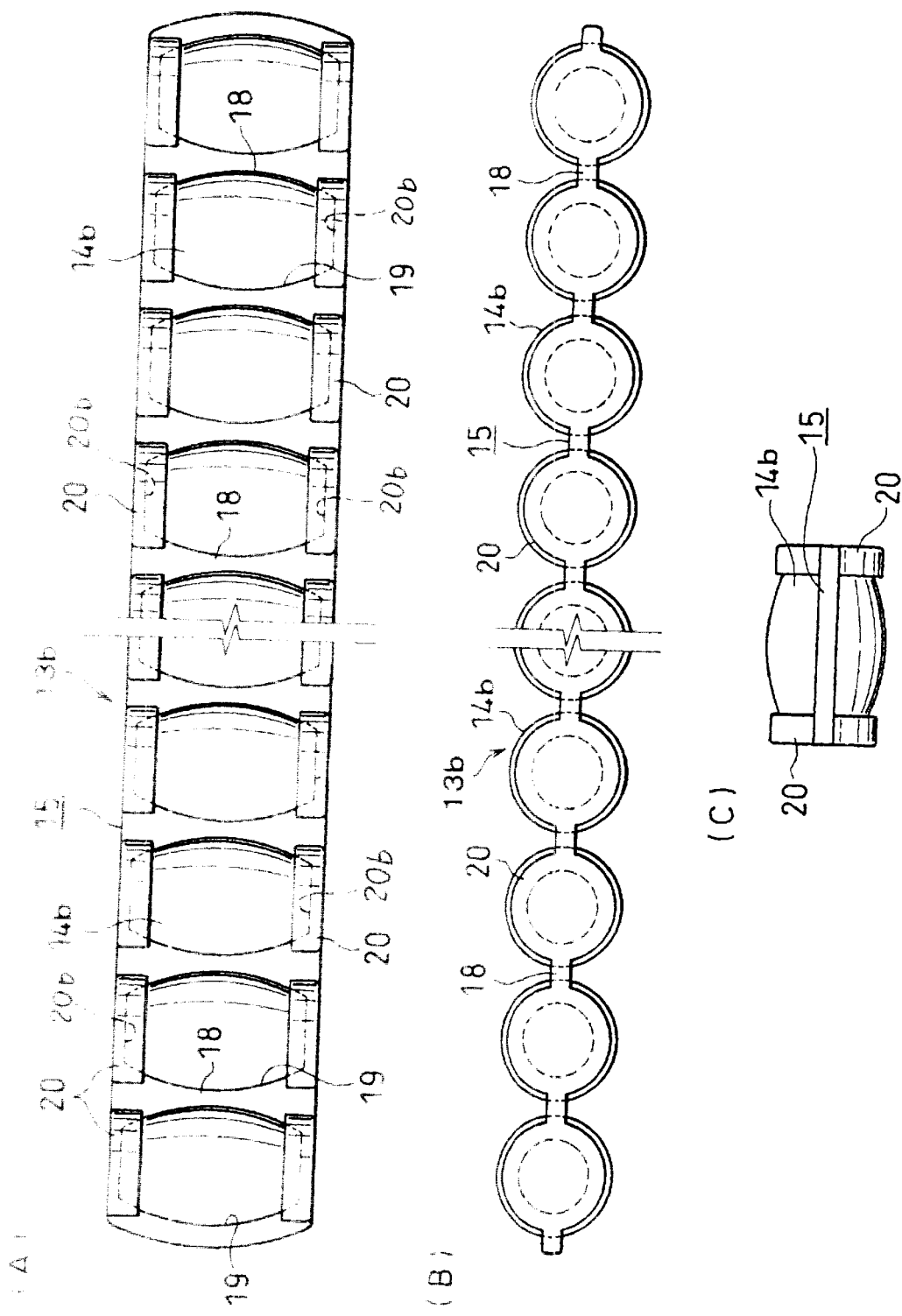
FIG. 29 shows the roller train in which rollers are maintained in the retaining member of FIG. 28, wherein (A) is a plan view, (B) is a side view, and (C) is a front view of the roller train.

Next, a roller train and linear motion guide apparatus, according to a second embodiment of the present invention, will be described with reference to FIGS. 28–30. Except for the structure of the roller train shown in FIGS. 28 and 29, the constructions of the roller train and linear motion guide apparatus are the same as those described in the first embodiment above. As shown in FIGS. 28 and 29, the roller train 13b, according to the second embodiment, includes a plurality of spherical rollers 14b and a retaining member 15 for retaining the rollers 14b. The rollers 14b are shaped similar to a barrel, with side surfaces that expand in an arcing shape. The retaining member 15 is belt shaped with unconnected ends and comprises a plurality of spacers 18 spaced at intervals from each other and maintained in a series; circular side plates 20 connecting like sides of lengthwise ends on neighboring spacers 18 for maintaining the left and right end faces of the rollers 14b as an end face support; roller retaining holes 19 formed by a pair of spacers 19 and a pair of opposing side plates 20 that are connected to these spacers 18.

The side plates 20 are provided with a flat outer surface for sliding in contact with the side wall surface of the path 12 when the roller train 13b is integrated in the path 12 in order to maintain the rollers 14b in a correct orientation; and a depression 20b disposed on the inner surface of the side plates 20 for fitting loosely over the ends of the rollers 14b. This construction can also help prevent skew in the rollers 14b.

Figure 30:
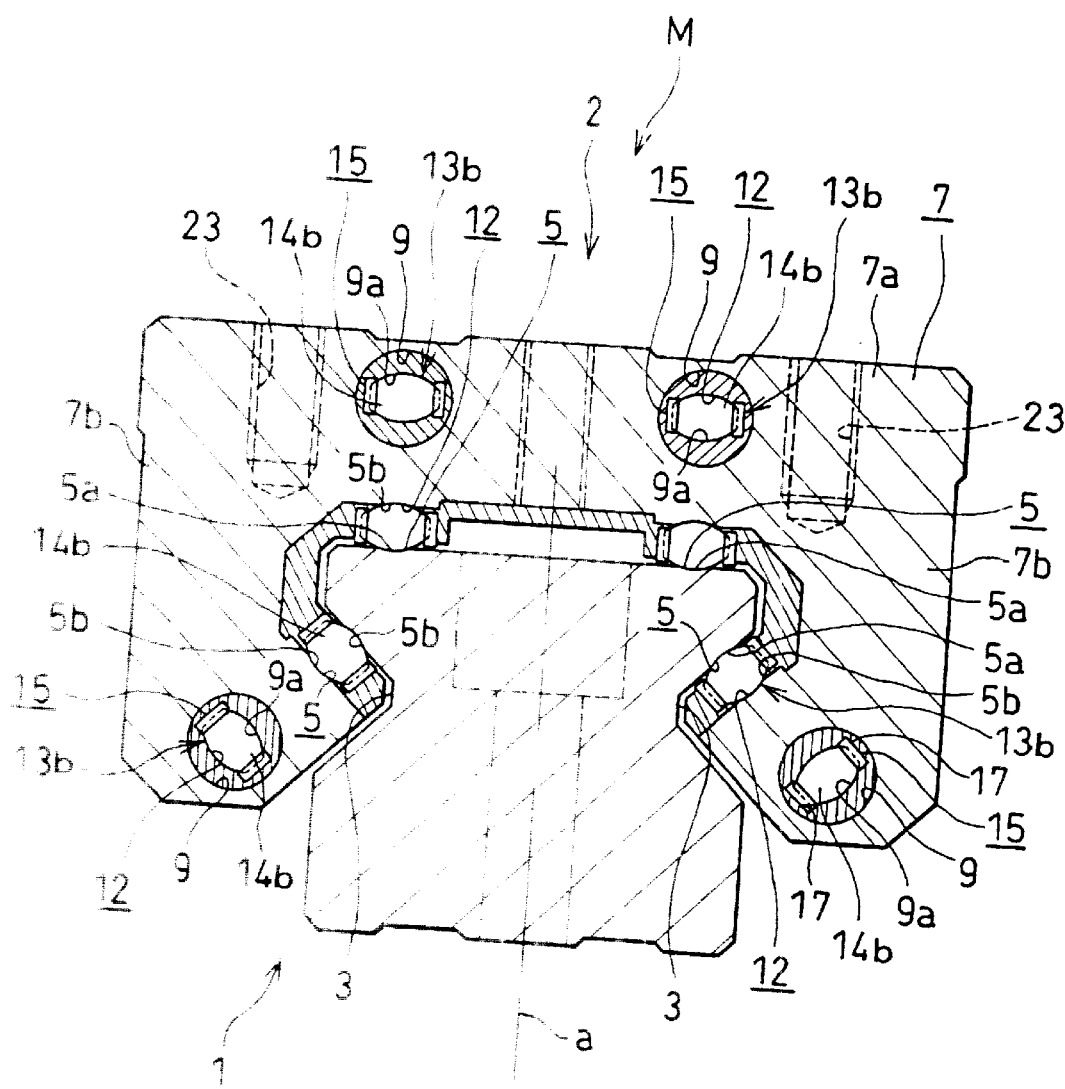
FIG. 30 is a cross-sectional view of the linear motion guide apparatus, corresponding to the section indicated by the arrows A in FIG. 1, showing the roller train of FIG. 29 in use.

FIG. 30 shows an example construction of the linear motion guide apparatus M in which the roller train 13b has been mounted. As in the structure of the linear motion guide apparatus M described in the first embodiment, the contact angle of the rollers 14b integrated in the roller train 13b interposed between the top surface of the track rail 1 and the bottom surface of the horizontal portion 7a is set to 90 degrees from the horizontal, while the contact angle of the rollers 14b integrated in the roller train 13b disposed on the side surface of the track rail 1 is set at about 30 degrees down from the horizontal.

Figure 31:
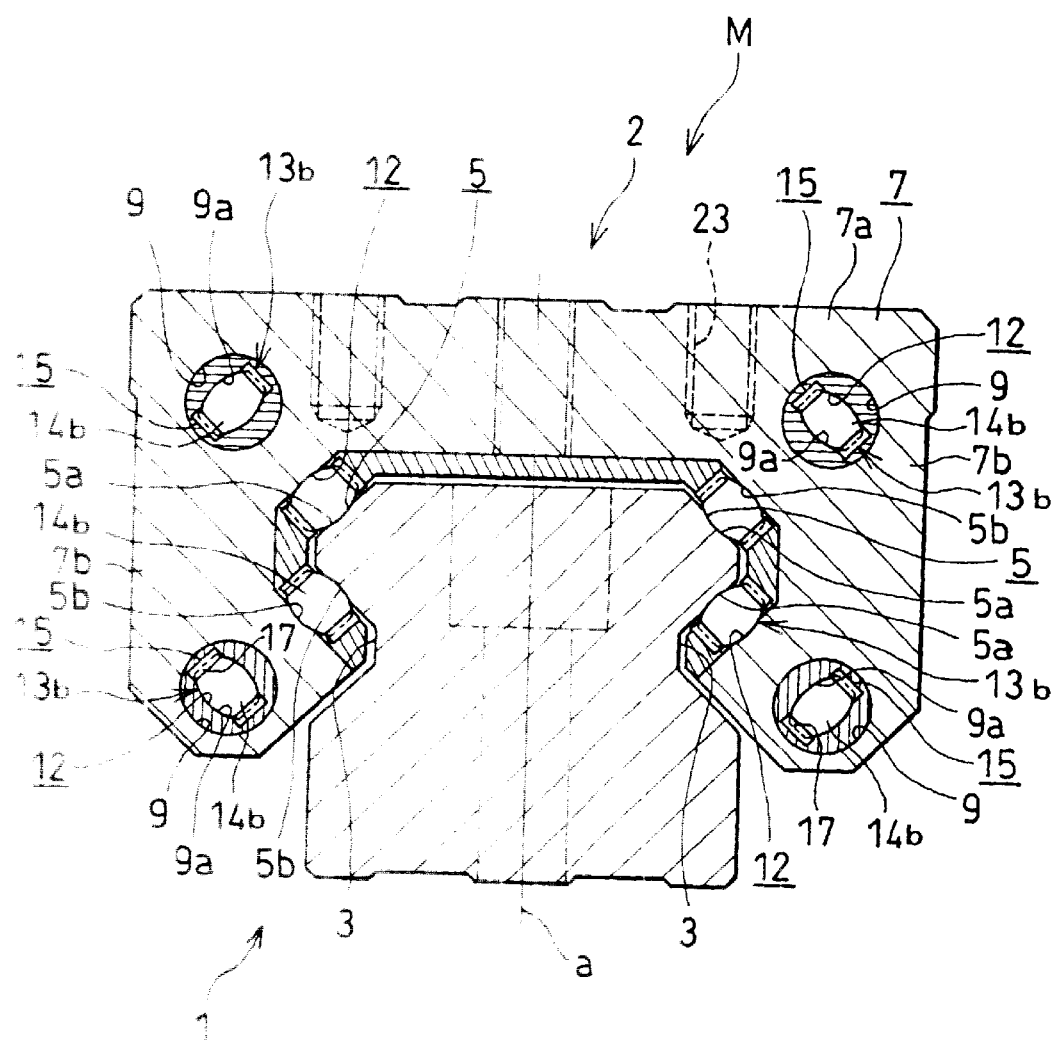
FIG. 31 is a cross-sectional view, corresponding to the section indicated by the arrows A in FIG. 1, showing the linear motion guide apparatus according to a variation of the second embodiment.
Figure 32:
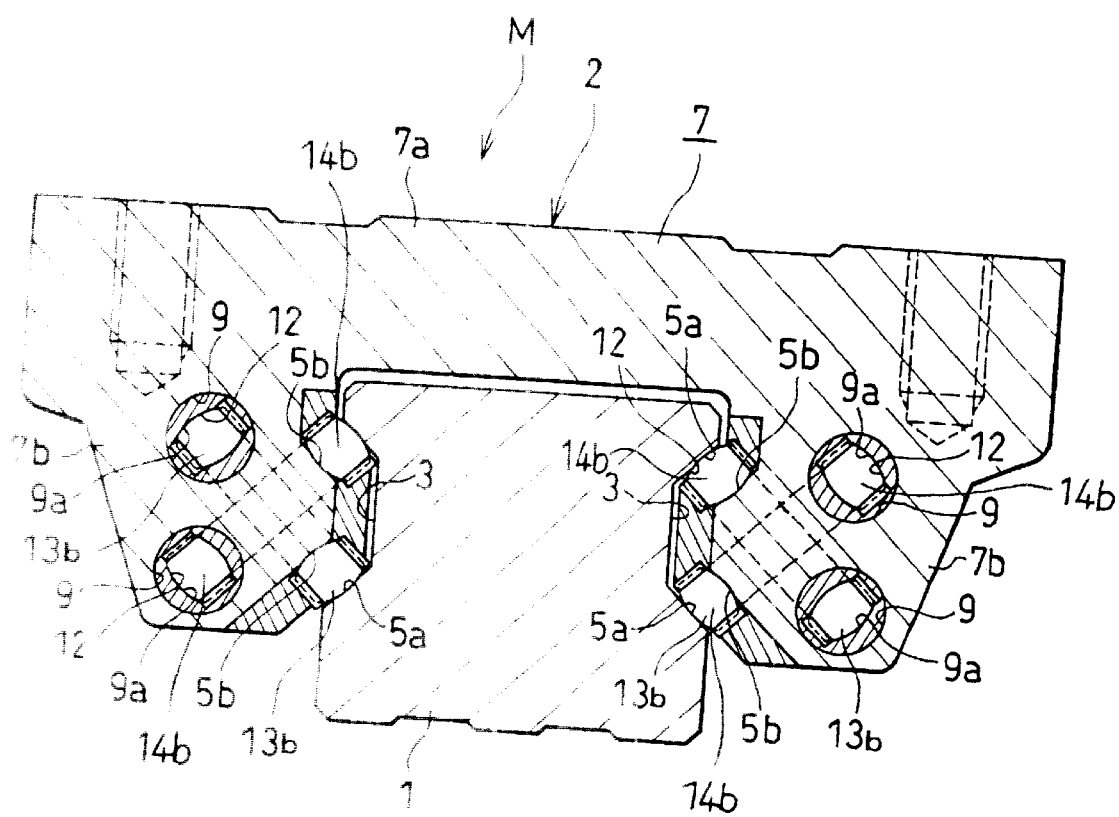
FIG. 32 is a cross-sectional view corresponding to the section indicated by the arrows A in FIG. 1, showing the linear motion guide apparatus according to a variation of the second embodiment.

In a variation of the second embodiment shown in FIG. 31, it is also possible to mount two rows of the roller train 13b, one over the other, between the widthwise (left and right direction in FIG. 31) side surfaces of the track rail 1 and the inner side surfaces of the skirt portion 7b, for a total of four rows of the roller train 13b. Further, in another variation shown in FIG. 32, the paths 12 can be determined such that the rows of the roller train 13b on the same side cross each other. The structure of these variations can be determined based on the amount of load the slider supports.

Figure 33:
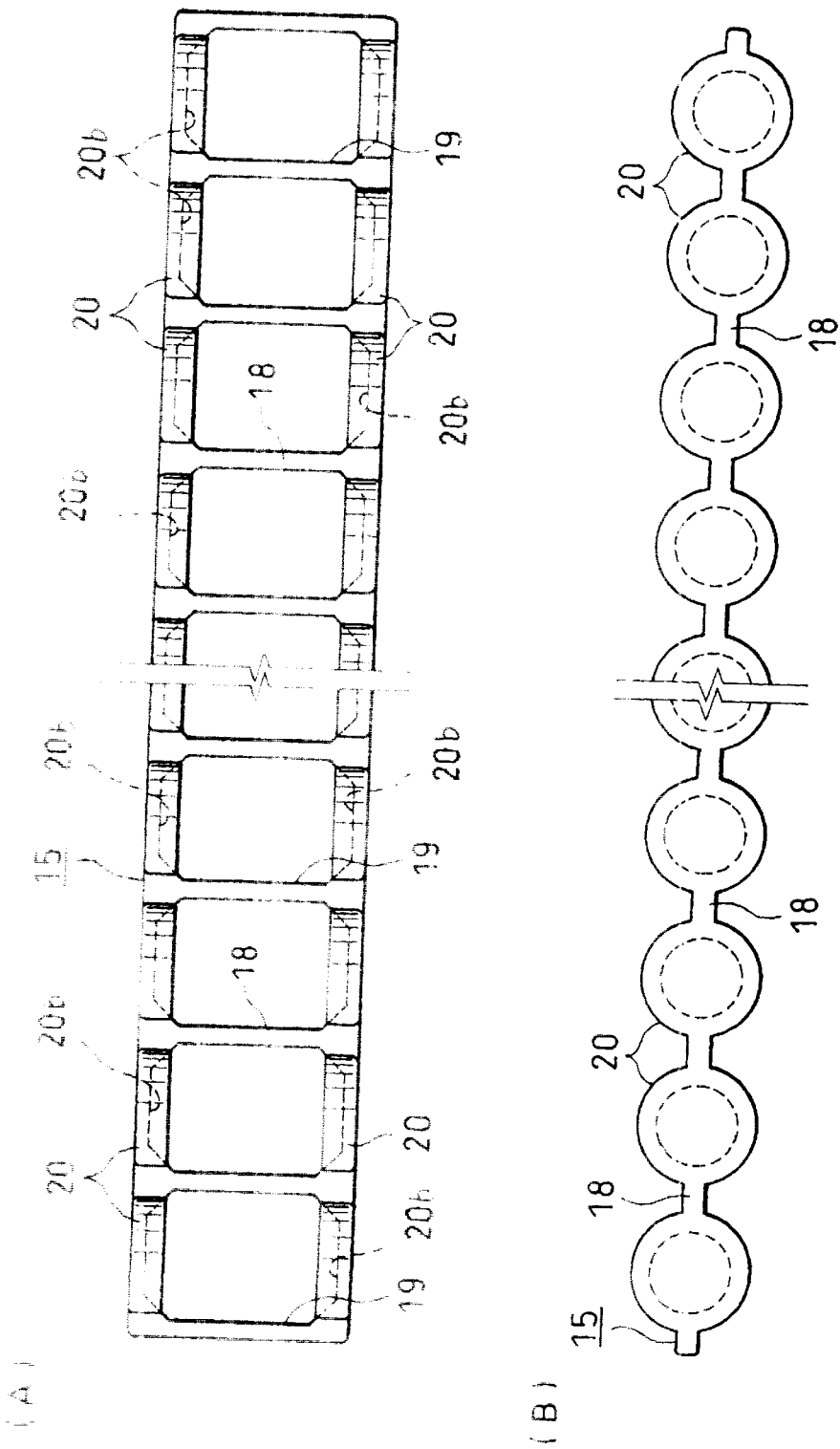
FIG. 33 shows a retaining member for a roller train according to a variation of the second embodiment, wherein (A) is a plan view and (B) is a side view of the retaining member.
Figure 34:
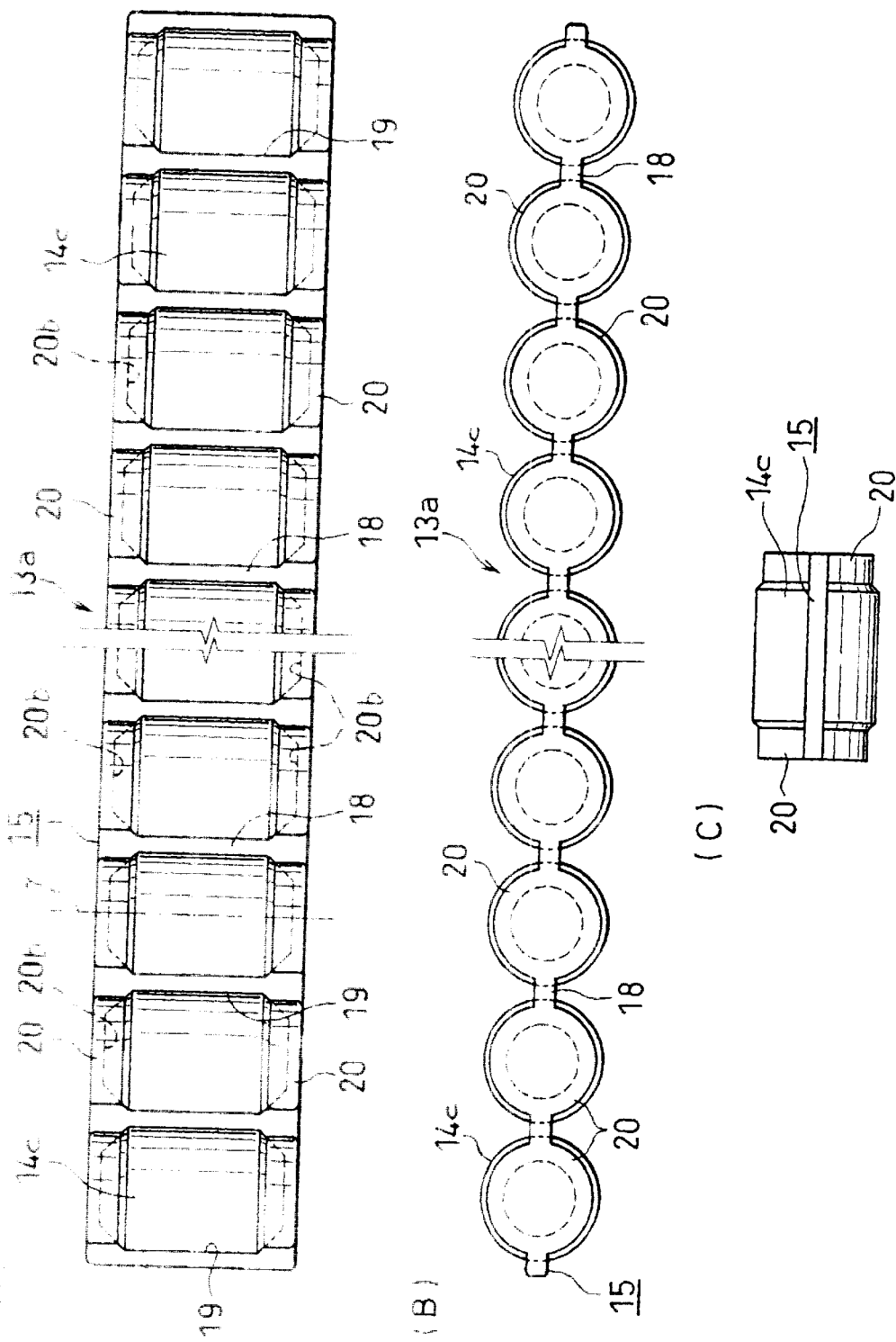
FIG. 34 shows the roller train in which rollers are maintained in the retaining member of FIG. 33, wherein (A) is a plan view, (B) is a side view, and (C) is a front view of the roller train.

As shown in FIGS. 33 and 34, the rollers 14c can be employed in the configurations just described. In the roller train 13c, both ends of the rollers 14c fit loosely in the depressions 20b formed in the inner surfaces of the side plates 20. By employing this type of roller train 13c, it is possible to restrict the rollers from skewing. By fitting loosely over the ends of the rollers 14c, the side plates 20 can reliably maintain the position of the rollers 14c, substantially preventing any wavering in the rotational axis of the same.

Figure 17:
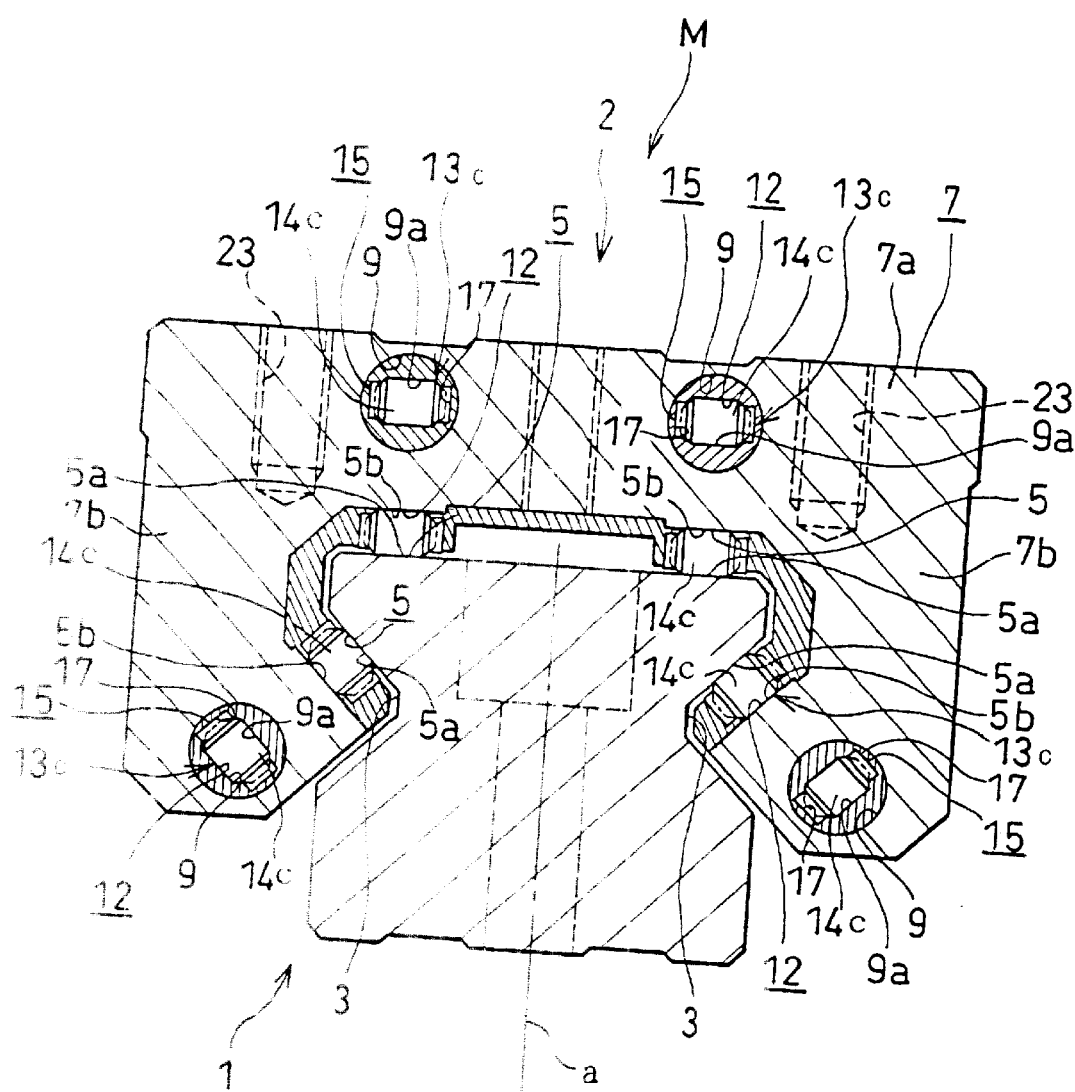
FIG. 17 is a cross-sectional view, corresponding to the section indicated by the arrows A in FIG. 1, of the linear motion guide apparatus using the roller train of FIG. 34 for the second embodiment of the present invention.
Figure 35:
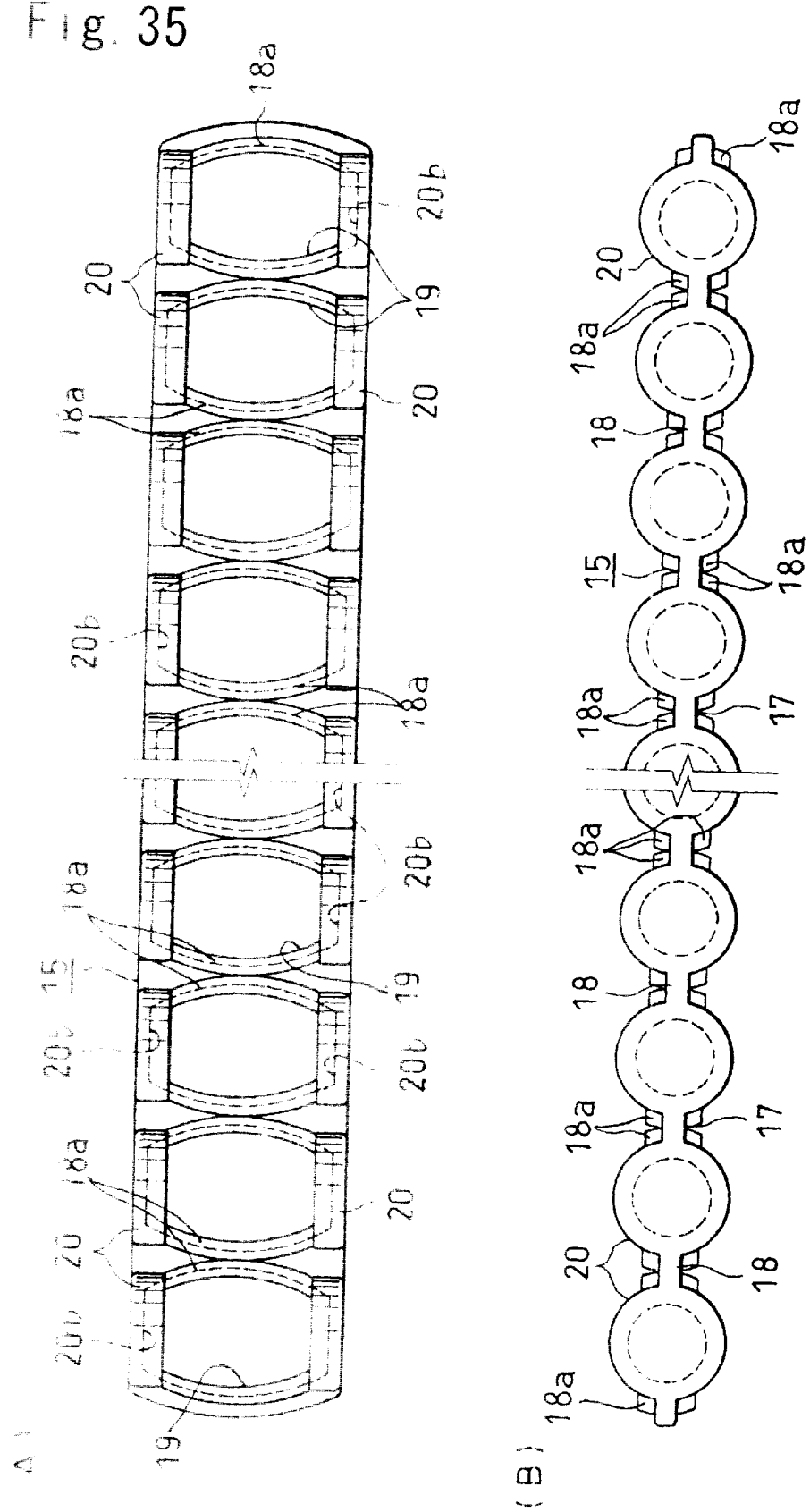
FIG. 35 shows a retaining member for a roller train according to a variation of the second embodiment, wherein (A) is a plan view and (B) is a side view of the retaining member.
Figure 36:
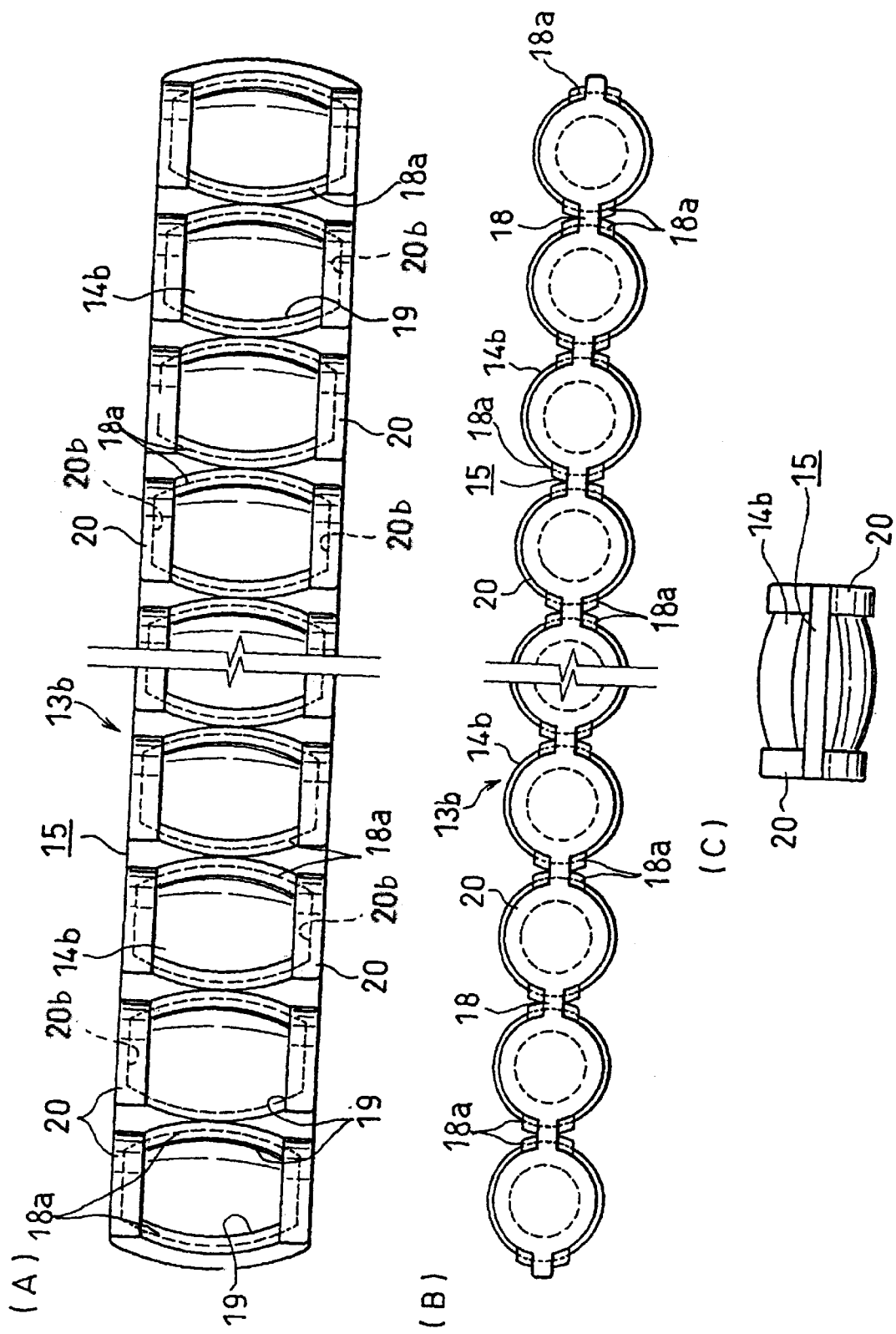
FIG. 36 shows the roller train in which rollers are maintained in the retaining member of FIG. 35, wherein (A) is a plan view, (B) is a side view, and (C) is a front view of the roller train.
Figure 37:
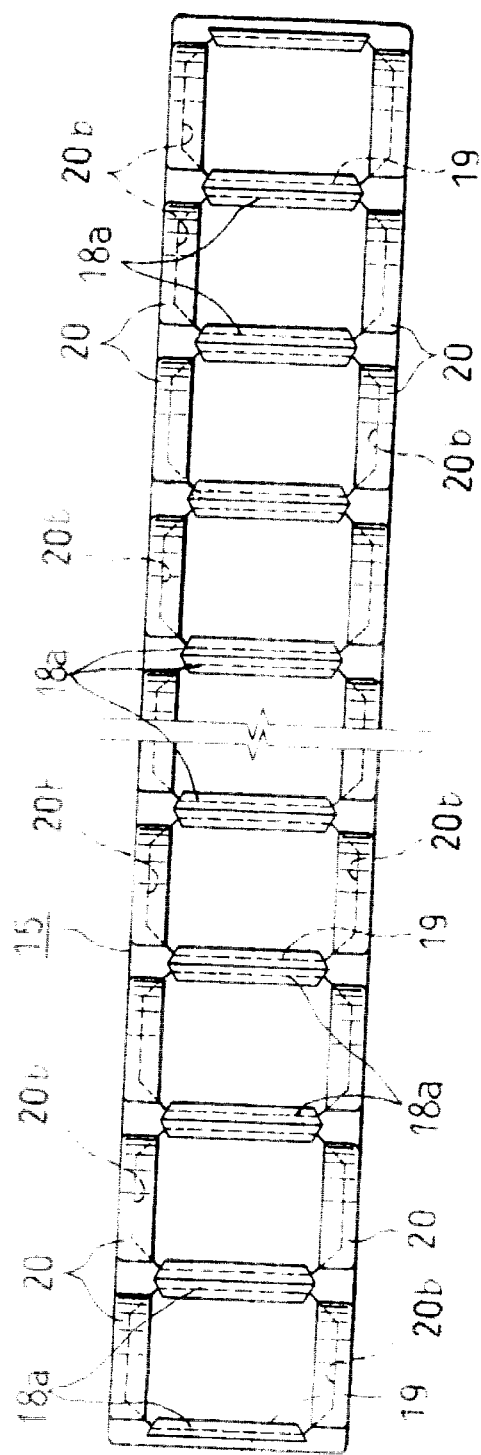
FIG. 37 shows a retaining member for a roller train according to a variation of the second embodiment, wherein (A) is a plan view and (B) is a side view of the retaining member.
Figure 37:
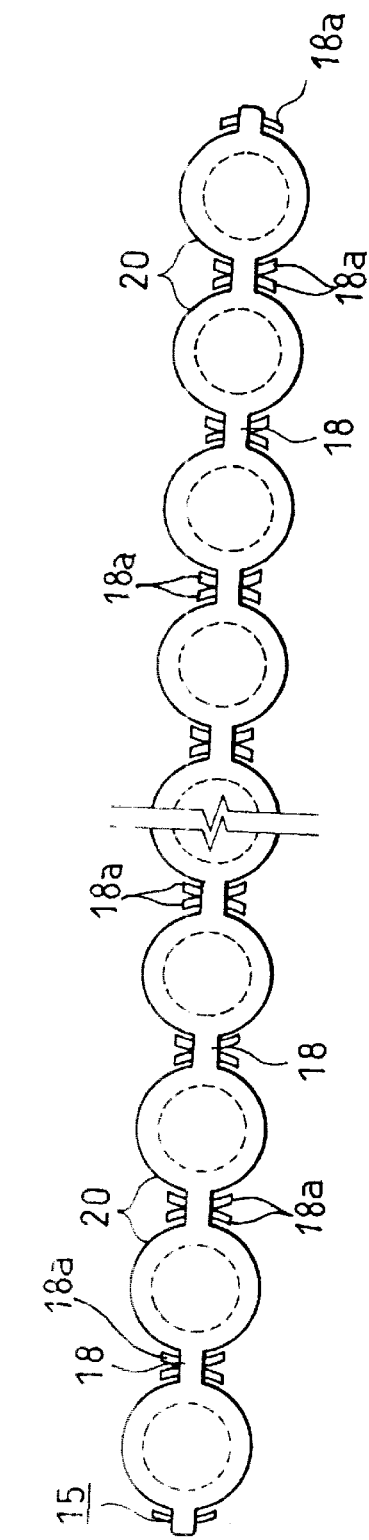
Figure 38:
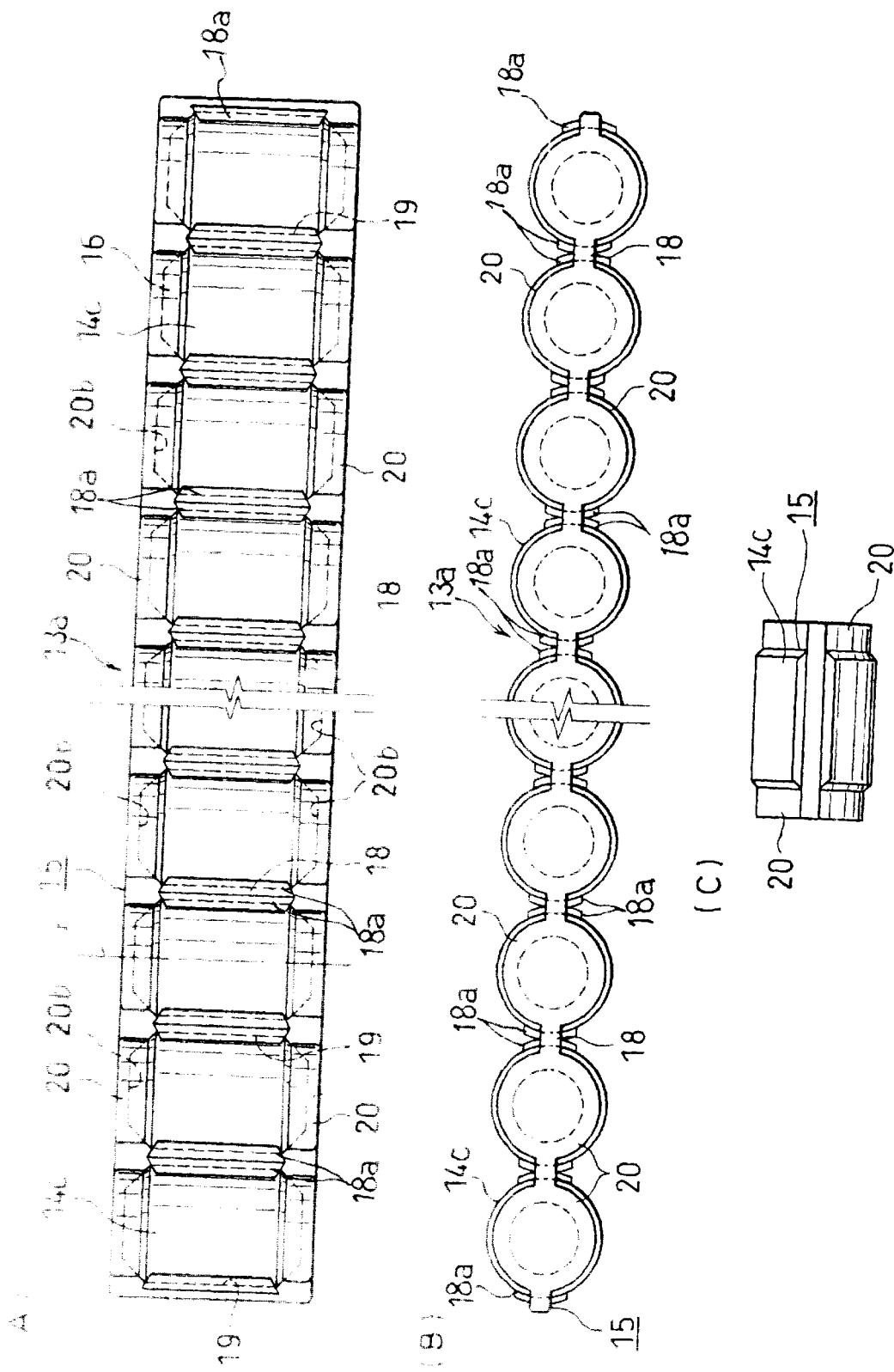
FIG. 38 shows the roller train in which rollers are maintained in the retaining member of FIG. 37, wherein (A) is a plan view, (B) is a side view, and (C) is a front view of the roller train.

FIG. 17 shows an example construction of a linear motion guide apparatus that uses a roller train 13c employing rollers 14c. Since the structure of this linear motion guide apparatus is the same as that shown in FIG. 30, a description of the structure will be omitted. In the roller train of the second embodiment, a cover portion 18a can be provided on the spacers 18 to cover the side surfaces of the rollers. FIGS. 35 and 36 show an example of the cover portion 18a provided on the spacers 18 in the roller train 13b. FIGS. 37 and 38 show the cover portions 18a provided on the spacers 18 in the roller train 13c. Although not shown in the drawings, it is obvious that the cover portions 18a can also be provided on the spacers 18 in either a roller train employing non-chamfered cylindrical rollers or a roller train employing chamfered spherical rollers 14b.

Figure 39:
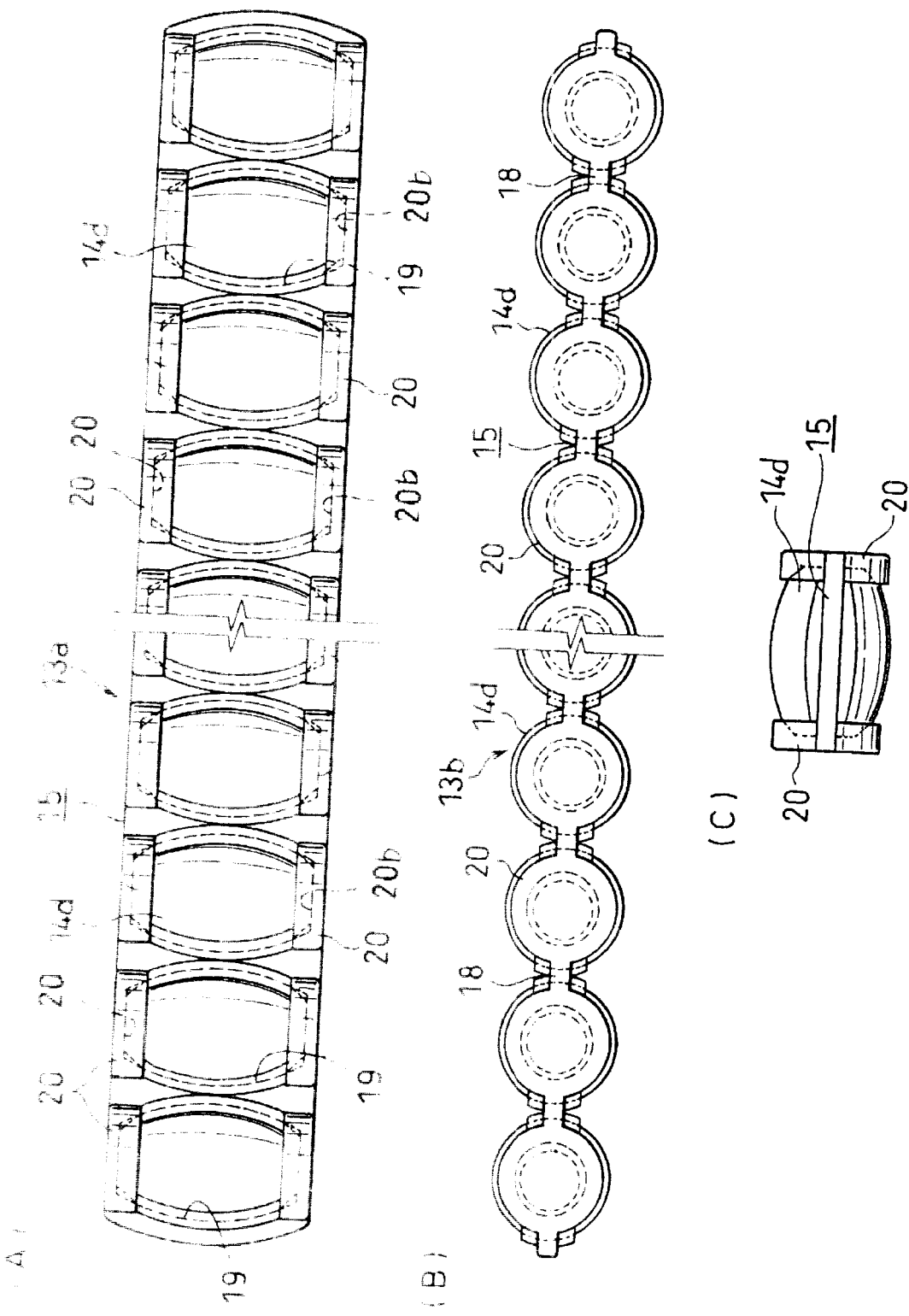
FIG. 39 shows a roller train in another variation of the second embodiment, wherein (A) is a plan view, (B) is a side view, and (C) is a front view of the roller train.
Figure 40:
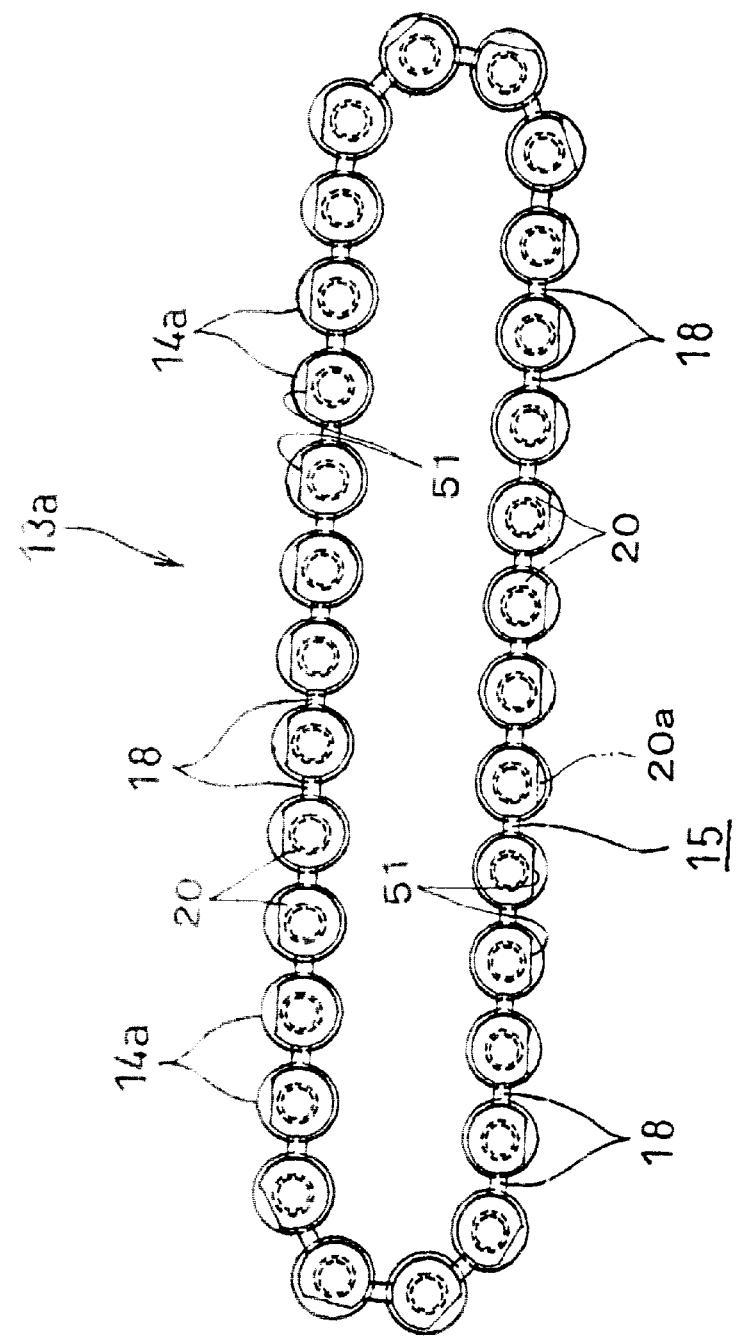
FIG. 40 is a side view showing the operating state of a roller train according to the third embodiment of the present invention.

In the examples of FIGS. 33 and 34 employing the rollers 14c, FIGS. 35 and 36 employing the rollers 14b, and FIGS. 37 and 38 employing the rollers 14c, the rollers 14b and rollers 14c can be replaced by a chamfered spherical roller 14d configured by chamfering both ends of the rollers 14b, as shown in FIG. 39. As shown in the variations of the first embodiment in FIGS. 20–23, constricting portions 22 can be provided on both widthwise ends of the spacers 18 in the roller trains described above, wherein the constricting portions 22 are formed from the end edges toward the center.

A roller train employing cylindrical rollers is not included in the description of the second embodiment and its variations. However, depressions capable of loosely fitting over the ends of cylindrical rollers can be provided on the side plates. Here, the diameter of the side plates will be larger than that of the cylindrical rollers. Therefore, it is desirable to expose the side surfaces of the cylindrical rollers by cutting out portions of the side plates that contact the cylindrical rollers in the load-bearing region.

Next, a third embodiment of the present invention will be described with reference to FIGS. 40–45. In the third embodiment, the roller train 13a is ring shaped with no ends.

Figure 21:
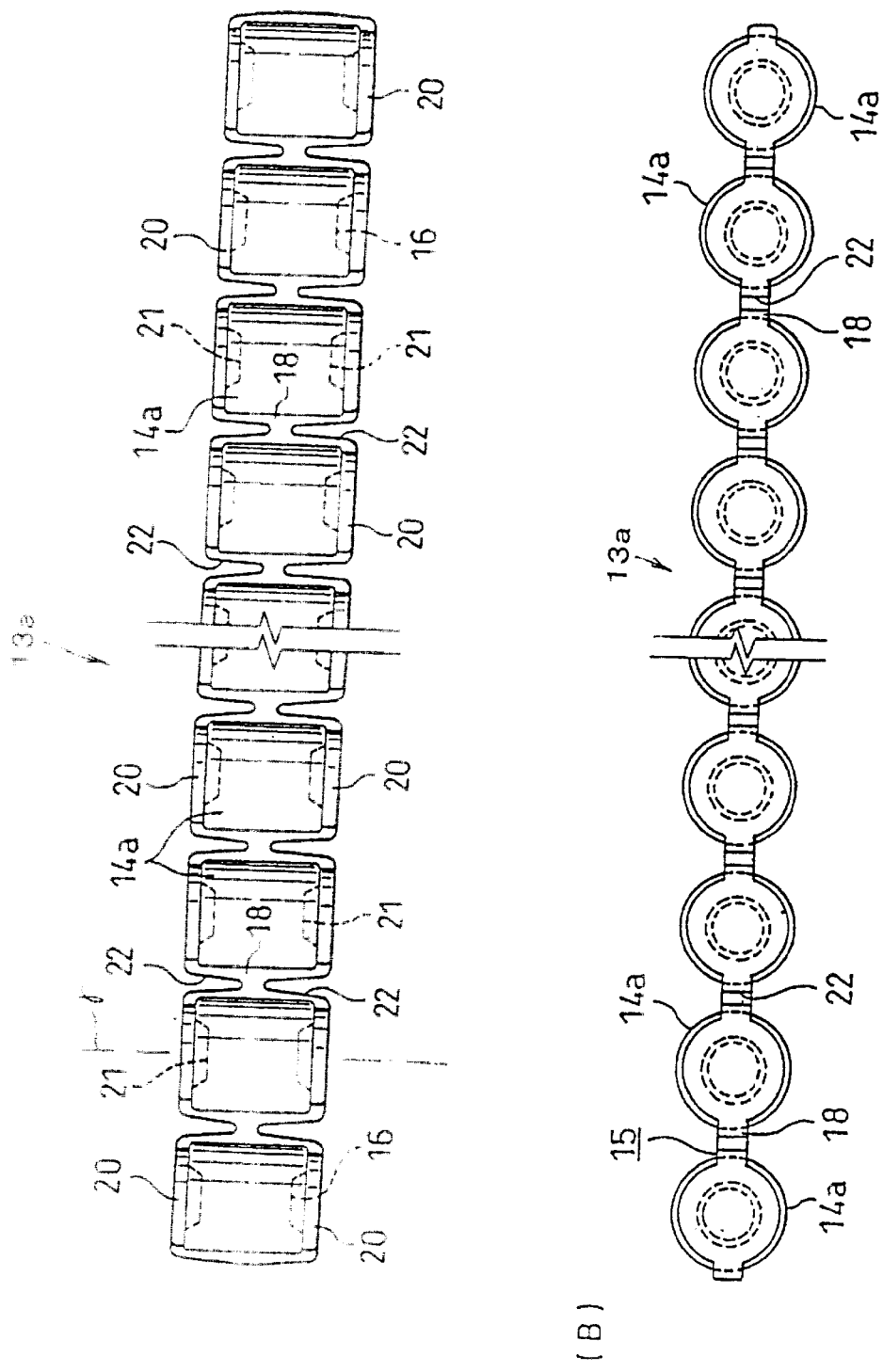
FIG. 21 shows the roller train in which rollers are maintained in the retaining member of FIG. 20 wherein (A) is a plan view, and (B) is a side view of the roller train.

The structure of the roller train 13a is similar to that described in variations 1-5 of the first embodiment shown in FIG. 21. In other words, the roller train 13a includes a plurality of rollers 14a that are maintained in a series by a retaining member 15. The retaining member 15 comprises a plurality of spacers 18 disposed between the rollers 14a; disc shaped side plates 20 that connect the end portions of neighboring spacers 18 on the same lengthwise side; and roller retaining holes 19 formed by a pair of neighboring spacers 18 and a pair of opposing side plates 20 connecting these spacers 18. Engaging protrusions 21 are provided at the center portion on the inner surfaces of the side plates 20 at positions corresponding to the engaging depressions 16 provided at the center ends of the rollers 14a.

Constricting portions 22 are provided on the spacers 18 and are cut out from the left and right ends of the spacers 18 toward the center.

Figure 43:
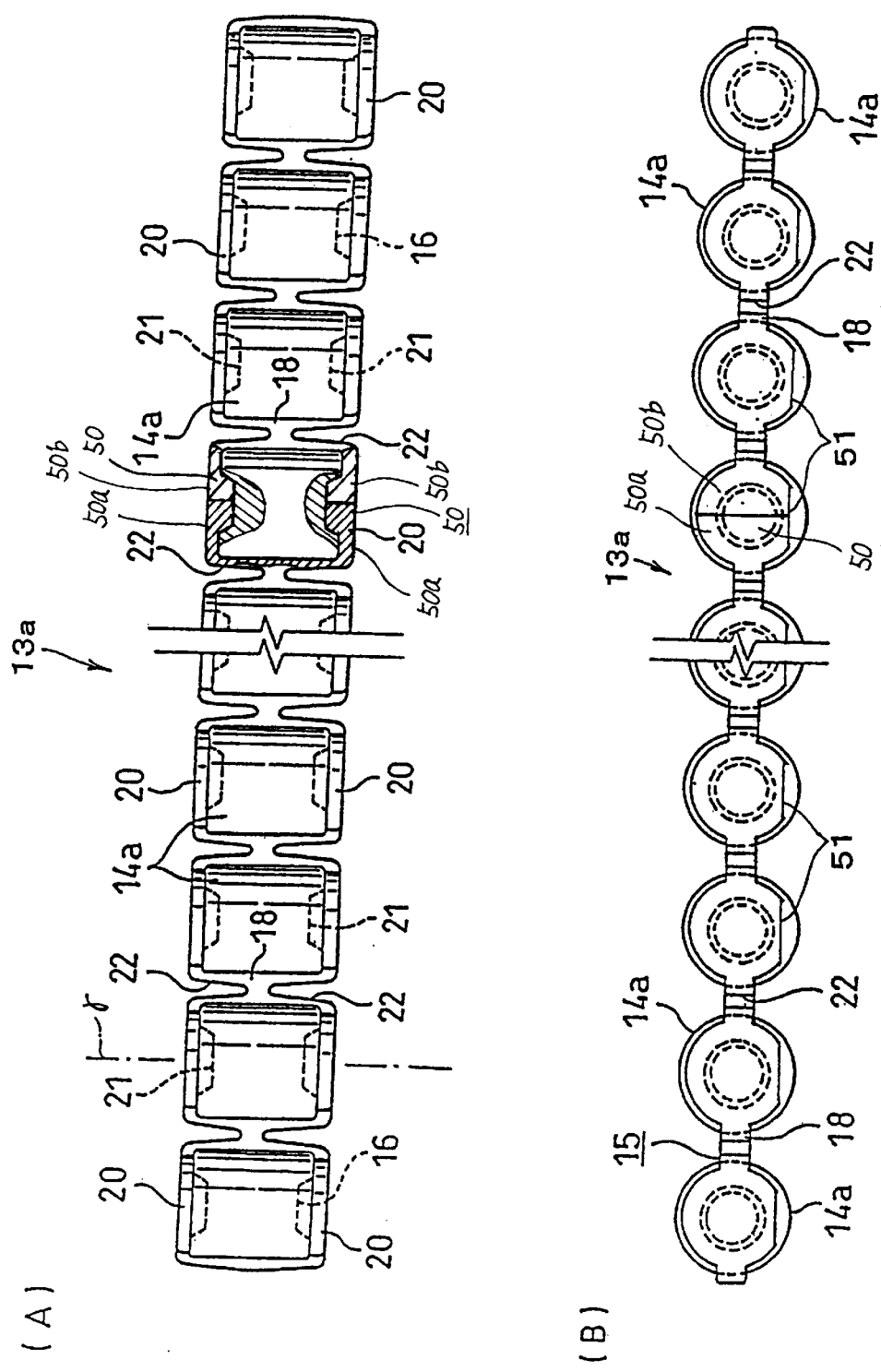
FIG. 43 shows the roller train of FIG. 42 provided with a linking portion, wherein (A) is a plan view of the roller train showing a cross-section of the linking portion, and (B) is a side view of the roller train.

The roller train 13a can be molded into a ring shape during the molding stage or can be a roller train 13a in which the ends link together as described in variations 1-5 shown in FIG. 21. In the latter case, the linking portion 50 is provided on the ends of the roller train 13a for detachably linking the ends, as shown in FIG. 43. Since it is not possible to install an endless roller train in the linear motion guide apparatus, due to the structure of the path 12, a roller train containing the linking portion 50 is desirable. With this configuration, the linking portion 50 is disconnected to install the roller train in the path 12. After installation, the linking portion 50 is linked together. However, if the path 12 were configured to open and expose its entire path, the roller train 13a could be installed in the path in its endless state.

Figure 41:
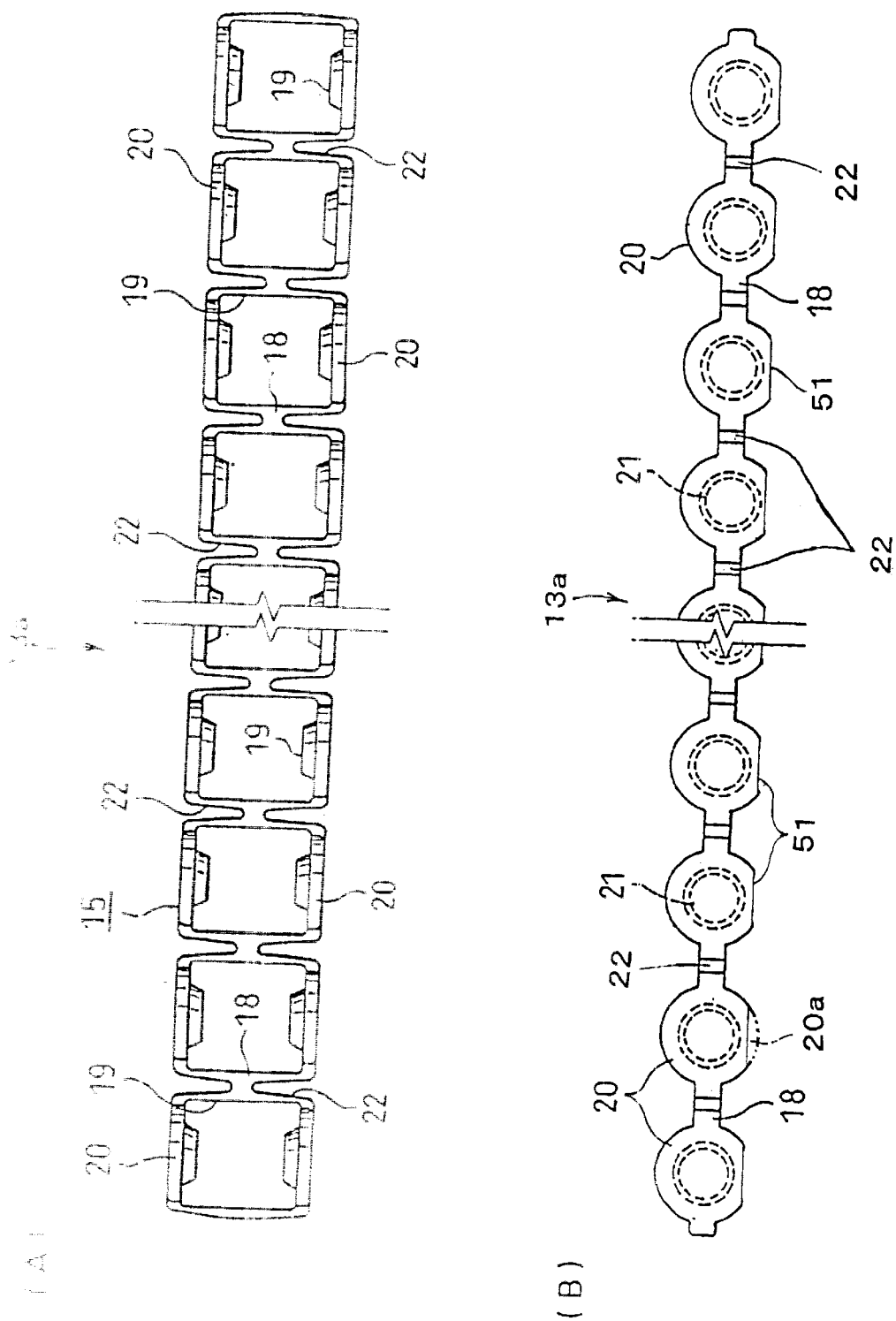
FIG. 41 shows a retaining member for the roller train of FIG. 40, wherein (A) is a plan view and (B) is a side view of the retaining member.
Figure 42:
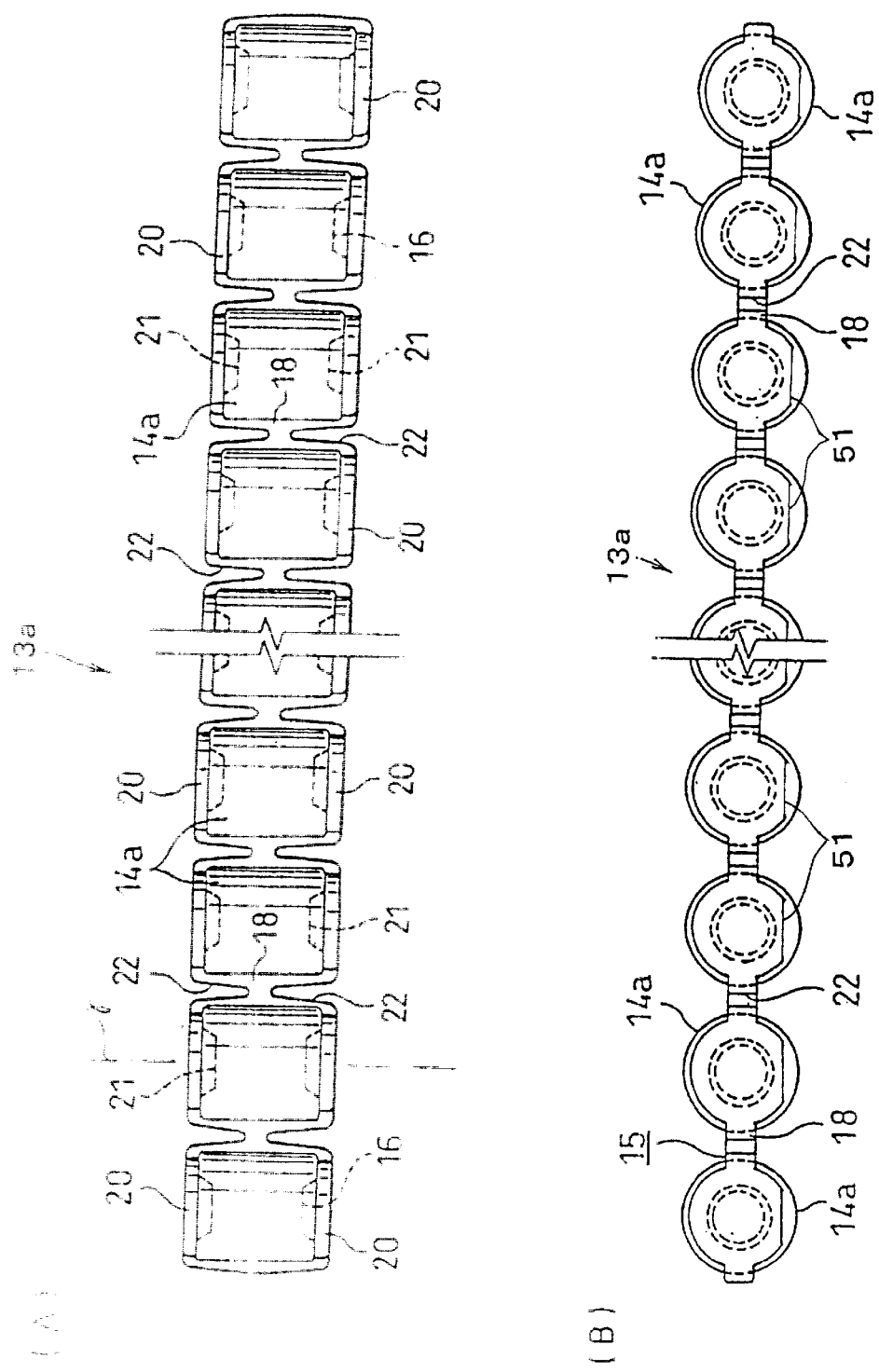
FIG. 42 shows the roller train in which rollers are maintained in the retaining member of FIG. 41, wherein (A) is a plan view, and (B) is a side view of the roller train.
Figure 44:
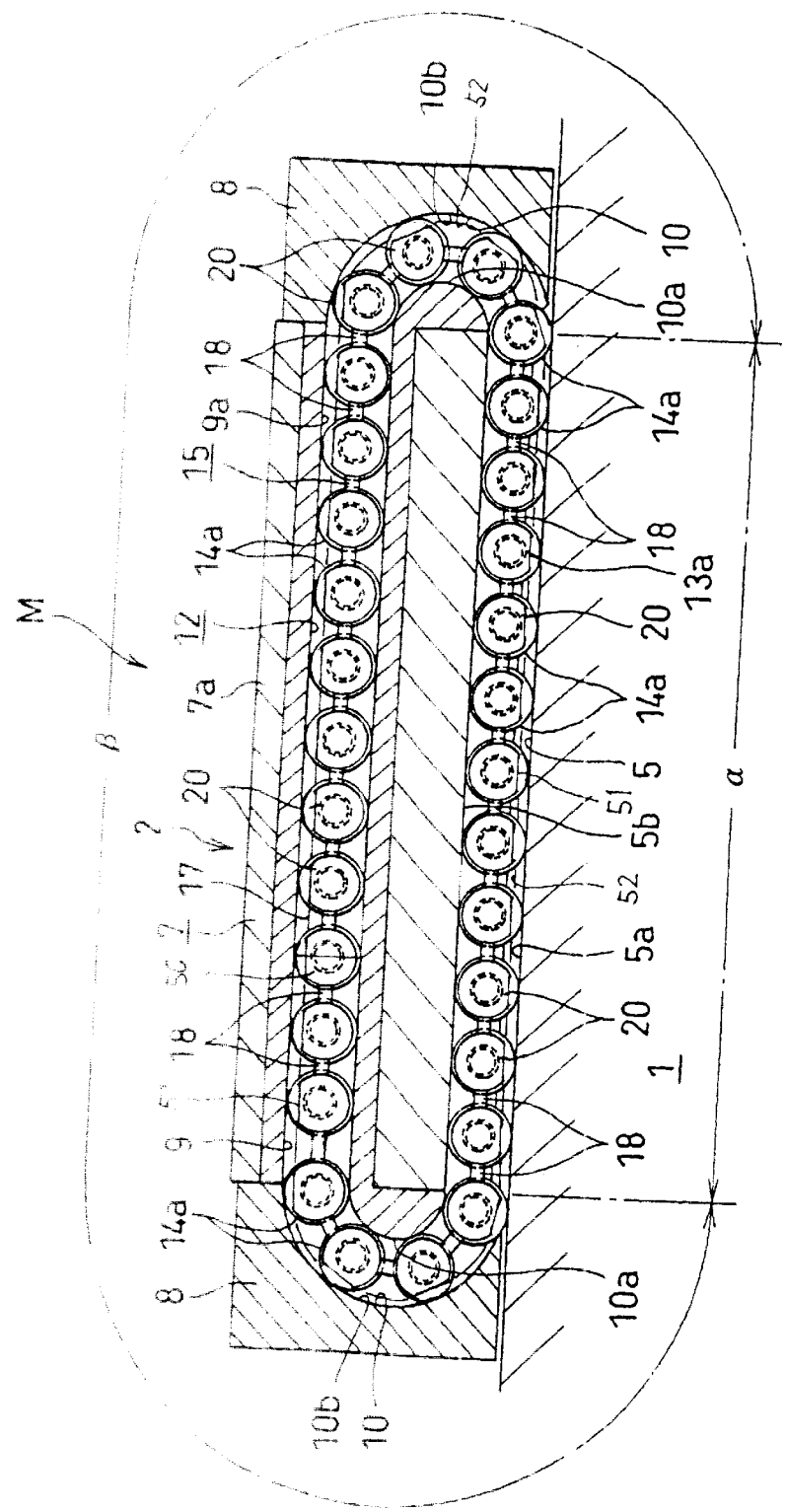
FIG. 44 is a cross-sectional view showing the path of the linear motion guide apparatus with the roller train of FIG. 40 installed in the path.
Figure 45:
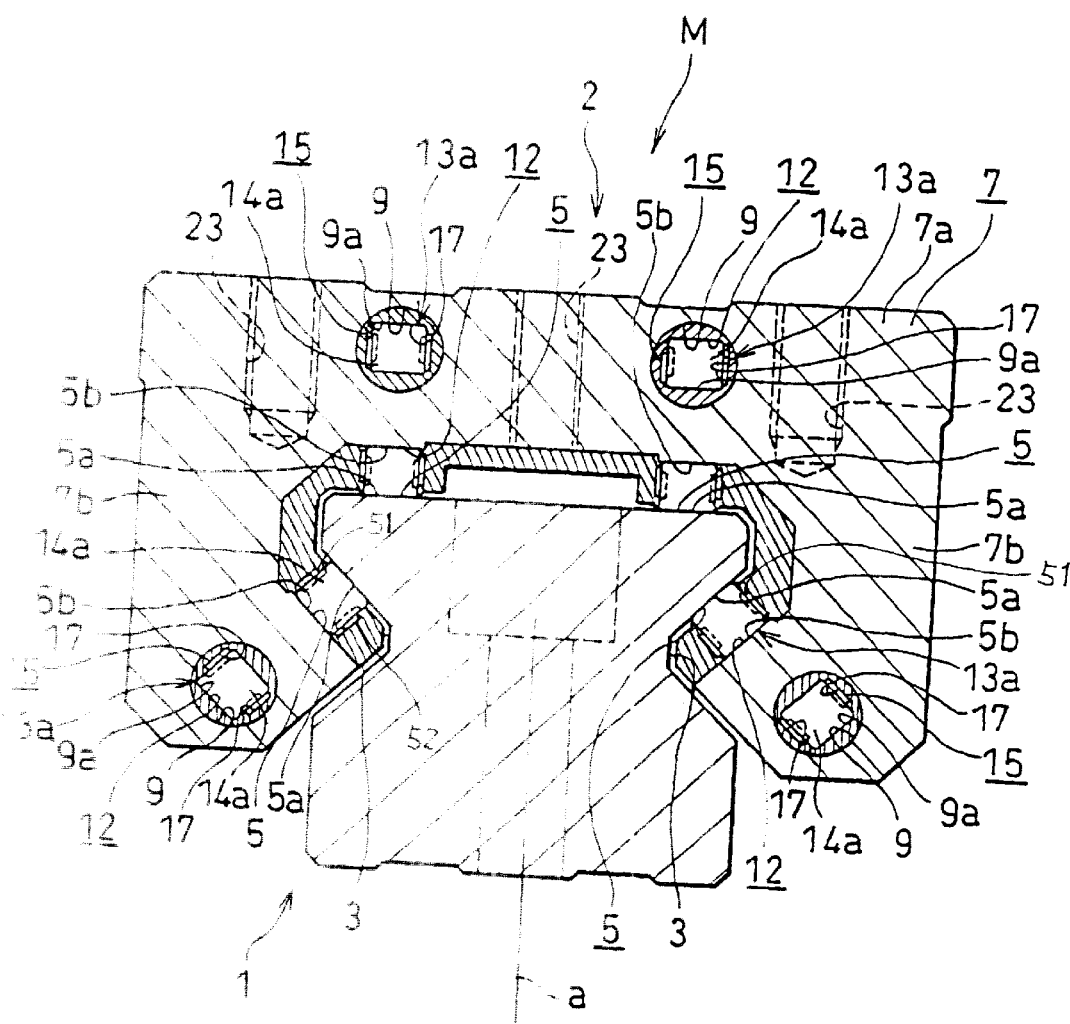
FIG. 45 is a cross-sectional view, corresponding to the section indicated by the arrows A in FIG. 1, showing the linear motion guide apparatus loaded with the roller train of FIG. 40 or FIG. 43.

As shown in FIGS. 40–45, hold portions 51 are formed in the side plates 20 by horizontally cutting portions 20a in the external side of the side plates 20 (see FIG. 41(B)). When the roller train 13a is formed in a ring shape, stabilizing portions 52 are formed in the rolling channel 5, U-shaped change direction channels 10, and return channels 9a of the path 12 for sliding in contact with the hold portions 51, as shown in FIGS. 44 and 45. The stabilizing portions 52 can be easily formed by setting the core used when forming the path 12 to a prescribed shape. In the present embodiment, the stabilizing portions 52 are formed throughout the entire path 12, but the same effects can be achieved if the stabilizing portions 52 are formed in at least the rolling channel 5 that makes up the load-bearing region α.

With the construction described above, since the hold portions 51 slide in contact with the stabilizing portions 52 as the roller train 13a circulates through the path 12, the roller train 13a is more effectively held in its correct position. Accordingly, the roller train 13a is stabilized as it is guided through the path 12, effectively preventing vibration and noise.

Next, the linking portion 50 of the roller train 13a will be described with reference to FIG. 43. The ends of the roller train 13a link at the end faces of a roller. The linking portion 50 comprises a side plate 20, which is the end face support for the roller. The linking portion 50 is formed by mutually contacting a half portion 50a formed on one end of the roller train 13a and comprising a linking end, and a half portion 50b formed on the other end of the roller train 13a and also comprising a linking end. The half portion 50a and half portion 50b are formed by dividing the opposing side plates 20 at the engaging protrusions 21. When put in contact with one another, the half portion 50a and half portion 50b form the same shape as other side plates 20. Hold portions 51 are also formed since the linking portion 50 forms the side plates 20.

By forming the roller linkage 13a in an endless ring, any of the rollers 14a can move smoothly throughout the path 12, even when transferring from the U-shaped change direction channel 10 to the rolling channel 5 of the load-bearing region, due to the pulling and pushing forces of neighboring rollers 14a. This smooth circulation of the rollers 14a enables the slider 2 to transfer smoothly across the track rail 1 and improves the stopping accuracy of the slider 2.

Figure 47:
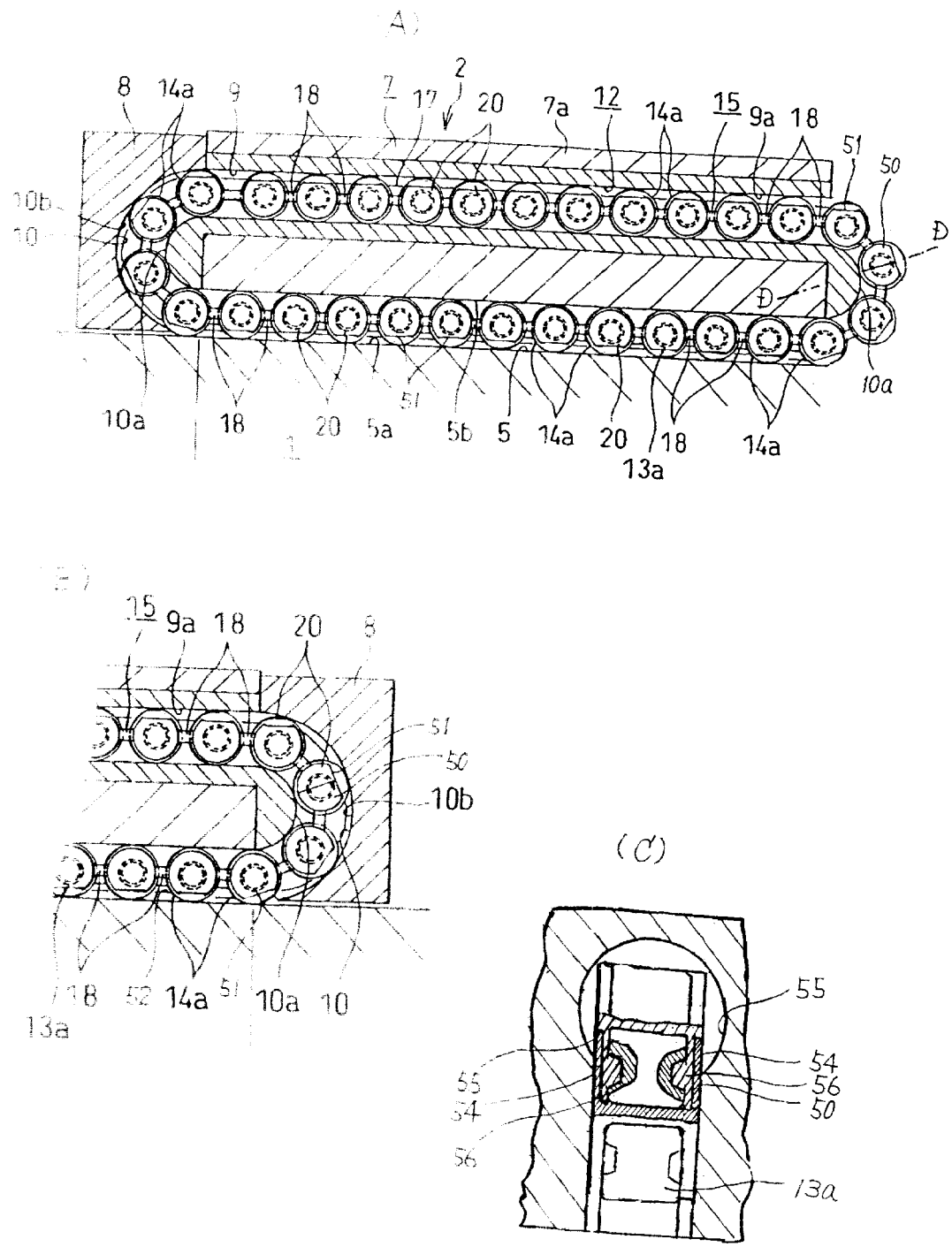
FIG. 47 illustrates the welding operation for the linking portion of the roller train according to the third embodiment, wherein (A) is a cross-sectional view showing the path exposed after removing one of the side covers, (B) is a cross-sectional view showing the relevant parts of the path after completing the welding operation and reattaching the side cover, and (C) is a crosssectional view, corresponding to the section indicated by the arrows A in FIG. 1, showing another variation of the linking portion on the roller train of FIG. 52.

FIG. 47(A) shows the state of the slider 2 after removing one of the side covers 8 for linking the half portion 50a and half portion 50b together. The half portion 50a and half portion 50b are linked together in the exposed U-shaped change direction channel 10 after the roller train 13a has been integrated in the path 12. After linking the half portion 50a and half portion 50b, the side cover 8 is reattached to the main body 7, as shown in FIG. 47(B). Once the side cover 8 is reattached, the outer surface of the side plates 20 on the roller train 13a contacts the side walls 17 portion of the path 12. This contact prevents the linking portion 50, and therefore the roller linkage 13a, from becoming disconnected.

As shown in FIG. 43(A), the linking portion 50, when the half portion 50a is placed in contact with the half portion 50b, forms a pair of engaging protrusions 21, the same shape as those formed on another pair of side plates 20. Equivalent to the engaging protrusion described in the scope of the claims, these engaging protrusions 21 engage with engaging depressions 16 provided on the rollers 14a, in order to maintain the orientation of the rollers 14a for the purpose of preventing skew. The effects of the engaging protrusions 21 and engaging depressions 16 have been described previously in the first embodiment, therefore the description of these parts will be omitted here. Further, the construction and operations of other parts are the same as those described in the first embodiment.

Figure 46:
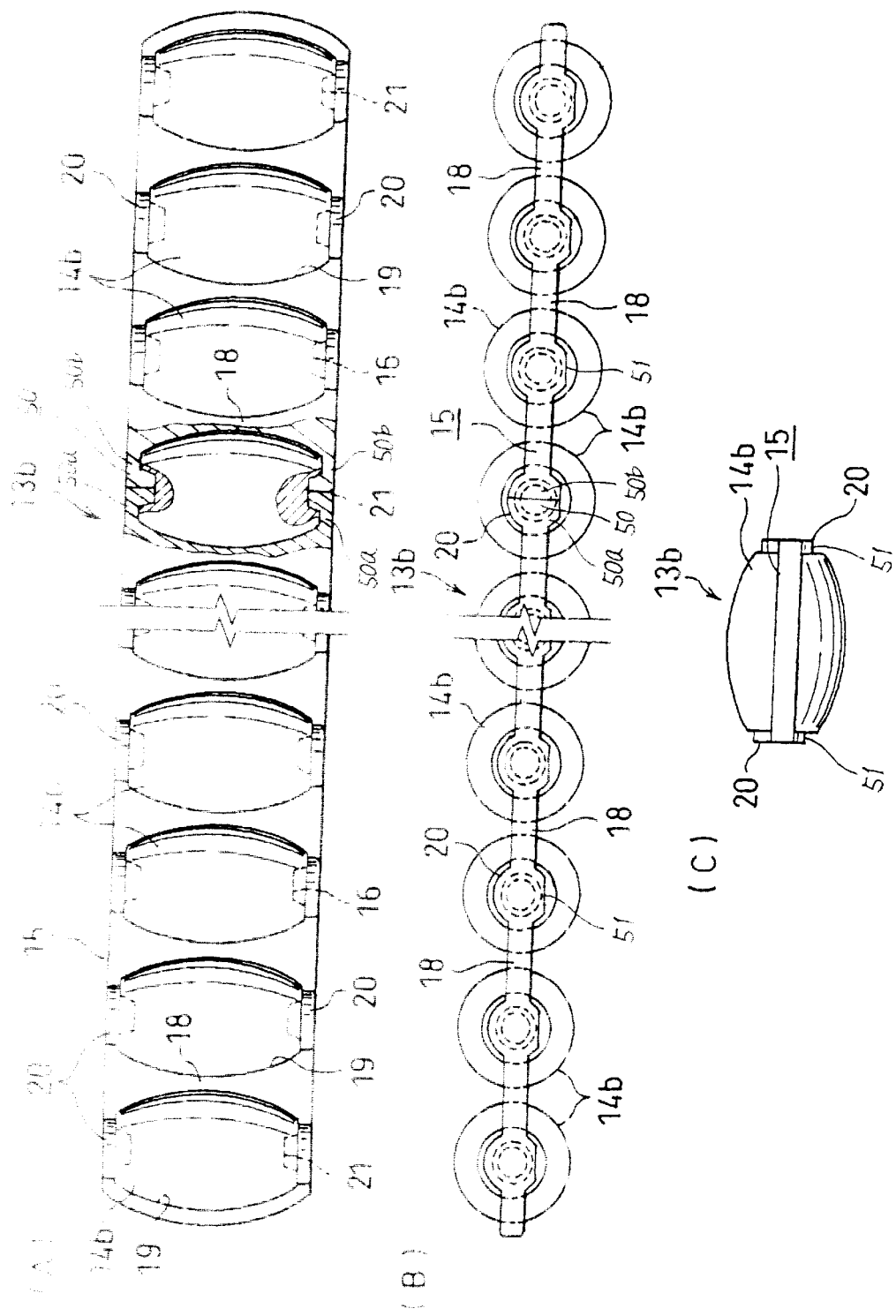
FIG. 46 shows the roller train according to the third embodiment, wherein (A) is a plan view showing a partial cross-section of the roller train, (B) is a side view showing the relevant parts of the roller train, and (C) is a front view of the roller train.

As shown in FIG. 46, the cylindrical rollers 14a shown in FIG. 43 can be replaced by spherical rollers 14b. The roller train 13b shown in the diagram is the same roller train 13b described in variation 1-1 of the first embodiment, and shown in FIG. 15, wherein the ends of the roller train 13b are detachably linked by the linking portion 50. The structure of the linking portion 50 is exactly the same as the example shown in FIG. 43.

Figure 51:
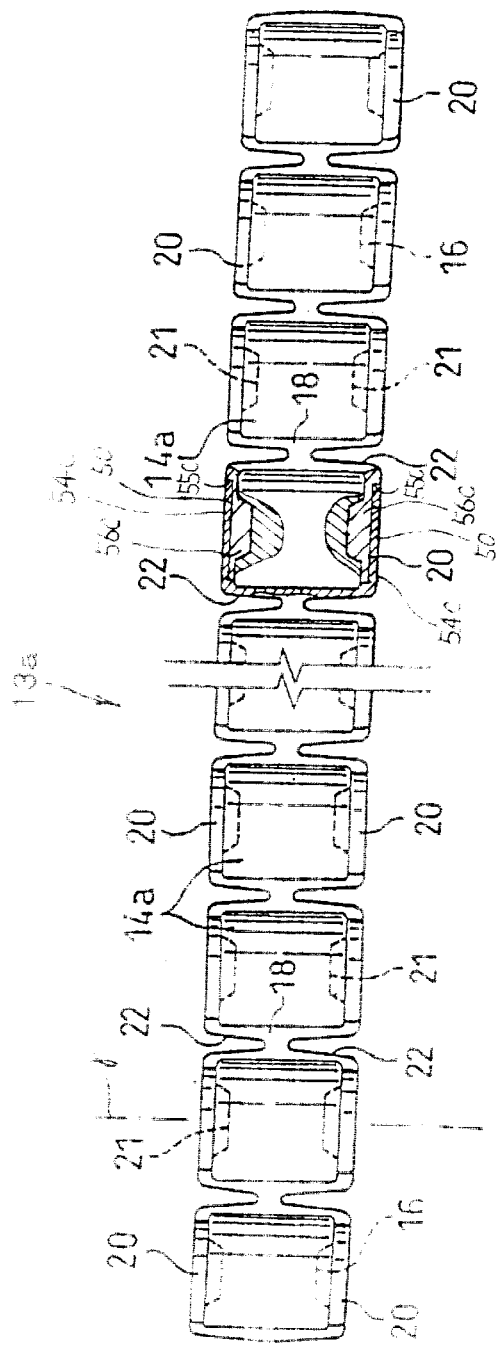
FIG. 51 shows the roller train according to another variation of the third embodiment, wherein (A) is a plan view showing a partial cross-section of the roller train, and (B) is a side view showing the relevant parts of the roller train.
Figure 51:
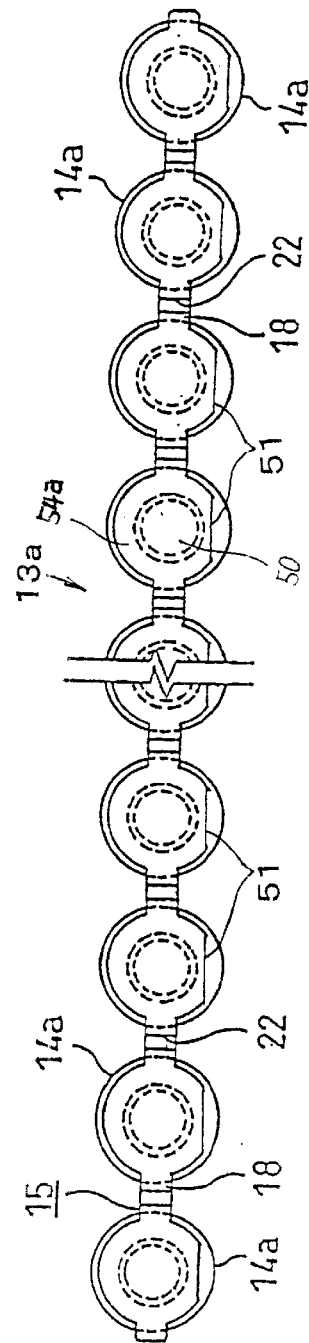

Next, a variation of the linking portion 50 described above will be described with reference to FIGS. 47(C) and 51. In the present variation, the linking portion 50 comprises an engaging protrusion piece 54 forming one end of the roller train 13a, and a superposition piece 56 having an engaging depression 55 formed on the other end of the roller train 13a. When the engaging protrusion piece 54 is engaged with the engaging depression 55, the linking portion 50 functions as a side plate.

Figure 48:
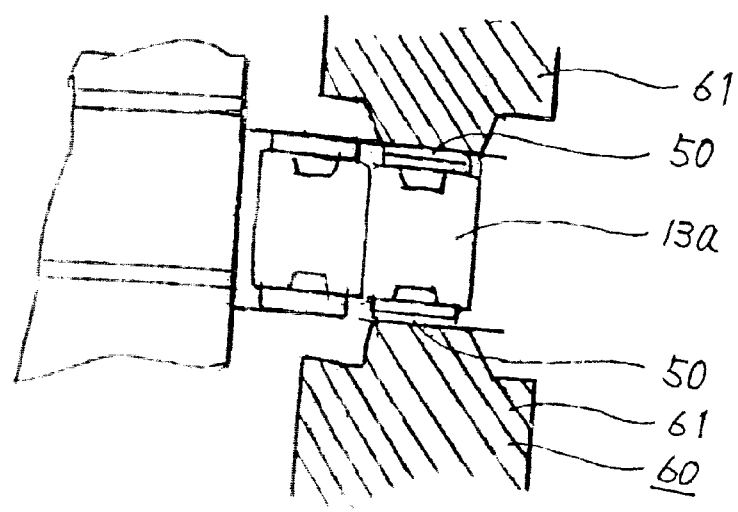
FIG. 48 is a cross-sectional view of the welded portion to illustrate the welding operation of FIG. 47.

As shown in FIG. 47(C), both side surfaces of the linking portion 50 are flat surfaces, similar to both side surfaces of other portions of the roller train 13a. Engaging protrusions 21 are formed on the inner surfaces of the superposition piece 56 for engaging with the engaging depressions 16 on both end faces of the rollers 14a. After the engaging protrusion piece 54 is engaged with the engaging depression 55, the two parts are fixed together by welding. As shown in FIG. 48, the welding process is performed using a plastic welder 60, well-known in the art, after the roller linkage 13a is integrated in the path 12 and one of the side covers 8 remains removed from the slider 2, to expose both ends of the roller linkage 13a in the U-shaped change direction channel 10 (shown on the right end in FIG. 47(A)). In other words, while one of the side covers 8 is removed, the linking portion 50 is positioned in an exposed portion of the U-shaped change direction channel 10. As shown in FIG. 48, a pair of gripping pieces 61 of the plastic welder 60 are used to grip the engaged linking portion 50. The plastic welder 60 is powered on to weld the engaged portions, forming the roller train 13a in a ring. In addition to this welding method, it is possible to fix the linking portion 50 using another fusing method well-known in the art.

Figure 49:
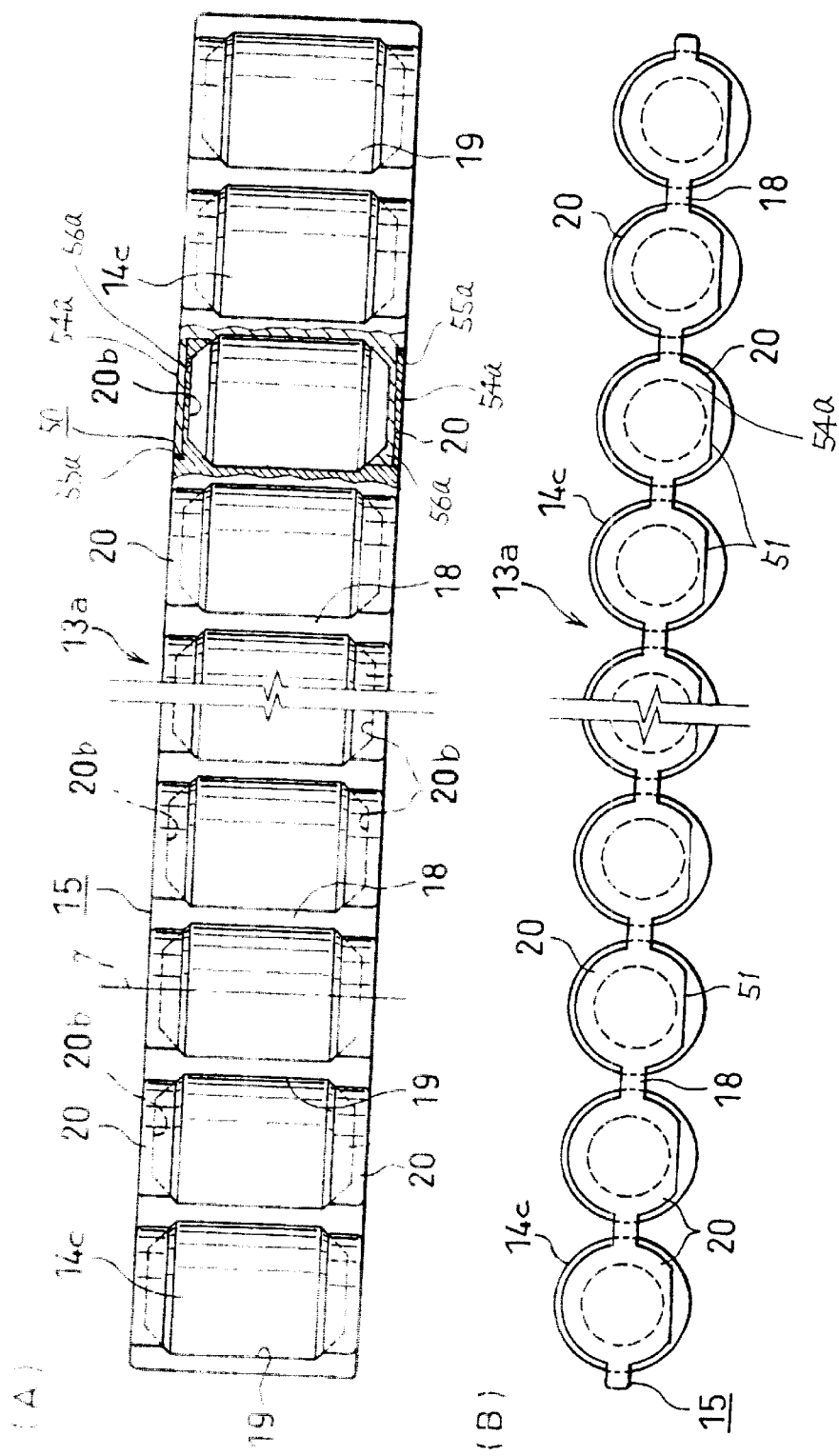
FIG. 49 shows the roller train according to another variation of the third embodiment, wherein (A) is a plan view showing a partial cross-section of the roller train, and (B) is a side view showing the relevant parts of the roller train.

Next, a variation of the linking portion used in the third embodiment will be described with reference to FIG. 49. In this variation, the roller train 13a described in the second embodiment is employed, wherein the depressions 20b provided in the side plates 20 loosely fit over the ends of the rollers, which are the rollers 14c. The ends of the roller train 13a are detachably linked by the linking portion 50. As in the examples shown in FIGS. 40–45, hold portions 51 are formed in the side plates 20 by cutting a straight line across the external sides of the side plates 20 when the roller train 13a is mounted in the path 12. The hold portions 51 are configured to engage stabilizing portions formed in the path 12.

The linking portion 50 comprises an engaging protrusion piece 54a formed on one end of the roller train 13a, and a superposition piece 56a having an engaging depression 55a formed in the other end of the roller train 13a. When the engaging protrusion piece 54a and engaging depression 55a are engaged, both side surfaces of the linking portion 50 form a flat shape similar to both side surfaces of other portions on the roller train 13a. In addition, a depression 20a is formed in the inner surfaces of the superposition piece 56a for loosely fitting over the end portion of the roller 14c. Accordingly, the linking portion 50 functions as a side plate for maintaining the rollers 14c in its correct orientation.

Here, the engaging protrusion piece 54a and superposition piece 56a are provided in pairs to correspond to the left and right ends of the roller. In this variation, however, the positional relationship of the engaging protrusion piece 54a and superposition piece 56a is reversed. That is, the engaging protrusion piece 54a and superposition piece 56a are provided on the left and right, respectively, of one linking end portion of the roller train 13a, while the superposition piece 56a and engaging protrusion piece 54a are provided on the other linking end portion to link with the engaging protrusion piece 54a and superposition piece 56a above. The linking portion 50 in the variation described above, is also welded together.

Figure 50:
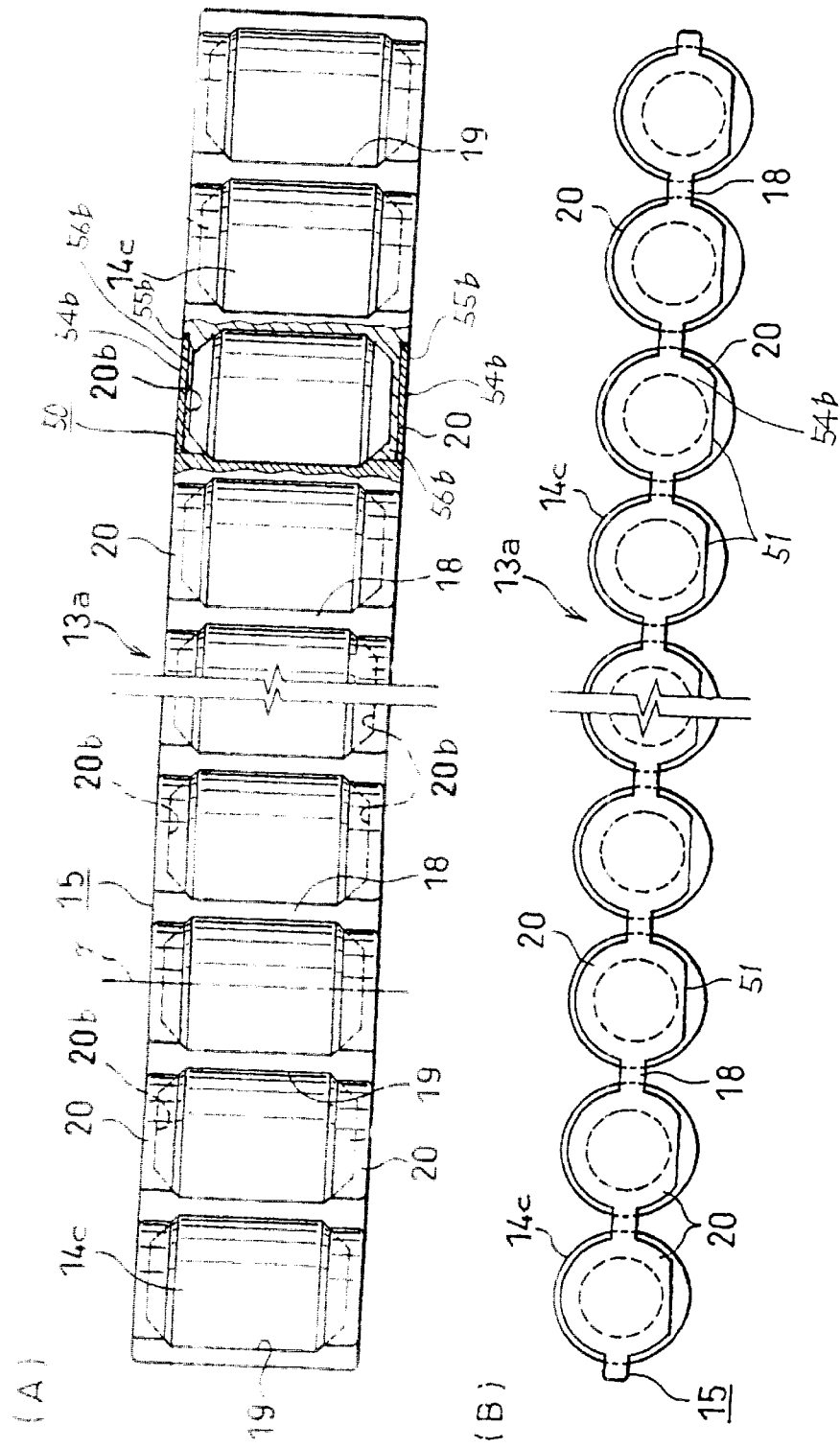
FIG. 50 shows the roller train according to another variation of the third embodiment, wherein (A) is a plan view showing a partial cross-section of the roller train, and (B) is a side view showing the relevant parts of the roller train.

Obviously, it is also possible to provide a left and right pair of engaging protrusion pieces 54b on one linking end of the roller train 13a and a pair of left and right superposition pieces 56b on the other linking end, as shown in FIG. 50. Here, an engaging depression 55b is provided on the outer surface of the superposition pieces 56b for engaging the engaging protrusion pieces 54b. When the engaging protrusion piece 54b is engaged with the engaging depression 55b, both side surfaces of the linking portion 50 form a flat surface similar to both side surfaces of other portions on the roller train 13a. The depressions 20b are formed on the inner surfaces of the superposition pieces 56b for fitting loosely over both ends of the rollers 14c. Hence the linking portion 50 functions as a side plates 20 for maintaining the rollers 14c in their correct orientation.

Next, another variation of the linking portion will be described with reference to FIG. 52. In this variation, a different configuration of the linking portion 50 is used for the roller train 13b, employing rollers 14b as shown in FIG. 46. The linking portion shown in FIG. 46 includes an engaging protrusion 21, formed by joining two half portions 50a, 50b, engaged with an engaging depression 16 in the end surface of the roller. However, the linking portion 50 shown in FIG. 52 and similar to the example shown in FIG. 51, includes a superposition piece 56d formed on one end of the roller train 13b and having an engaging depression 55d, and an engaging protrusion piece 54d, formed on the other end of the roller train 13b. When the engaging protrusion piece 54d is engaged with the engaging depression 55d, both side surfaces of the linking portion 50 form a flat surface similar to both side surfaces on other portions of the roller train 13b. Further, a depression 20a is provided on the inner surface of the superposition piece 56d for fitting loosely over both ends of the rollers 14b. A hold portion 51, conforming to the shape of other hold portions 51 on the side plates 20, is provided in the linking portion 50 by cutting a straight line across a portion of the linking portion 50. By forming the hold portion 51, a portion of one end of the rollers 14b is exposed through the depression 20a.

Figure 52:
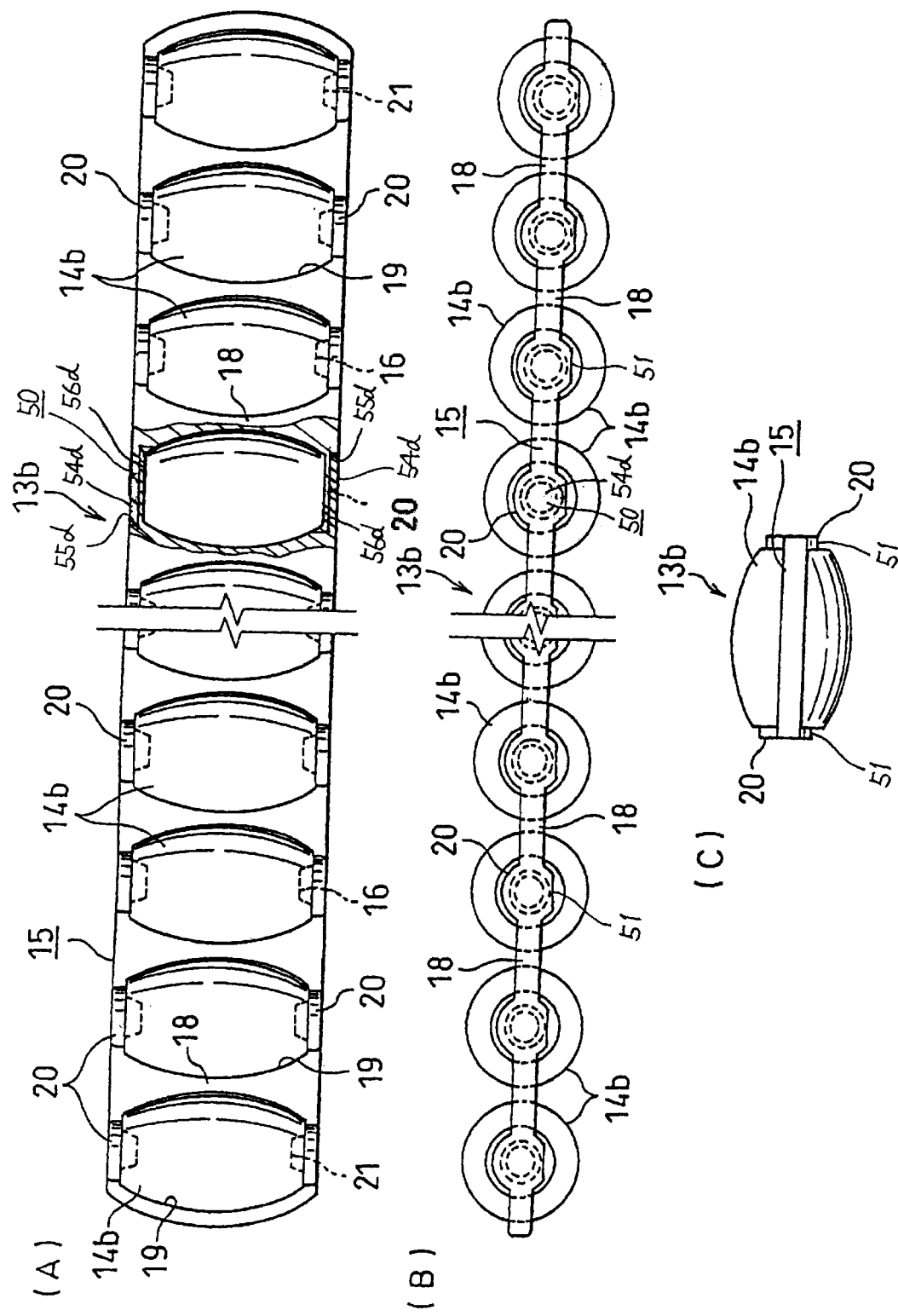
FIG. 52 shows another variation of the linking portion on the roller train of FIG. 43, wherein (A) is a plan view showing the relevant parts of the roller train with a cross section of the linking portion, and (B) is a side view showing the relevant parts of the roller train.
Figure 53:
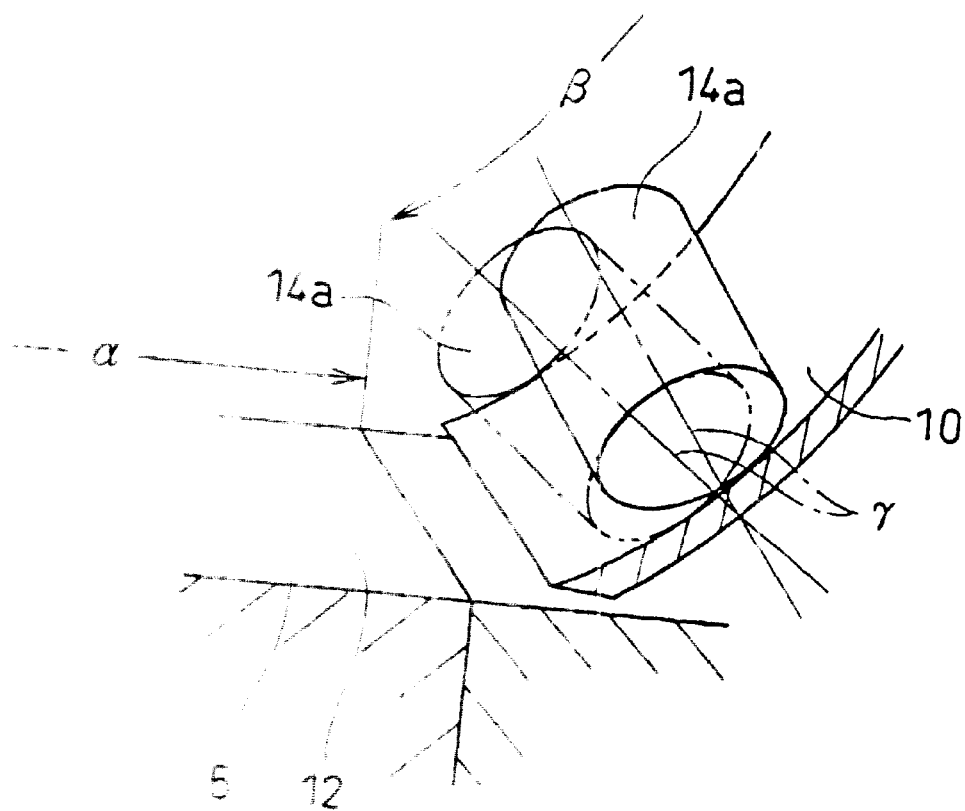
FIG. 53 is a partial perspective view of the endless path in a conventional linear motion guide apparatus for the purpose of illustrating problems with the conventional construction.
Figure 54:
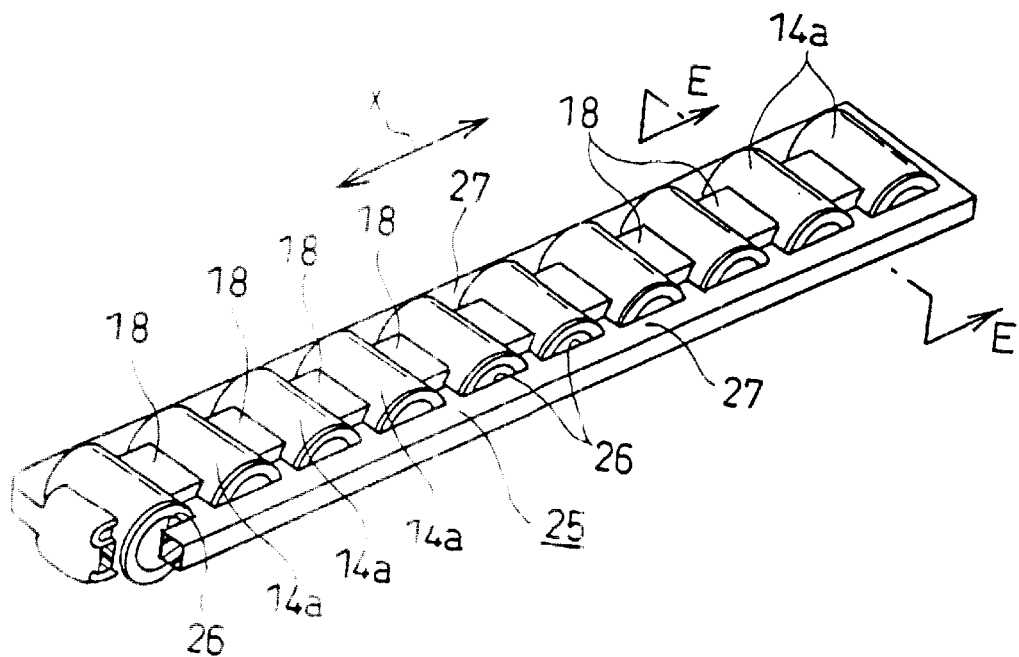
FIG. 54 shows the construction of a conventional roller train, wherein (A) is a perspective view with a cutout portion, and (B) is a cross-sectional view for the section indicated by the arrows E in (A)
Figure 54:
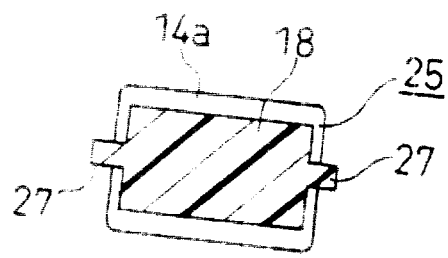
Figure 56:
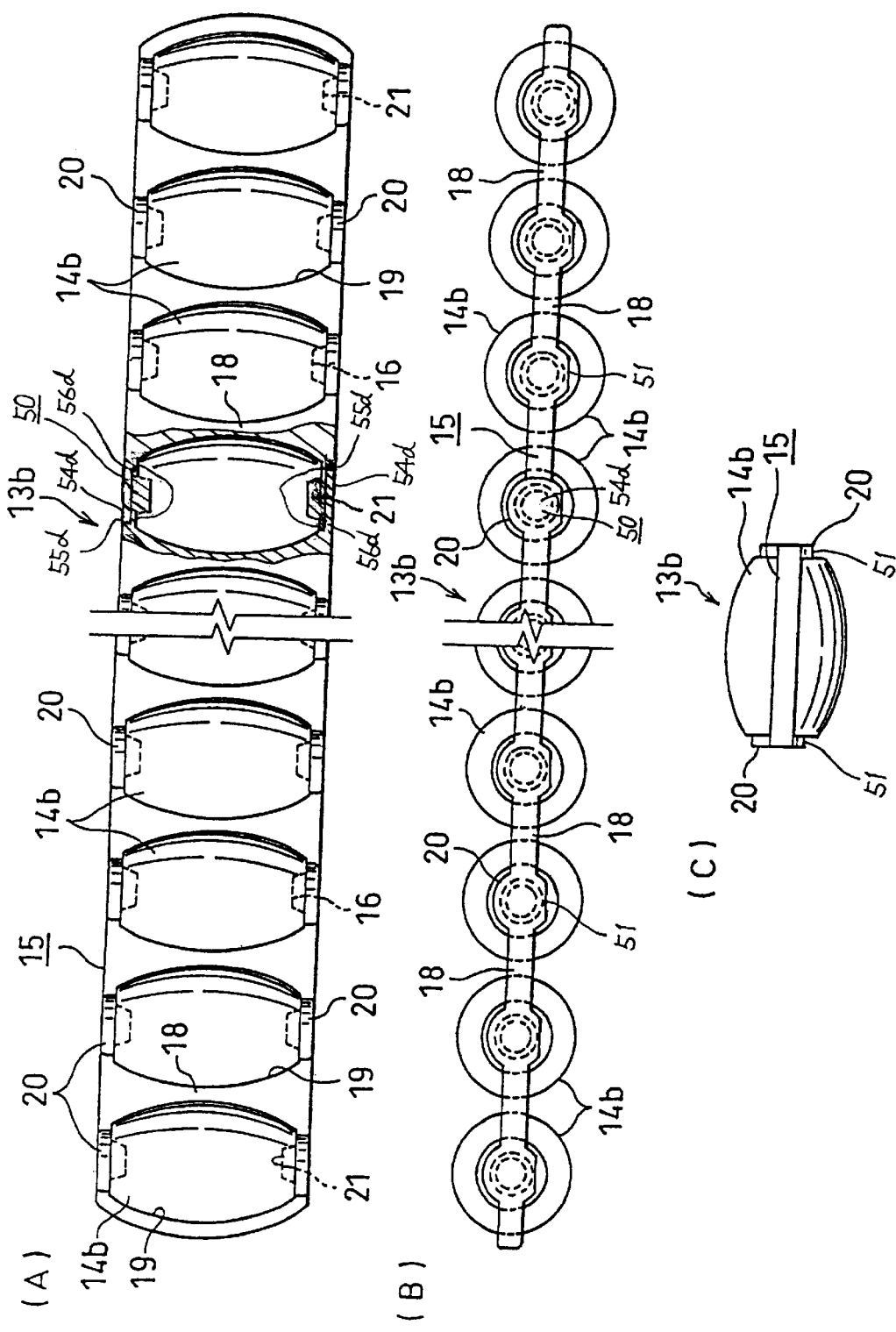
FIG. 56 shows another variation of the linking portion on the roller train of FIG. 52, wherein (A) is a plan view showing a partial cross section of the linking portion, and (B) is a side view showing the relevant parts of the roller train.

FIG. 56 shows a variation of the linking portion on the roller train 13b that employs rollers 14b shown in FIG. 52. In this variation, the side plates 20 provided on the roller train 13b have flat inner side surfaces that slide in contact with the end faces of the rollers 14b. Engaging protrusions 21 are formed on the inner surfaces of the side plates 20 for engaging with the engaging depressions 16 formed in the end faces of the rollers. In this example, however, the engaging protrusion 21 is provided on the inner surface of the superposition piece 56 of the linking portion 50, for engaging with the engaging depression 16 formed in the end face of the roller 14b.

In the third embodiment and its variations shown in FIGS. 41, 42, 43, 46, 49, 50, 51, 52, and 56, both left and right ends of the roller train are described as being cut. However, the ends of the linking portion are, of course, formed integrally, and are only described as being cut for the convenience of describing the center portion of the linking portion. However, it is possible to provide a linking portion between two roller trains having unconnected ends to connect the roller trains into one roller train.

While several examples have been presented, the present invention is not limited to those given here, but also applies to any roller train that can be easily formed into a ring, forming a connection by overlapping its two ends. When the roller train is formed in a ring the rollers 14a, 14b, 14c, or 14d can transfer smoothly from the U-shaped change direction channel 10 of the path 12 to the rolling channel 5 of the load-bearing region, according to the pulling and pushing forces of neighboring rollers 14a, 14b, 14c, or 14d. This smooth movement of the rollers 14a, 14b, 14c, or 14d enables the slider 2 to move smoothly over the track rail 1 and improves the stopping accuracy of the slider 2.

When the roller train is formed in a ring as described above, the rollers 14a, 14b, 14c, or 14d can move smoothly throughout the path 12 according to the pushing and pulling forces of neighboring 14a, 14b, 14c, or 14d. This smooth movement enables the slider 2 to also move smoothly over the track rail 1 and improves stopping precision of the slider 2.

What is claimed is:

1. A roller train integrated in a circulating path of a sliding body, which sliding body is used in a guide bearing apparatus, the roller train comprising:
   a plurality of rollers; and
   a retaining member constructed of a flexible material for retaining the plurality of rollers in a series and comprising: a plurality of spacers, wherein one spacer is positioned between each pair of neighboring rollers; and a plurality of end face supports for supporting the left and right end faces of each roller, wherein each end face support links like lengthwise ends of neighboring spacers and comprises an outer side surface that restricts the orientation of the rollers when the roller train is integrated in the path, by sliding in contact with side wall surfaces of the path.

2. A roller train as claimed in claim 1, wherein both inner and outer side surfaces of the end face supports are flat and the inner side surface of the end face supports freely slide in contact with at least the outer peripheral portion on the end surface of the rollers.

3. A roller train as claimed in claim 1, wherein the end face supports further comprise a depression portion on the inner side surface for fitting loosely over the ends of the rollers.

4. A roller train as claimed in one of claims 1–3, wherein the surface of the end face supports opposing the side surfaces of the rollers is a concave surface having a curvature approximately equal to the curvature of the side surfaces of the rollers.

5. A roller train as claimed in claim 4, wherein the spacers have cover portions for covering the side surfaces of the rollers, the surface of the cover portions opposing the roller side surfaces being formed with concave surfaces having a curvature approximately equal to the curvature of the roller side surfaces.

6. A roller train as claimed in claim 2, wherein engaging depressions or engaging protrusions are formed at the center in both end surfaces of the rollers, while engaging protrusions or engaging depressions capable of engaging with the engaging depressions or engaging protrusions formed in the end surfaces of the rollers are formed at the center of the inner side surface on the end face supports at positions conforming to the engaging depressions or engaging protrusions formed in the end surfaces of the rollers.

7. A roller train as claimed in one of claims 1–3, wherein the roller train is constructed of a flexible synthetic resin material.

8. A roller train as claimed in one of claims 1–3, wherein the rollers are cylindrically shaped.

9. A roller train as claimed in one of claims 1–3, wherein the rollers are spherically shaped.

10. A roller train as claimed in claim 2, wherein the end face supports are disc-shaped and contain approximately 80–90% of the area on the end faces of the rollers.

11. A roller train as claimed in one of claims 1–3 having two ends and further comprising a linking portion that can detachably link the two ends.

12. A roller train as claimed in claim 11, wherein the linking portion comprises an engaging protrusion formed on one end of the roller train and an engaging depression formed on the other end of the roller train, and both side surfaces of the linking portion are flush with the same plane formed by both side surfaces on other portions of the roller train when the engaging protrusion is engaged with the engaging depression.

13. A roller train as claimed in claim 11, wherein the linking portion is formed by welding together both ends of the roller train when the ends are overlapped.

14. A roller train as claimed in claim 11, wherein the ends of the roller train are linked at a position along the end faces of a roller, and the linking portion forms the end face supports of the roller at that position.

15. A roller train as claimed in claim 14, wherein one end of the roller train is configured of a superposition piece shaped as an engaging depression on the outer side surface of the roller end face support, while the other end is configured of an engaging protrusion that engages with the engaging depression of the superposition piece, and end face supports are constructed by engaging the engaging depression with the engaging protrusion.

16. A roller train as claimed in claim 15, wherein the engaging depression and engaging protrusion are welded together.

17. A roller train as claimed in claim 14 having two ends and further comprising a linking portion that can detachably link the two ends, wherein the linking portion comprises a pair of half portions disposed one on either end of the roller train and configured by splitting the end face support comprising the engaging protrusion at a position on the engaging protrusion, which engaging protrusion engages with a depression formed in the end face of a roller positioned between the half portions.

18. A roller train as claimed in one of claims 1–3, wherein at least the load-bearing channel in the path is provided with stabilizing portions, and the end face supports are formed with hold portions for engaging with the stabilizing portions.

19. A roller train as claimed in one of claims 1–3, wherein the spacers are provided with constricting portions formed from the edges of the spacers toward the center of the spacers.

20. A linear motion guide apparatus comprising: a long track rail; a sliding body capable of sliding freely along the track rail; a path formed in the sliding body for supporting the sliding body on the track rail, the path comprising: a rolling channel in a load-bearing region having a rolling surface formed in the sliding body opposing a rolling surface formed in the track rail; a return channel disposed parallel to the rolling channel; and change direction channels connecting ends of the rolling channel to ends of the return channel; a roller train integrated in the circulating path formed in the sliding body for supporting the sliding body on the track rail, the roller train comprising: a plurality of rollers; and a retaining member constructed of a flexible material for maintaining the plurality of rollers in a series, the retaining member comprising: a plurality of spacers disposed between neighboring rollers; and a plurality of end face supports connecting like lengthwise ends of neighboring spacers for supporting the left and right end faces of the rollers, the end face supports comprising: an outer side surface that slides in contact with the side walls of the path when the roller train is integrated in the path and utilizes the side walls as a guiding surface to maintain the rollers in their correct orientation.

21. A linear motion guide apparatus as claimed in claim 20, wherein two rows of the roller trains are disposed between the upper surface of the track rail and the lower surface of the horizontal portion on the main body of the sliding body, and one row of the roller trains is disposed on either widthwise side of the track rail between the outer side surface of the track rail and the inner side surface of the corresponding skirt portion formed on the sliding body.

22. A linear motion guide apparatus as claimed in claim 20, wherein the contact angle of the rollers integrated in the roller trains interposed between the top surface of the track rail and the lower surface of the horizontal portion of the sliding body is about 90 degrees from the horizontal, and the contact angle for the rollers integrated in the roller trains interposed between the widthwise sides of the track rail and the skirt portions of the sliding body is about 30 degrees downward from the horizontal.

23. A linear motion guide apparatus as claimed in claim 20, wherein two rows of the roller trains are disposed one above the other between each widthwise side surface of the track rail and the opposing inner side surface of the skirt portion formed on the sliding body.

24. A linear motion guide apparatus as claimed in claim 20, wherein the contact angle for the rollers integrated in the top roller trains is slanted upward about 45 degrees from the horizontal toward the skirt portion formed in the sliding body, and the contact angle for the rollers integrated in the bottom roller train is slanted downward about 45 degrees from the horizontal.

25. A linear motion guide apparatus as claimed in claim 20, wherein the contact angle for the rollers integrated in the top roller trains is slanted downward about 45 degrees from the horizontal toward the skirt portion formed in the sliding body, and the contact angle for the rollers integrated in the bottom roller train is slanted upward about 45 degrees from the horizontal.

26. A linear motion guide apparatus as claimed in claim 20, wherein the roller train has two ends prior to being installed in the path and forms a ring with no ends according to a linking portion for linking the ends of the roller train after installation.

27. A method for integrating a roller train in a linear motion guide apparatus, wherein the roller train is integrated in a circulating path of a sliding body for supporting the sliding body on a track rail, the roller train comprising: a plurality of rollers; a retaining member constructed of a flexible material for retaining the plurality of rollers in a series and comprising: a plurality of spacers, wherein one spacer is positioned between each pair of neighboring rollers; and a plurality of end face supports for supporting the left and right end faces of each roller, wherein each end face support links like lengthwise ends of neighboring spacers and comprises an outer side surface that restricts the orientation of the rollers when the roller train is incorporated in the path, by sliding in contact with side wall surfaces of the path; an engaging protrusion formed on one end of the roller train; and an engaging depression formed on the other end of the roller train for detachably engaging the engaging protrusion, the method comprising: removing one side cover of the sliding body to expose a change direction channel of the path in which the roller train is to be installed; inserting the roller train with its ends unconnected into the path via the change direction channel; positioning both ends of the roller train in the exposed change direction channel; engaging the engaging depression on one end of the roller train with the engaging protrusion on the other end to form the linking portion, such that both side surfaces of the linking portion are on the same plane as both side surfaces of other portions of the roller train; welding the engaged depression and protrusion to form an endless ring-shaped roller train; and reattaching the side cover to cover the change direction channel.

* * * * *